US007373347B2

(12) United States Patent
Takahashi et al.

(10) Patent No.: US 7,373,347 B2
(45) Date of Patent: May 13, 2008

(54) INFORMATION PROCESSING APPARATUS AND INFORMATION PROCESSING METHOD

(75) Inventors: Seiji Takahashi, Tokyo (JP); Hiroki Kobayashi, Kanagawa (JP); Sayaka Kobayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 385 days.

(21) Appl. No.: 10/622,572

(22) Filed: Jul. 21, 2003

(65) Prior Publication Data

US 2004/0064469 A1 Apr. 1, 2004

(30) Foreign Application Priority Data

| | | | |
|---|---|---|---|
| Jul. 22, 2002 | (JP) | ............................ | 2002-212300 |
| Aug. 22, 2002 | (JP) | ............................ | 2002-242548 |
| Aug. 22, 2002 | (JP) | ............................ | 2002-242550 |
| Jul. 16, 2003 | (JP) | ............................ | 2003-197850 |

(51) Int. Cl.
*G06F 17/00* (2006.01)
*G06F 15/16* (2006.01)
*G06F 15/00* (2006.01)

(52) U.S. Cl. ................. 707/10; 707/1; 707/2; 709/217; 709/224; 715/523; 715/526; 710/5

(58) Field of Classification Search .................. 707/10, 707/1, 2; 715/523, 526; 709/517, 224; 710/5

See application file for complete search history.

(56) References Cited

U.S. PATENT DOCUMENTS

| | | | |
|---|---|---|---|
| 5,974,477 A | 10/1999 | Kobayashi | 710/22 |
| 6,167,441 A * | 12/2000 | Himmel | 709/217 |
| 6,415,335 B1 * | 7/2002 | Lowery et al. | 710/5 |
| 6,477,549 B1 * | 11/2002 | Hishida et al. | 715/513 |
| 6,973,483 B2 * | 12/2005 | Hewett et al. | 709/213 |
| 6,989,770 B1 * | 1/2006 | Painter | 340/995.12 |

(Continued)

FOREIGN PATENT DOCUMENTS

JP 10-312343 * 11/1998

(Continued)

OTHER PUBLICATIONS

U.S. Appl. No. 10/622,572, filed Jul. 21, 2003, Takahashi et al.

(Continued)

*Primary Examiner*—Charles Rones
*Assistant Examiner*—Phuong-Thao Cao
(74) *Attorney, Agent, or Firm*—Oblon, Spivak, McClelland, Maier & Neustadt, P.C.

(57) ABSTRACT

In an information processing apparatus connectable to a terminal through a network, a terminal type of the terminal is specified based on a first request requesting Web information, said first request sent from the terminal through the network, and reference Web information is generated so as to include reference path created by adding terminal type information showing the specified terminal type to a path indicated in the first request for accessing the Web information and to allow the terminal to automatically accesses to the reference path. Then, the reference Web information is sent to the terminal as a response with respect to the first request, and a second request for requesting the Web information specified by the reference path is received.

9 Claims, 59 Drawing Sheets

U.S. PATENT DOCUMENTS

| | | | | |
|---|---|---|---|---|
| 2002/0161745 | A1 * | 10/2002 | Call | 707/1 |
| 2003/0020746 | A1 * | 1/2003 | Chen et al. | 345/741 |
| 2003/0182305 | A1 * | 9/2003 | Balva et al. | 707/103 R |
| 2004/0049574 | A1 * | 3/2004 | Watson et al. | 709/224 |
| 2004/0064469 | A1 | 4/2004 | Takahashi et al. | |

FOREIGN PATENT DOCUMENTS

| | | | |
|---|---|---|---|
| JP | 11-175515 | | 7/1999 |
| JP | 11-507752 | | 7/1999 |
| JP | 11-306070 | | 11/1999 |
| JP | 2000-207363 | | 7/2000 |
| JP | 2000-285052 | * | 10/2000 |
| JP | 2001-273228 | * | 10/2001 |
| JP | 2001-358745 | * | 12/2001 |
| JP | 2002-7095 | | 1/2002 |
| JP | 2002-63108 | | 2/2002 |
| JP | 2002-91816 | | 3/2002 |
| JP | 2002-116983 | | 4/2002 |
| WO | WO 96/42041 | | 12/1996 |
| WO | WO 01/42989 A2 | * | 6/2001 |
| WO | WO 01/89170 A2 | | 11/2001 |

OTHER PUBLICATIONS

U.S. Appl. No. 10/867,633, filed Jun. 16, 2004, Takahashi.
U.S. Appl. No. 10/622,572, Jul. 21, 2003, Takahashi et al.
U.S. Appl. No. 10/878,255, Jun. 29, 2004, Kobayashi.
U.S. Appl. No. 10/941,815, filed Sep. 16, 2004, Takahashi.
Timothy W. Bickmore, et al., "Digestor: device-independent access to the World Wide Web", Computer Networks and ISDN Systems, vol. 29, No. 8-13, XP-004095305, Sep. 1997, pp. 1075-1082.
Kentaro GOTO, et al., "Internet Programming starting from Ruby No. 2 client (first part)—HTTP, a typical stateless protocol", Open Design, vol. 7, No. 4, Aug. 1, 2000, pp. 54-105 (with English translation of relevant portion—3 pages).

* cited by examiner

100 INFORMATION PROCESSING APPARATUS

| WEB APPLICATION ID | WEB PAGE HANDLER TO CALL WEB APPLICATION |
|---|---|
| webDefaultApl | default__handler |
| webNetsettingApl | netSetting__handler |
| webSysconfigApl | sysConfig__handler |
| ... | ... |

| WEB PAGE FUNCTION ID | FUNCTION | STYLE SHEET |
|---|---|---|
| default. cgi | default() | default. xsl |
| mainFrame. cgi | mainFrame() | mainFrame. xsl |
| menuPage. cgi | menuPage() | menuPage. xsl |
| topPage. cgi | topPage() | topPage. xsl |
| headerPage. cgi | headerPage() | headerPage. xsl |
| netsetting. cgi | netsetting() | netsetting. xsl |
| sysconfig. cgi | sysconfig() | sysconfig. xsl |
| ... | ... | ... |

```
struct _HttpConnection {
    HttpConnectionManager       *cm;
    int                         receiveId;
    int                         state;
    buf_id_t                    bufId; /*    BUFFER TO READ DATA    */
    HTTP_REQUEST_INFO           *request;    ~346,1346
    HTTP_RESPONSE_INFO          *response;   ~347,1347
    pthread_mutex_t             mutexForEvent;
    pthread_cond_t              condVarForEvent;
};
```

```
GET HTTP/1.0
Accept:image/gif,image/xbitmap,image/ipeg,image/pipeg,application/vnd.spowerpoint,application/
Voln.ms-excel,application/msword,application/pdf,*/*
accept-Language:en-us;ge;q=0.9;ja;q=0.7;it;q=0.6;sp;q=0.4;pt;q=0.3
User-Agent:Mozilla/4.0(compatible;MSIE 6.0;Windows NT 5.0;Q312461;NET CLR 1.0.3705
Host:133.139.49.79
Cookie:cookieOnOffCheck=on
Connection:keep-alive
Accept-encouding.gzip,deflate
```

| WEB BROWSER TYPE | TERMINAL TYPE |
|---|---|
| DOCOMO | IMODE |
| xiino | PDA |
| MSPIE | PDA |
| HandHTTP | PDA |
| MSIE | O |
| Mozilla | PC |
| mozilla/5 | PC |
| Netscape6 | PC |

| WEB BROWSER OS | TERMINAL TYPE |
|---|---|
| Windows3.1 | PC |
| Windows95 | PC |
| Windows98 | PC |
| WindowsME | PC |
| WindowsNT | PC |
| Windows2000 | PC |
| WindowsXP | PC |
| Mac 68k | PC |
| Mac PowerPC | PC |
| Solaris | PC |
| Linux | PC |
| FreeBSD | PC |
| AIX | PC |
| IRIX | PC |
| HP | PC |
| OS/2 | PC |
| WindowsCE | PDA |

```
<html>
<head>
<title>default page</title>
<script language="javascript">
<!--
function jumpToMainFrame(){
self.document.cookie="cookieOnOffChecker=on; path=/";
self.location.pathname="/pc/admin/ja/webDefaultApl/mainFrame.cgi";
}
// -->
</script>
</head>
<body onLoad="jumpToMainFrame()">
</body>
</html>
```

```
<!DOCTYPE HTML PUBLIC "-//W3C//DTD HTML 4.0 Frameset//EN">
<html>
<head>
<meta HTTP-EQUIV="content-type" CONTENT="text/html; charset=UTF-8">
<title>Web Image Monitor</title>
</head>
<frameset rows="40,*" frameborder="0" border="0" framespacing="0">
  <frame noresize src="/webDefaultApl/headerPage.cgi" name="header"
   marginheight="0" marginwidth="0" scrolling="no">
  <frameset cols="160,*" frameborder="1" border="1" framespacing="0">
     <frame src=" /webDefaultApl/menuPage.cgi" name="menu"
      marginheight="0" marginwidth="0" scrolling="auto">
     <frame src=" /webDefaultApl/topPage.cgi" name="top"
      marginheight="0" marginwidth="0" scrolling="auto">
  </frameset>
</frameset>
</html>
```

<?xml version="1.0" encoding="UTF-8"?>
<networkResponse>
422 <terminal>pc</terminal>
423 <language>en</language>
424 <profile>admin</profile>
425 <deviceName>Printer 1</deviceName>
426 <comment>XXXXXXXX</comment>
427 <status>Ready</status>
</networkResponse>

```
<?xml version="1.0" encoding="UTF-8" ?>
<xsl:stylesheet xmlns:xsl="http://www.w3.org/1999/XSL/Transform" xmlns:sf="http://www.rr
 rr.co.jp/xmlns/xslt/rdh/common" version="1.0">
  <xsl:output method="html" encoding="UTF-8" />
<xsl:template match="/">
<html>
        <body>
                <xsl:apply-templates />
        </body>
</html>
</xsl:template>

<!-- Templates for body  -->
<xsl:template match="networkResponse">
<!-- Display the page title  -->
<xsl:call-template name="statusTitle4CommonProfile" />
<!-- Check current terminal type(pda or pc) and call suitable template  -->
        <xsl:choose>
                <xsl:when test="contains(//urldevice, 'pda')">  ~431
                        <xsl:call-template name="networkResponse_pda" />  ~432
                </xsl:when>
                <xsl:otherwise>
                        <xsl:call-template name="networkResponse" />  ~433
                </xsl:otherwise>
        </xsl:choose>
</xsl:template>

<!-- COMMON ITEMS -->
<xsl:template name="networkTitle4CommonProfile">
        <!-- OMISSION -->
</xsl:template>

<!-- STYLE SHEET FOR PDA TERMINAL -->          }
<xsl:template name="networkResponse_pda">      } 434
        <!-- OMISSION -->                      }
</xsl:template>                                }

<!-- STYLE SHEET FOR PC -->-->                 }
<xsl:template name="networkResponse">          } 435
        <!-- OMISSION -->                      }
</xsl:template>                                }
</xsl:stylesheet>
```

```
<html>

<head>
<meta http-equiv="Content-Language" content="en">
<meta http-equiv="Content-Type" content="text/html; charset=shift_jis">
<meta name="GENERATOR" content="Microsoft FrontPage 4.0">
<meta name="ProgId" content="FrontPage.Editor.Document">
<title>System Status</title>
</head>

<body>
                 443
<p><b><font size="4">System Status</font>  442
<img src="printer.gif">  444
</b></p>
<p>System Name:Printer  1</p>  445
<p>Comment:XXXXXXXXX</p>  446
<p>System Status:Ready</p>  447
<p></p>

</body>

</html>
```

441 (lines 442–447)

```
<html>

<head>
<meta http-equiv="Content-Language" content="en">
<meta http-equiv="Content-Type" content="text/html; charset=shift_jis">
<meta name="GENERATOR" content="Microsoft FrontPage 4.0">
<meta name="ProgId" content="FrontPage.Editor.Document">
<title>System Status</title>
</head>

<body>

<p><b><font size="3">System Status</font>
</b></p>

<p>System Name:Printer1</p>
<p>Comment:XXXXXXXXX</p>
<p>Status:Ready</p>
<p></p>
<p><a href="../webNetsettingApl/netsetting.cgi">Network Settings</a></p>
<p><a href="../webSysconfigApl/sysconfig.cgi">Device Configuration Information</a></p>

</body>

</html>
```

FIG.27
Network Sett
Host Name : Pr
IP Address : XX

| WEB APPLICATION ID | WEB PAGE HANDLER TO CALL WEB APPLICATION |
|---|---|
| webDefaultApl | default_handler |
| webNetsettingApl | netSetting_handler |
| webSysconfigApl | sysConfig_handler |
| ... | ... |

| WEB PAGE FUNCTION ID | FUNCTION | STYLE SHEET |
|---|---|---|
| default. cgi | default() | default. xsl |
| netsetting. cgi | netsetting() | netsetting. xsl |
| sysstatus. cgi | sysstatus() | sysstatus. xsl |
| sysconfig. cgi | sysconfig() | sysconfig. xsl |
| ... | ... | ... |

```
GET HTTP/1.0
Accept:image/gif,image/xbitmap,image/ipeg,image/pipeg,application/vnd.spowerpoint,application/
Voln.ms-excel,application/msword,application/pdf,*/*
accept-Language:en-us;ja;q=0.9;ge;q=0.7;it;q=0.6;sp;q=0.4;pt;q=0.3   ~ 1365
User-Agent:Mozilla/4.0[compatible;MSIE 6.0;Windows NT 5.0;Q312461;NET CLR 1.0.3705
Host:133.139.49.79
Cookie:cookieOnOffCheck=on
Connection:keep-alive
Accept-encouding.gzip,deflate
```

| REQUEST PRIORITY NUMBER | WEB BROWSER LANGUAGE |
|---|---|
| 1 | ENGLISH |
| 2 | JAPANESE |
| 3 | GERMAN |
| 4 | ITALIAN |
| 5 | SPANISH |
| 6 | PORTUGUESE |

| AVAILABLE PRIORITY NUMBER | AVAILABLE LANGUAGE TO PROVIDE FOR WEB BROWSER |
|---|---|
| 1 | JAPANESE |
| 2 | ENGLISH |
| 3 | GERMAN |
| ... | ... |

FIG.35C

| |
|---|
| ENGLISH |

```
<html>
<head>
<title>default page</title>
<script language="javascript">
<!--
function jumpToMainFrame(){
self.document.cookie="cookieOnOffChecker=on; path=/";
self.location.pathname="/pc/user/en/webDefaultApl/netsetting.cgi";
}
// -->
</script>
</head>
<body onLoad="jumpToMainFrame()">
</body>
</html>
```

1401 (self.document.cookie line and self.location.pathname line)

1402 (self.document.cookie line)

1403 (self.location.pathname line)

<?xml version="1.0" encoding="UTF-8"?>

<networkResponse>

1502 <terminal>pc </terminal>

1503 <language>en</language>

1504 <profile>user</profile>

1505 <returnValue>SUCCESS</returnValue>

1506 <ipAddress>999.999.999.999</ipAddress>

1507 <subnetMask>255.255.255.0</subnetMask>

1508 <hostName>Printer 1</hostName>

</networkResponse>

```
<?xml version='1.0' encoding='UTF-8' ?>
<i18n>
<l10n xml:lang='en'>  ~ 1591
<gentext key=,NETSETTING'   text='Network Settings' />  ~ 1592
<gentext key='IP_HOSTNAME'   text='Host Name' />  ~ 1593
<gentext key='IP_ADDRESS'   text='IP Address' />  ~ 1594
<gentext key='IP_SUBNET'   text='Subnet Mask' />  ~ 1595
</l10n>
</i18n>
```

```
<?xml version="1.0" encoding="UTF-8"?>
<xsl:stylesheetxmlns:xsl="http://www.w3.org/1999/XSL/Transform"
xmlns:sf="http://www.ricoh.co.jp/xmlns/xslt/rdh/common" version="1.0">

<xsl:param name="langTable">
    <xsl:value-of select="concat(normalize-space
        (//language),'/resource_',normalize-space(//language),'.xml')"/>
</xsl:param>
    <xsl:param name="L10N_LANG">
        <xsl:value-of select="normalize-space(//language)"/>
</xsl:param>

<xsl:template name="generatetext">                                        } 1433
    <xsl:param name="key"/>
    <xsl:param name="text"/>
        <xsl:value-of select="document($langTable)/i18n/l10n[@xml:lang =
                                L10N_LANG]/gentext[@key = $key]/@text"/>
</xsl:param>
</xsl:template>

<xsl:output method="html" encoding="UTF-8"/> ~ 1435

    <xsl:template match="/">
        <html>
            <xsl:attribute name="lang">                  } 1437
            <xsl:value-of select="//language"/>
            </xsl:attribute>
            <body>
                <xsl:apply-templates/>                   } 1438
            </body>
        </html>
    </xsl:template>
```

FIG.42

```
<!— Templates for body —>
<xsl:template match="networkResponse">  1441

    <p><b><font size="4">
        <xsl:call-template name="sf:StringHandler">      1443
            <xsl:with-param name="id" select="NETSETTING"/>
        </xsl:call-template>
    </font></b></p>

    <!— Displays host name —>
        <xsl:call-template name="staticValue">
            <xsl:with-param name="titleText">IP_HOSTNAME</xsl:with-param>
            <xsl:with-param name="target">sysName</xsl:with-param>
        </xsl:call-template>

        <xsl:call-template name="staticValue">                          1445
            <xsl:with-param name="titleText">IP_ADDRESS</xsl:with-param>
            <xsl:with-param name="target">comment</xsl:with-param>
        </xsl:call-template>
            .....
        </xsl:template>
```

FIG.43

```
<xsl:template name="staticValue">~ 1451
    <xsl:param name="titleText"/>
    <xsl:param name="target"/>

    <tr class="editProp">
        <td nowrap="nowrap" align="left">
            <xsl:if test="$titleText!=''">
                <xsl:call-template name="sf:StringHandler">
                    <xsl:with-param name="id" select="$titleText"/>
                </xsl:call-template>
            </xsl:if>
        </td>
        <td nowrap="nowrap">
            <xsl:value-of select="*[name()=$target]/text()"/>
        </td>
    </tr>
</xsl:template>~ 1460

<xsl:template name="sf:StringHandler">~ 1471
<xsl:param name="id"/>
    <xsl:call-template name="generatetext">
        <xsl:with-param name="key">
        <xsl:value-of select="$id"/>
    </xsl:with-param>
</xsl:call-template>~ 1480
</xsl:styleshe t>
```

```
html>

<head>
<meta http-equiv="Content-Language" content="en">  1571
<meta http-equiv="Content-Type" content="text/html; charset=shift_jis">
<meta name="GENERATOR" content="Microsoft FrontPage 4.0">
<meta name="ProgId" content="FrontPage.Editor.Document">
<title>Network Settings</title>
</head>

<body>

<p><b><font size="4">Network Setting Page</font></b></p>
<p>Host Name:Printer 1</p>
<p>IP Address:999.999.999.999</p>
<p>Subnet Mask:255.255.255.0</p>
<p></p>
<p><a href="../webSysstatusApl/sysstatus.cgi">Browse System Status</a></p>
<p><a href="../webSysconfigApl/sysconfig.cgi">Browse System Configurations
</a></p>

</body>

</html>
```

1573 (bracket: Network Setting Page through Subnet Mask lines)

1575 (bracket: the two href lines)

1576 (sysstatus.cgi)

1577 (sysconfig.cgi)

```
<html>

<head>
<meta http-equiv="Content-Language" content="ja">  ~1671
<meta http-equiv="Content-Type" content="text/html; charset=shift_jis">
<meta name="GENERATOR" content="Microsoft FrontPage 4.0">
<meta name="ProgId" content="FrontPage.Editor.Document">
<title>システムのステータスページ</title>
</head>


<body>


<p><b><front size="4">システムのステータスページ</font></b></p>   ⎫
<p>システム名:Printer1</p>                                          ⎬ 1673
<p>コメント:XXXXXXXXX</p>                                           ⎪
<p>システムの状態:正常</p>                                          ⎪
<p></p>                                                              ⎭
<p>表示言語<SELECT>                                  ⎫
<OPTION VALUE="jp">日本語</OPTION>                   ⎬ 1674
<OPTION VALUE="en">英語</OPTION>                     ⎪
<OPTION VALUE="fr">フランス語</OPTION>               ⎭
<INPUT type="submit" value="決定">
</p>
<p><a href="../webSysstatusApl/sysstatus.cgi">ネットワーク設定のページ</a></p>  ⎫ 1675
<p><a href="../webSysconfigApl/sysconfig.cgi">機器構成情報ページ</a></p>       ⎭
</a></p>


</body>

</html>
```

FIG.54

| PROFILE INFORMATION | PROFILE |
|---|---|
| user | REGULAR USER |
| admin | SYSTEM ADMINISTRATOR |
| service | SERVICE PERSON |
| ... | ... |

```
<html>
<head>
<title>rolechange</title>
<script language="javascript">
<!--
function jumpToNetsetting(){
self.document.cookie="cookieOnOffChecker=on; path=/";
self.location.pathname="/pc/admin/en/webDefaultApl/netsetting.cgi";
}
// -->
</script>
</head>
<body onLoad="jumpToNetsetting()">
</body>
</html>
```

<?xml version="1.0" encoding="UTF-8"?>
<networkResponse>
2502 <terminal>pc </terminal>
2503 <language>en</language>
2504 <profile>admin</profile>
2505 <returnValue>SUCCESS</returnValue>
2506 <ipAddress>999.999.999.999</ipAddress>
2507 <subnetMask>255.255.255.0</subnetMask>
2508 <hostName>Printer 1</hostName>
</networkResponse>

```
<?xml version="1.0" encoding="UTF-8" ?>
<xsl:stylesheet xmlns:xsl="http://www.w3.org/1999/XSL/Transform"
  xmlns:sf="http:// www.rrrr.co.jp /xmlns/xslt/rdh/common" version="1.0">
  <xsl:output method="html" encoding="UTF-8" />
  <xsl:template match="/">
    <html>
      <body>
        <xsl:apply-templates />
      </body>
    </html>
  </xsl:template>
  <!-- Templates for body   -->
  <xsl:template match="networkResponse">
    <!-- Display the page title   -->
    <xsl:call-template name="statusTitle4CommonProfile" />
    <!-- Check current profile (admin or user) and call suitable
    template    -->
    <xsl:choose>
    - <xsl:when test="contains(//urlProfile, 'admin')">          2431
        <xsl:call-template name="networkResponse4Admin" />       2432
      </xsl:when>
    - <xsl:otherwise>
        <xsl:call-template name="networkResponse4User" />        2433
      </xsl:otherwise>
    </xsl:choose>
  </xsl:template>
  <xsl:template name="networkTitle4CommonProfile">
    <!— OMISSION —>
  </xsl:template>
  <!— FOR ADMINSTRATOR (ALLOWED TO SET) —>
  <xsl:template name="networkResponse4Admin">     \
    <!— OMISSION —>                                > 2434
  </xsl:template>                                 /
  <!— FOR REGULAR USER (REFERENCE ONLY) —>
  <xsl:template name="networkTitle4User">         \
    <!— OMISSION —>                                > 2435
  </xsl:template>                                 /
</xsl:stylesheet>
```

```
html>

<head>
<meta http-equiv="Content-Language" content="en">
<meta http-equiv="Content-Type" content="text/html; charset=shift_jis">
<meta name="GENERATOR" content="Microsoft FrontPage 4.0">
<meta name="ProgId" content="FrontPage.Editor.Document">
<title>Network Settings</title>
</head>
 <body>
<form action= "../webDefaultApl/netsetting.cgi " method= "post ">
<p><b><font size="4">Network Setting Page</font></b></p>
<p>Host Name:<input type ="text" name="host name"></p>
<p>IP Address:<input type ="text" name="IP Address"></p>
<p>Subnet Mask: <input type ="text" name="Subnet MasK">
<p>
<INPUT TYPE="submit" VALUE="SEND">
<INPUT TYPE="reset" VALUE="RESET">
</P>
</FORM>
<p></p>
<p><a href="../webSysstatusApl/sysstatus.cgi">Browse System Status</a></p>
<p><a href="../webSysconfigApl/sysconfig.cgi">Browse System Configurations
</a></p>
 </body>
 </html>
```

2573

2575

2576

2577

INFORMATION PROCESSING APPARATUS AND INFORMATION PROCESSING METHOD

BACKGROUND OF THE INVENTION

1. Field of the Invention

The present invention generally relates to an information processing apparatus capable of connecting to a terminal through the Internet and including a plurality of Web applications and an information processing method in that terminal type information, language information, and profile information of the terminal can be succeeded while a page transition is conducted by a user of the terminal among the plurality of Web applications, and in that information suitable for the terminal can be provided while maintaining user-friendliness.

2. Description of the Related Art

Recently, the Internet has been widely used by not only a client PC (Personal Computer) but also mobile phone and PDA (Personal Digital Assistant) terminal, and information has been provided in various languages and to various level users. A method for providing information has been diversified.

In order to provide information corresponding to a terminal such as the client PC, the mobile phone, or PDA terminal, Japanese Laid-Open Patent Application No. 11-175515 discloses that display contents corresponding to the terminal type of the terminal is generated for HTML data created beforehand. Or, Japanese Laid-Open Patent Application No. 2002-63108 discloses that a gateway server, that intermediates between a Web server for providing information and a terminal for requesting information, deletes unnecessary data and adjusts color attributes of an image with respect to information provided from the Web server in response to the request of the terminal, based on the terminal type of the terminal.

Moreover, Japanese Laid-Open Patent Application No. 2002-7095 discloses a data processing apparatus including a Web server function capable of providing information concerning a image forming process. In the data processing apparatus, a user of the terminal can obtain information concerning a device for conducting a image forming process and provided with the data processing apparatus, through the Internet.

Furthermore, Japanese Laid-Open Patent Application No. 11-306070 discloses a data succeeding method in that by using information input by the user of the terminal is stored in a predetermined storage area, the information can be succeeded while the user conducts the page transition.

However, the above-mentioned conventional methods have the following problems.

In the Web server having the Web server function capable of providing information concerning the image forming process, in a case in that a state of the image forming process or a device such as a plotter controlled by the Web server for conducting the image forming process is provided, since the information should be provided timely, ETML data cannot be prepared beforehand. Accordingly, the method disclosed by Japanese Laid-Open Patent Application No. 11-175515 cannot be applied in this case. In a case of Japanese Laid-Open Patent Application No. 2002-63108, a cost of installing the gateway server and maintenance of the gateway server are required.

In the data processing apparatus disclosed by Japanese Laid-Open Patent Application No. 2002-7095, it is impossible to provide information suitable for the size of a display screen of the terminal such as the client PC, the mobile phone, and the PDA terminal.

Moreover, in the data succeeding method disclosed by Japanese Laid-Open Patent Application No. 11-306070, a page for allowing the user to input information concerning the user of the terminal is required and the user is required to explicitly input the information into the page. In addition, it is required to manage the information, which is to be succeeded, for each user. Accordingly, it is impossible to automatically provide information suitable for the size of the display screen.

SUMMARY OF THE INVENTION

It is a general object of the present invention to provide an information processing apparatus and an information processing method in which the above-mentioned problems are eliminated.

A more specific object of the present invention is to provide the information processing apparatus capable of connecting to a terminal through the Internet and including a plurality of Web applications and the information processing method in that terminal type information, language information, and profile information of the terminal can be succeeded while a page transition is conducted by a user of the terminal among the plurality of Web applications, and in that information suitable for the terminal can be provided while maintaining user-friendliness.

The above objects of the present invention are achieved by an information processing apparatus connectable to a terminal through network, the information processing apparatus including: a reference Web information generating part specifying a terminal type of the terminal based on a first request requesting Web information sent from the terminal through the network, and generating reference Web information that includes reference path created by adding terminal type information showing the specified terminal type to a path indicated in the first request for accessing the Web information and that allows the terminal automatically accesses to the reference path; and a communicating part sending the reference Web information to the terminal as a response with respect to the first request, and receiving a second request for requesting the Web information specified by the reference path.

In the information processing apparatus, the Web information automatically accessing by the reference path from the terminal is generated and provided to the terminal. Accordingly, at a side of the terminal, a user of the terminal is not required to input the terminal type information and it is possible for the terminal to obtain the reference path including the terminal type information from the Web information. Moreover, since the reference path is provided to the terminal before the Web information desired by the user is provided, it is not necessary for a developer to develop a Web application generating the Web information for each terminal type.

For example, the Web information is information to provide on a Web browser through the Internet.

Moreover, when the communicating part receives the first request from the network, the communicating part additionally may provide a default value of the terminal type and reference web information identification for identifying the reference Web information generating part to the path for the Web information indicated in the first request, and the reference Web information generating part may be executed by the reference Web information identification additionally provided by the communicating part and may replace the default value with the specified terminal type.

In the information processing apparatus, when the first request is received, the communicating part (for example, HTTP daemon) additionally provides the default value and the reference Web information identification beforehand. Therefore, the reference Web information generating part is always executed with respect to the first request.

Furthermore, the communicating part may create the reference path by adding the default value before the Web information identification for identifying the Web information in the path for the Web information indicated in the first request.

In the information processing apparatus, since the terminal type information is set before the Web information identification, the path after the Web information identification can be used as a relative path. Therefore, even if the page transition is conducted from the reference information, the terminal type information can be always succeeded to next Web information.

Moreover, the information processing apparatus may further include a Web information generating part generating the Web information; and a display information generating part generating a Web page by describing the Web information corresponding to the terminal in a display format for displaying the Web information at the terminal based on the terminal type information obtained from the reference path indicated by the second request. In addition, the display information generating part may include an HTML describing part describing the Web information generated by the Web information generating part and the terminal type information in an extensible markup language; and an HTML converting part generating the Web page by converting the Web information described in the extensible markup language into a hypertext markup language in accordance with a style sheet corresponding to the Web information based on the terminal type information.

In the information processing apparatus, the display information generating part generates the Web page corresponding to the terminal type, and a generation of the Web page is conducted independent of a generation of the Web information. Therefore, it is possible to easily develop and add the Web application.

Furthermore, the information processing apparatus may include a plurality of other Web information generating parts generating other Web information other than the Web information, the other Web information linked from the Web information by a relative path, wherein when one of the other Web information generating part corresponding to the other web information generates the other Web information in response to a third request for requesting the other Web information selected by a user at the terminal displaying the Web information, the display information generating part generates the Web page for displaying the other Web information suitable for the terminal at the terminal, based on the terminal type information set in the reference path.

In the information processing apparatus, even if another Web page providing another Web information is linked from the Web page providing the Web information currently displayed at the terminal, it is possible to obtain the terminal type information set in the reference path in common. Therefore, the Web page can be generated by corresponding to the display screen of the terminal.

Moreover, the information processing apparatus may further include a Web frame information generating part setting relative paths for the Web information and the other Web information to display for each of a plurality of frames, and generating Web frame information defining the plurality of frames to divide the Web page, wherein the reference Web information generating part generates the reference web information that includes the reference path to access the Web frame information created by adding terminal type information to a path for the Web frame information and that allows the terminal to automatically access to the reference path, and when the communicating part sends the reference Web information to the terminal as the response to the first request and receives the second request requesting the Web frame information by the reference path from the terminal, the Web frame information generating part is executed.

In the information processing apparatus, in a case in that the Web screen divided into a plurality of Web pages by frames, the Web frame information setting the reference path is automatically requested from the terminal. Each of the Web information and other Web information can be accessed by the relative paths, respectively, and the terminal type information can be succeeded.

Furthermore, display information generating part may disable the Web frame information generating part based on the terminal type information obtained from the reference path indicated in the second request, and generates the Web page that allows the terminal to directly access the Web information by a relative path for the Web information requested by the first request.

In the information processing apparatus, when the terminal is a terminal other than a PC, the frame information is not sent to the terminal. Instead, the Web page directly accessing the Web information is generated and sent to the terminal.

Moreover, the information processing apparatus may further include an image forming part forming an image; and an image formation controlling part controlling the image forming parts, wherein at least one of the Web information generating part and the other Web information generating parts obtains information concerning the image forming part from the image formation controlling part and generates the Web information based on the obtained information.

In the information processing apparatus, while succeeding to the terminal type information, it is possible to provide as the Web information a status of a device such as a plotter or a scanner, which is mounted to the information processing apparatus and forms an image.

Furthermore, the display information generating part may generate the Web page by additionally providing an image to the Web information or the other Web information generated by the Web information generating part or the other Web information generating parts, based on the terminal type information set based on the reference path in common.

In the information processing apparatus, for example, when the display screen of the terminal is smaller than that of a regular PC, the Web page is generated so as to display the Web information without an image.

Moreover, the display information generating part generates the Web page displaying the Web information or the other Web information generated by the Web information generating part or the other Web information generating parts, in a font size suitable for the terminal, based on the terminal type information set based on the reference path in common.

In the information processing apparatus, for example, when the display screen of the terminal is smaller than that of the regular PC, the Web page is generated so as to display the Web information in smaller fonts. When the display screen of the terminal is larger than that of the regular PC, the Web page is generated so as to display the Web information in bigger fonts.

Furthermore, the display information generating part may generate the Web page displaying the Web information or the other Web information generated by the Web information generating part or the other Web information generating parts, by a number of letters suitable for the terminal, based on the terminal type information set based on the reference path in common.

In the information processing apparatus, for example, when the display screen of the terminal is smaller than that of the regular PC, the Web page is generated so as to display the Web information by fewer letters. When the display screen of the terminal is larger than that of the regular PC, the Web page is generated so as to display the Web information by more letters in detail.

The above objects of the present invention are achieved by an information processing apparatus for providing the Web page displaying the Web information by corresponding to a language used at the terminal.

The above objects of the present invention are achieved by an information processing apparatus for providing the Web page displaying the Web information by corresponding to a profile of the user using at the terminal.

BRIEF DESCRIPTION OF THE DRAWINGS

In the following, embodiments of the present invention will be described with reference to the accompanying drawings.

FIG. 5A is a diagram showing a hash list and FIG. 5B is a diagram showing another hash list according to the first embodiment of the present invention;

FIG. 9 is a diagram showing a data structure of HTTP connection information according to the first embodiment of the present invention;

FIG. 11 is a diagram showing a header information list according to the first embodiment of the present invention;

FIG. 12 is a diagram showing a Web browser type—terminal type correspondence table according to the first embodiment of the present invention;

FIG. 13 is a diagram showing a Web browser—terminal type correspondence table according to the first embodiment of the present invention;

FIG. 14 is a diagram showing an example of a default HTML output according to the first embodiment of the present invention;

FIG. 17 is a diagram showing an example of a mainframe HTML output for a PC according to the first embodiment of the present invention;

FIG. 20 is a diagram showing an example of a process result described in XML by topPage.cgi according to the first embodiment of the present invention;

FIG. 21 is a diagram showing a description example of XSL for converting the process result from XML to HTML according to the first embodiment of the present invention;

FIG. 22 is a diagram showing a description example of HTML for the PC in that the process result of topPage.cgi is shown, according to the first embodiment of the present invention;

FIG. 24 is a diagram showing a description example of HTML for a PDA terminal where the process result of topPage.cgi is shown, according to the first embodiment of the present invention;

FIG. 30A and FIG. 30B are diagrams showing hash lists according to the second embodiment of the present invention;

FIG. 34 is a diagram showing a header information list according to the second embodiment of the present invention;

FIG. 35A is a diagram showing an accept language information, FIG. 35B is a diagram showing available language list, and FIG. 35C is a diagram showing an operation panel language stored in a predetermined storage area;

FIG. 36 is a diagram showing an example of the default HTML output according to the second embodiment of the present invention;

FIG. 39 is a diagram showing an example of the process result described in XML by netsetting.cgi according to the second embodiment of the present invention;

FIG. 40 is a diagram showing an example of the language resource according to the second invention of the present invention;

FIG. 41 is a diagram showing a description example of the style sheet for converting the process result from XML to HTML according to the second embodiment of the present invention;

FIG. 42 is a diagram showing a description example of the style sheet for converting the process result from XML to HTML according to the second embodiment of the present invention;

FIG. 43 is a diagram showing a description example of the style sheet for converting the process result from XML to HTML according to the second embodiment of the present invention;

FIG. 44 is a diagram showing an example of the network setting HTML in English showing the process result of netsetting.cgi, according to the second embodiment of the present invention;

FIG. 47 is a diagram showing an example of the system status HTML in Japanese showing the process result of sysstatus.cgi, according to the second embodiment of the present invention;

FIG. 54 is a diagram showing a correspondence between the profile information to set in the URL and the profile of the user according to the third embodiment of the present invention;

FIG. 55 is a diagram showing an example of the HTML response calling the network setting page for the system administrator according to the third embodiment of the present invention;

FIG. 56 is a diagram showing an example of the process result described in XML by netsetting.cgi according to the third embodiment of the present invention;

FIG. 57 is a diagram showing a description example of the style sheet for converting the process result from XML to HTML according to the third embodiment of the present invention;

FIG. 58 is a diagram showing a description example of HTML for the system administrator in that the process result of the netsetting.cgi is shown, according to the third embodiment of the present invention.

DESCRIPTION OF THE PREFERRED EMBODIMENTS

In the following, embodiments of the present invention according to an information processing apparatus will be described with reference to the accompanying drawings.

First Embodiment

An information processing apparatus according to a first embodiment of the present invention includes at least one of a plurality of different image forming functions such as a printer, a FAX, and a copier, and also provides information concerning the image forming functions by a plurality of Web applications. In the present invention, for the sake of convenience, a case in that information concerning a copying process and a plotter for conducting a copy will be mainly described. The information processing apparatus provides the information by a suitable size for a display screen of a terminal requesting the information.

Figure 1:
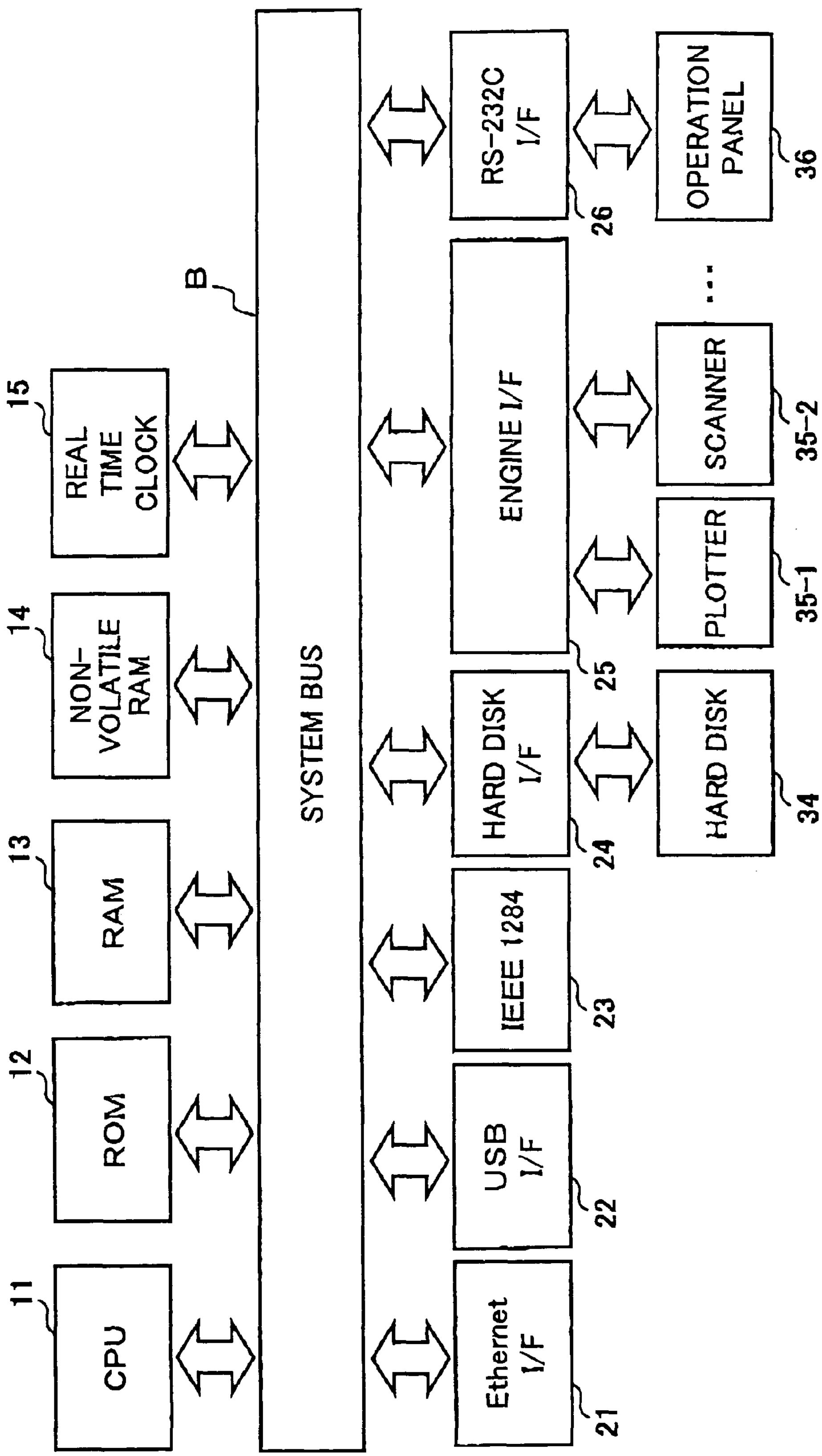
FIG. 1 is a block diagram showing a hardware configuration of an information processing apparatus according to a first embodiment of the present invention.

FIG. 1 is a block diagram showing a hardware configuration of the information processing apparatus according to the first embodiment of the present invention. In FIG. 1, the information processing apparatus 100 is controlled by a computer, and includes a CPU (Central Processing Unit) 11, a ROM (Read-Only Memory) 12, a RAM (Random Access Memory) 13, a non-volatile RAM 14, a real time clock 15, an Ethernet™ I/F (Interface) 21, a USB (Universal Serial Bus) 22, an IEEE 1284 (Institute of Electrical and Electronics Engineers 1284) 23, a hard disk I/F 24, an engine I/F 25, and an RS-232C I/F 26, which are mutually connected through a system bus B.

The CPU 11 controls the information processing apparatus 100 according to the programs stored in the ROM 12. For example, the RAM 13 includes an area to assign to each resource connected to one of the interfaces 21 through 26. The non-volatile RAM 14 stores information necessary for a process by the CPU 11 to control the information processing apparatus 100. The real time clock 15 clocks a present time, and also is used by the CPU 11 to synchronize the process.

The Ethernet™ I/F 21 is used to connect to an interface cable for the Ethernet™ I/F 21 such a 10 BASE-T or 100 BASE-TX. The USB I/F 22 is used to connect to an interface cable based on the USB standard. The IEEE1284 23 is used to connect to an interface cable based on the IEEE1284 standard.

The hard disk I/F 24 is used to connect to a hard disk 34. Document data concerning a document that is sent through a network to print or image data after a printing process is stored in the hard disk 34 through the hard disk I/F 24. The engine I/F 25 is used to connect to a plotter 35-1 for printing to a predetermined medium based on the document data and a scanner 35-2 for reading the image data. The RS-232C I/F 26 is used to connect to an operation panel 36 that displays information to a user or obtains information input or set by the user.

Next, a functional configuration of the information processing apparatus 100, which includes the hardware configuration as shown in FIG. 1, conducts a plurality of different image forming processes, and includes a plurality of Web applications, will be described with reference to FIG. 1.

Figure 2:
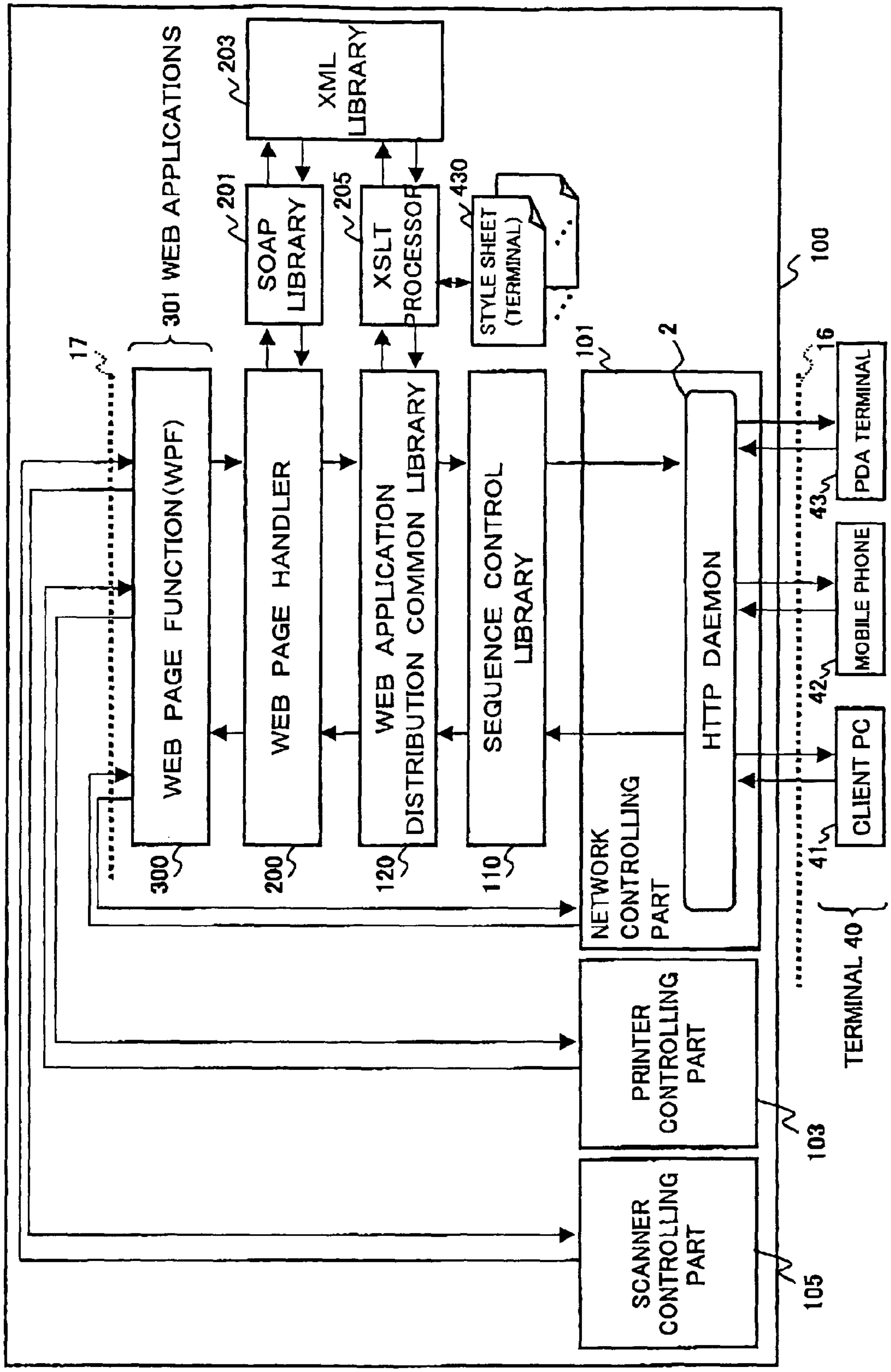
FIG. 2 is a block diagram showing a functional configuration of the information processing apparatus according to the first embodiment of the present invention.

FIG. 2 is a block diagram showing the functional configuration of the information processing apparatus according to the first embodiment of the present invention. In FIG. 2, the information processing apparatus 100 is capable of connecting to terminals 40 including a client PC 41, a mobile phone 42, and a PDA (Personal Digital Assistant) terminal 43, which have different utilization forms of a display screen. The information processing apparatus 100 is a computer to provide information as a response with respect to a request sent from each of the terminals 40.

The information processing apparatus 100 mainly includes a network controlling part 101, a sequence control library 110, a Web application distribution common library 120, a Web page handler 200, a SOAP (Simple Object Access Protocol) library 201, an XML (extensible Markup Language) library 203, an XSLT (XSL Transformations) processor 205, a Web page function (WPF) 300, a printer controlling part 103, and a scanner controlling part 105.

The network controlling part 101 includes at least an HTTP daemon 2 for conducting a communication control in accordance with an HTTP (Hyper Text Transfer Protocol). The network controlling part 101 receives the request from each terminal 40 and provides information as a response with respect to the request.

Figure 3:
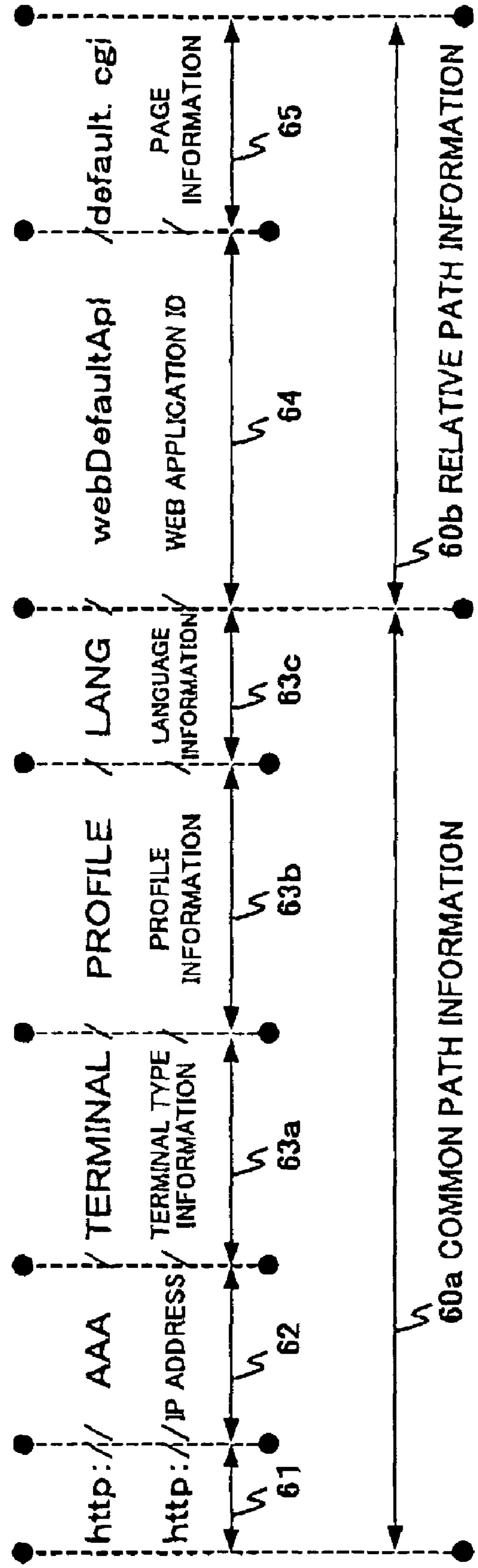
FIG. 3 is a diagram showing a URL configuration according to the first embodiment of the present invention.

In order to execute a predetermined process so as to succeed to attribute information showing attributes concerning a utilization form of a Web browser of the terminal 40 while a user conducts page transitions (browse one Web page linked from another Web page) among a plurality of Web applications 301, when the HTTP daemon 2 receives the request from the terminal 40, and additionally provides a temporary common path information, and a Web application ID and a CGI (Common Gateway Interface) which are referred to execute the predetermined process, to the URL indicated by the request. The HTTP daemon 2 adds necessary information and creates the URL as shown in FIG. 3. FIG. 3 is a diagram showing a URL configuration according to the first embodiment of the present invention. In FIG. 3, the URL is mainly formed by a common path information 60*a* and a relative path information 60*b*.

When the HTTF daemon 2 receives a first page request from the terminal 40, for example, only "http://AAA" is indicated as the URL. The HTTP daemon 2 additionally provides predetermined "/TERMINAL/PROFILE/LANG/webDefaultApl/defaul.cgi" to the URL.

For example, the URL formed as described above includes a protocol type 61 for specifying access means such as the http, an IP address 62 shown as "AAA", a terminal type information 63*a* shown as "TERMINAL", a profile information 63*b* shown as "PROFILE", a language information 63*c* shown as "LANG", a Web application ID 64 shown as "webDefaultApl", and page information 65 shown as "default.cgi".

The protocol type 61, the IP address 62, the terminal type information 63*a*, the profile information 63*b*, the language information 63*c* are set as the common path information 60*a*. After that, the common path information 60*a* is succeeded every time at the page transition, and is referred by the plurality of Web applications 301 being chained by the page transition. And the relative path information 60*b* is formed by the Web application ID 64 and the page information 65.

Referring to FIG. 2 again, explanation of each processing part will be continued.

The sequence control library 110 is a processing part that is shared with the plurality of Web applications 301 and handles by a predetermined sequence controlling process a difference between a process sequence of sending and receiving data through the Internet 16 and another process sequence of sending and receiving data to/from each of the Web applications 301.

The Web application distribution common library 120 is a processing part that is shared with the plurality of Web applications 301, and that analyzes a request from the terminal 40 and generates a response for the terminal 40. The Web application distribution common library 120 converts the response described in XML by the Web page handler 200 into the response described in a display format by HTML (HyperText Markup Language) corresponding to the terminal type of each terminal 40 by using the XSLT processor 205.

The Web page handler 200 is a processing part that converts a process language understandable for the Web applications 301 into another process language understandable in the communication control conducted with the terminal 40 for the request and the response. The Web page handler 200 calls one Web application 301 corresponding to the request via a CGI indicated by the request. Also, the Web page handler 200 sends a serialization request to the SOAP library 201 to serialize process result data provided from the Web page function 300.

The SOAP library 201 converts the process result data given by variables of C language into a description in XML so as to serialize the process result. In the first embodiment, serialization means to describe the process result provided from the Web page function 300 in XML.

The XML library 203 is used by the SOAP library 201 to serialize the process result by describing in XML. Also, the XML library 203 is used by the XSLT processor 205 to generate the process result described in HTML.

The XSLT processor 205 converts the process result described in XML into HTML by using the XML library 203 based on a style sheet 430 described in XSL (eXtensible Stylesheet Language) corresponding to the Web application 301 indicated by the request from the terminal 40. The style sheet 430 is prepared beforehand by corresponding to each Web application 301 and instructs a conversion method for each size of the display screens.

When the Web page function 300 is called from the Web page handler 200, for example, inquires the printer controlling part 103 or the scanner controlling part 105 mounted to the information processing apparatus 100 through an API (Application Program Interface) 17, obtains information showing a status of the plotter 35-1 or the scanner 35-2, and then provides the information to the Web page handler 200. Moreover, the Web page function 300 inquires the network controlling part 101 through the API 17, obtains information from the network controlling part 101, and provides the information to the Web page handler 200.

Figure 4:
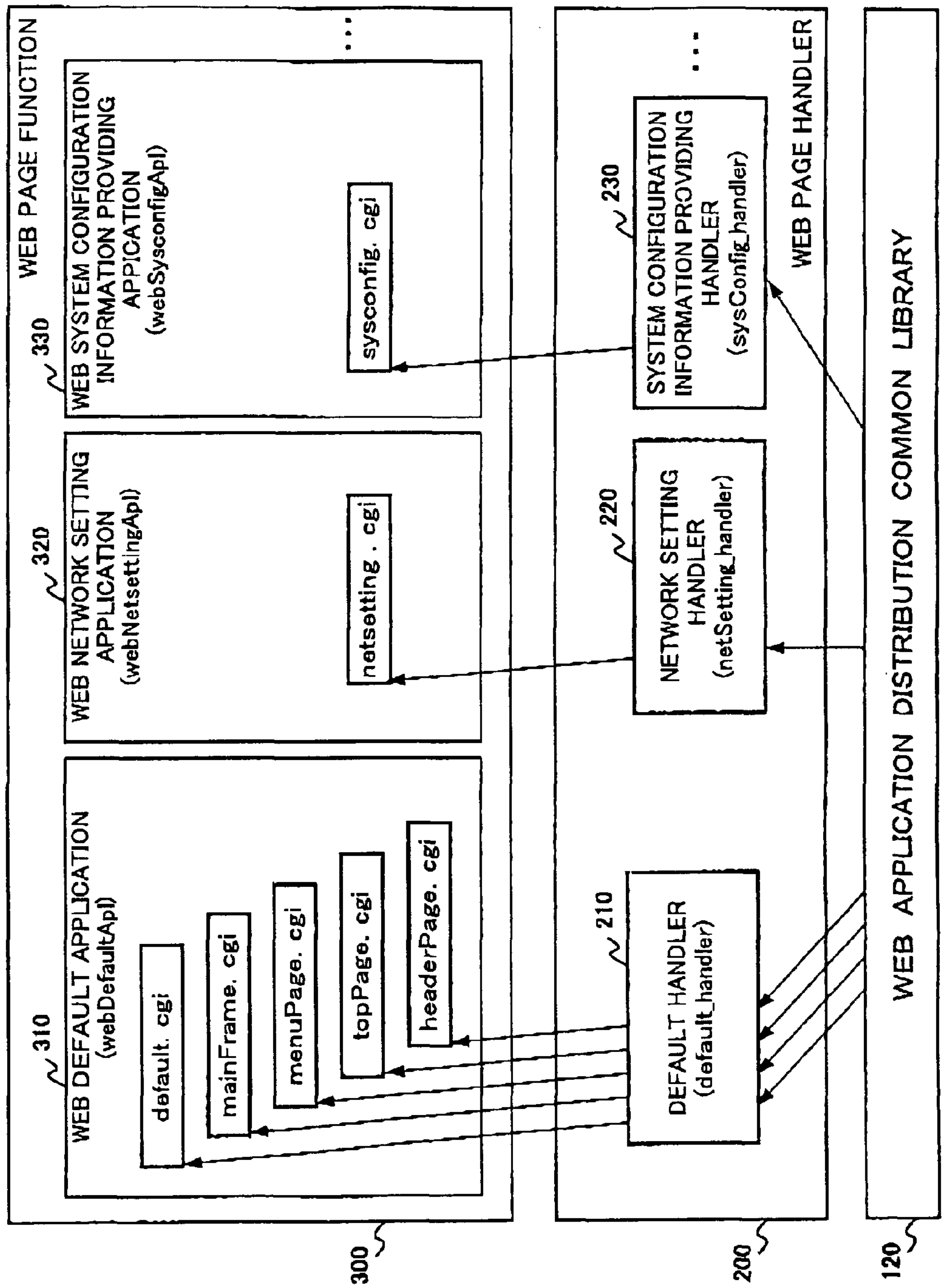
FIG. 4 is a block diagram for explaining an execution of Web applications according to the first embodiment of the present invention.

Next, a detailed configuration for executing the Web applications will be described with reference to FIG. 4, FIG. 5A and FIG. 5B. FIG. 4 is a block diagram for explaining an execution of the Web applications according to the first embodiment of the present invention. FIG. 5A and FIG. 5B are diagrams showing hash lists according to the first embodiment of the present invention. In FIG. 4, for example, in order to provide information based on the configuration of the URL as shown in FIG. 3, the Web page handler 200 includes a default handler 210 executed at a first request from the terminal 40, a network setting handler 220 executed by a page transition in accordance with the instruction from the terminal 40, a system configuration information providing handler 230 similarly executed by page transition, and a like.

Corresponding to the handlers in the Web page handler 200, respectively, the Web page function 300 includes the plurality of Web applications 301: a Web default application 310, a Web network setting application 320, a Web system configuration information providing application 330, and a like.

Until an initial display screen is displayed at the terminal 40, the default handler 210 sequentially calls the Web default application 310 through "default.cgi", "mainFrame.cgi", "manuPage.cgi", "topPage.cgi", and "headerPage.cgi" indicated by the page information 65 in accordance with a format of the URL shown in FIG. 3. As a result, for example, a status of the device such the plotter 35-1 or scanner 35-2 mounted in the information processing apparatus 100 is displayed at the terminal 40.

The network setting handler 220 calls a function for the Web network setting application 320 for setting up network setup information inputted by a user of the terminal 40 in the information processing apparatus 10. In addition, the system configuration information providing handler 230 calls the Web system configuration information providing application 330 so as to obtain a system configuration information of the information processing apparatus 100 in response to a request from the terminal 40.

The Web application distribution common library 120 obtains the Web application ID 64 from a URL, and refers to a hash list 50*a* shown in FIG. 5A. When the Web application ID 64 shows "webDefaultApl", the Web application distribution common library 120 executes "default_handler". In the same manner, when the Web application ID 64 shows another Web application ID, the Web application distribution common library 120 refers to the hash list 50*a*, and executes a handler corresponding to the Web application ID to be executed.

In addition, each of the handlers 210, 220, and 230 in the Web page handler 200 obtains the page information 65 from the URL, refers to the hash list shown in FIG. 5B, and calls a function corresponding to the page information 65. For example, when the page information 65 shows "default.cgi", "default( )" is obtained to call as a function. Similarly, when the page information 65 shows another CGI, each of the handlers 210, 220, and 230 refers to hash list 50*b* and obtains a function to call.

Moreover, in order to conduct the XSL conversion request which converts the process result described by XML to the XSLT processor 205 into HTML, the Web application distribution common library 120 obtains the page information 65 from the URL specified as a Web page function ID, and obtains a corresponding style sheet 430 by referring to the hash list 50*b* shown in FIG. 5B. For example, when the page information 65 shows "topPage.cgi", the Web application distribution common library 120 obtains "topPage.xsl" as a style sheet necessary for the XSL conversion from the hash list 50*b*. Similarly, when the page information 65 is another CGI, the Web application distribution common library 120 obtains a style sheet necessary for the XSL conversion by referring to the hash list 50*b*.

In FIG. 4, FIG. 5A, and FIG. 5B, when the page information 65, as the Web page function ID, of the URL is "default.cgi", the function default( ) is executed, and the terminal type of the terminal 40 is determined. Accordingly, the terminal type information of the URL which is temporarily created by the HTTP daemon 2 is replaced with the determined terminal type and the initial display screen where the URL showing the determined terminal type is set is created.

When the page information 65 is "mainFrame.cgi", a function mainFrame( ) is executed, and a predetermined CGI is set for each of frames forming the initial display screen. For example, the function mainFrame( ) generates information so as to configure a frame displaying a menu page, a frame displaying a top page, and a frame displaying a header page.

When the page information 65 is "menuPage.cgi", the function menuPage( ) is executed, and the information for creating a menu page is generated. When the page information 65 is "topPage.cgi", a function "topPage.cgi" is executed. For example, the information is generated so as to create a top page displaying a status of a printer as a status of the plotter 35-1. When the page information 65 is "headerpage.cgi", a function headerPage( ) is executed so as to generate information for creating the top page.

Moreover, when the page information 65 is "netsetting.cgi", a function netsetting( ) is executed so as to generate the information for creating a page for the system setting. When the page information 65 is "sysconfig.cgi", a function sysconfig( ) is executed, information showing a system configuration is generated.

For the sake of convenience, names of the Web application ID and the Web page handler are unified. But it is not limited to do so since the hash list 50*a* corresponds the Web application ID to the Web page handler. Also, names of the Web page function ID, the function, the style sheet are unified in the same manner. But it is not limited to do so since the hash list 50*b* corresponds the Web page function ID, the function, and the style sheet each other.

Figure 6:
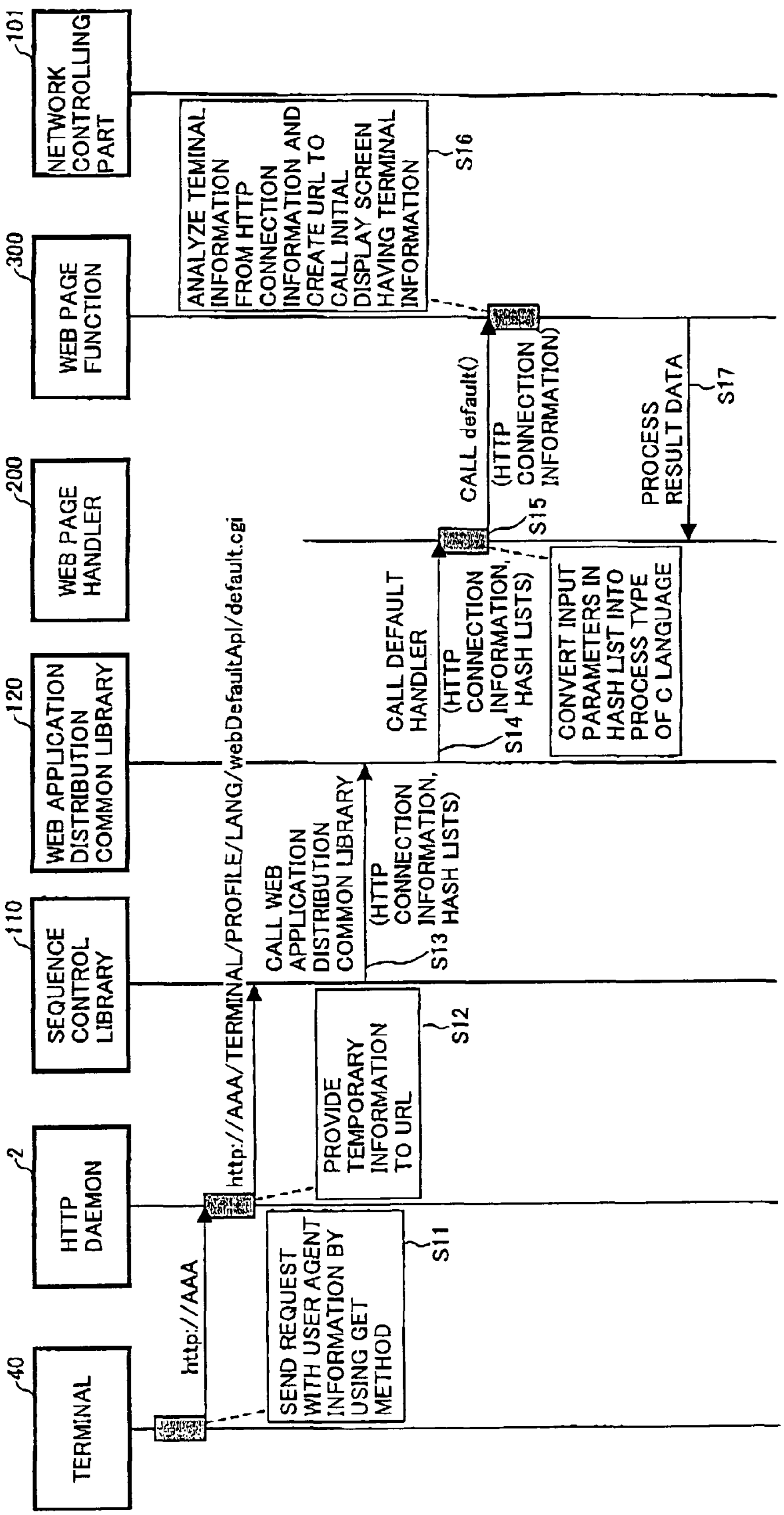
FIG. 6 is a diagram showing a process flow for default.cgi according to the first embodiment of the present invention.
Figure 7:
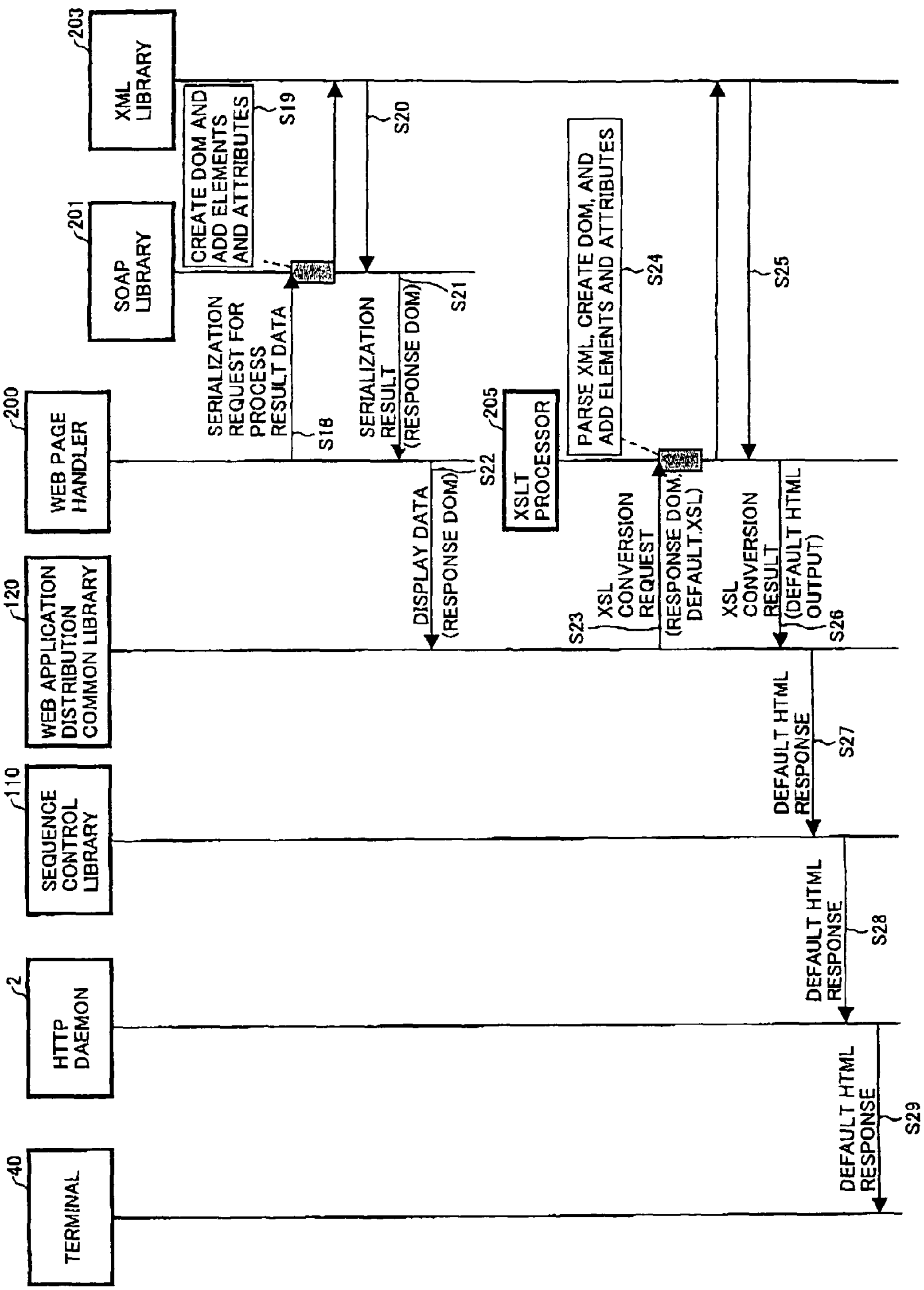
FIG. 7 is a diagram showing the process flow for default.cgi according to the first embodiment of the present invention.

Next, a process flow until information is provided with respect to the first request from the terminal 40 will be described FIG. 6 and FIG. 7 are diagrams showing the process flow for default.cgi according to the first embodiment of the present invention.

In FIG. 6, the terminal 40 sends a request additionally providing user agent information by using a GET method of the HTTP (step S11). For example, the terminal 40 sends the request by indicating a URL "http://AAA".

When the information processing apparatus 100 receives this request, the HTTP daemon 2 of the information processing apparatus 100 additionally provides the terminal type information 63*a*, the profile information 63*b*, the language information 63*c*, the Web application ID 64, the page information 65 to the URL "http://AAA", and then sends this request to the sequence control library 110 (step S12) For example, the HTTP daemon 2 additionally provides "TERMINAL" as the terminal type information 63*a*, "PROFILE" as the profile information 63*b*, "LANG" as the language information 63*c*, "webDefaultApl" as the Web application ID 64, and "default.cgi" as the page information 65, to the URL "http://AAA", so as to form "http://AAA/TERMINAL/PROFILE/LANG/webDefaultApl/default.cgi".

The sequence control library 110 calls the Web application distribution common library 120 (step S13). When calling the Web application distribution common library 120, the sequence control library 110 sets the HTTP connection information showing information concerning a connection with the terminal 40, and the hash lists 50*a* and 50*b* as arguments. In the following, the hash lists 50*a* and 50*b* are generically called hash lists That is, the hash lists include the hash lists 50*a* and 50*b* and other hash lists. The HTTP connection information uniquely specifies the connection with the terminal 40 until the connection is disconnected.

The Web application distribution common library 120 specifies and calls the default handler 210 ("default_handler") from the hash list 50*a*, as the Web page handler 200 corresponding to the Web application ID 64 showing "webDefaultApl" based on the URL generated by the HTTP daemon 2 (step S14).

In the Web page handler 200, the default handler 210 obtains the page information 65 showing "default.cgi" from the URL, and specifies and calls the function default( ) from the hash list 50*b* as the Web page function 300 corresponding to "default.cgi" (step S15). In this case, the HTTP connection information is set as the argument. For example, in a case in that the Web page function 300 is developed by C language, the Web page handler 200 converts into a process type of C language and then calls the function default( ).

By executing the function default( ), based on the HTTP connection information, terminal information is analyzed and a URL calling the initial display screen is created by including the common path information 60*a* determined by the function default( ) (step S16) A process result data including the URL is returned to the default handler 210 in the Web page handler 200 (step S17). In a process by default.cgi, the common path information 60*a* is determined, and a URL is determined by the common path information 60*a* and the relative path information 60*b* for determining a frame configuration of the initial display screen For example, "/pc/admin/ja" is determined as the common path information 60*a* and "/webDefaultApl/mainFrame.cgi" for dividing the initial display screen into a plurality of display areas by frames is determined as the relative path information 60*b*.

The default handler 210 sends a serialization request to the SOAP library 201 in order to describe the process result data in XML (Step S18) For example, the SOAP library 201 creates a DOM (Document Object Model) based on the process result data shown by a C language structure, additionally provides necessary elements and attributes (step S19), and describes the process result data in XML by the XML library 203 (step S20). The process result data described in XML is provided to the default handler 210 as the serialization result by the SOAP library 201 (step S21) In the Web page handler 200, the default handler 210 provides the serialization result as display data "Response DOM" to display at the terminal 40, to the Web application distribution common library 120 (step S22).

In order to convert the display data described in XML into a description of HTML corresponding to the terminal type of the terminal 40, the Web application distribution common library 120 refers to the hash list 50*b*, obtains the style sheet "default xsl" corresponding to the page information 65 showing "default.cgi", and sends the XSL conversion request to the XSLT processor 205 (step S23). The display data "Response DOM" and the style sheet "default.xsl" are set as arguments for the XSL conversion request.

When the XSLT processor 205 receives the XSL conversion request, the XSLT processor 205 executes the style sheet "default.xsl" indicated by the argument. Accordingly, the XSLT processor 205 analyzes syntax of the display data "Response DOM" described in XML (parse XML, creates a DOM, additionally provides elements and attributes (step S24), and converts into the description of HTML by using the XML library 203 (step S25). The XSLT processor 205 provides the description of HTML to the Web application distribution common library 120 as a XSL conversion result (step $26).

The process result described in HTML by the Web page function 300 when the page information 65 shows "default-.cgi" is output as a default HTML to the Web application distribution common library 120. In the default HTML, "mainFrame.cgi" is described in HTML to be called. The default HTML is output as a default HTML response.

The default HTML response is sequentially provided from the Web application distribution common library 120 to the sequence control library 110 (step S27) and is provided from the sequence control library 110 to the HTTP daemon 2 (step S28) After that, the default HTML response is sent as a response with respect to the request of the terminal 40 in step S11 by the HTTP daemon 2 (step S29). Then, the process flow for executing the Web default application 310 by the default.cgi is terminated.

In step S17, the common path information 60*a* is determined and simply the common path information 60*a* is added to the relative path information 60*b*. Accordingly, the Web default application 310 may describe the process result in HTML and output the process result described in HTML. Thus, steps S18 through S26 may be omitted.

Figure 8:
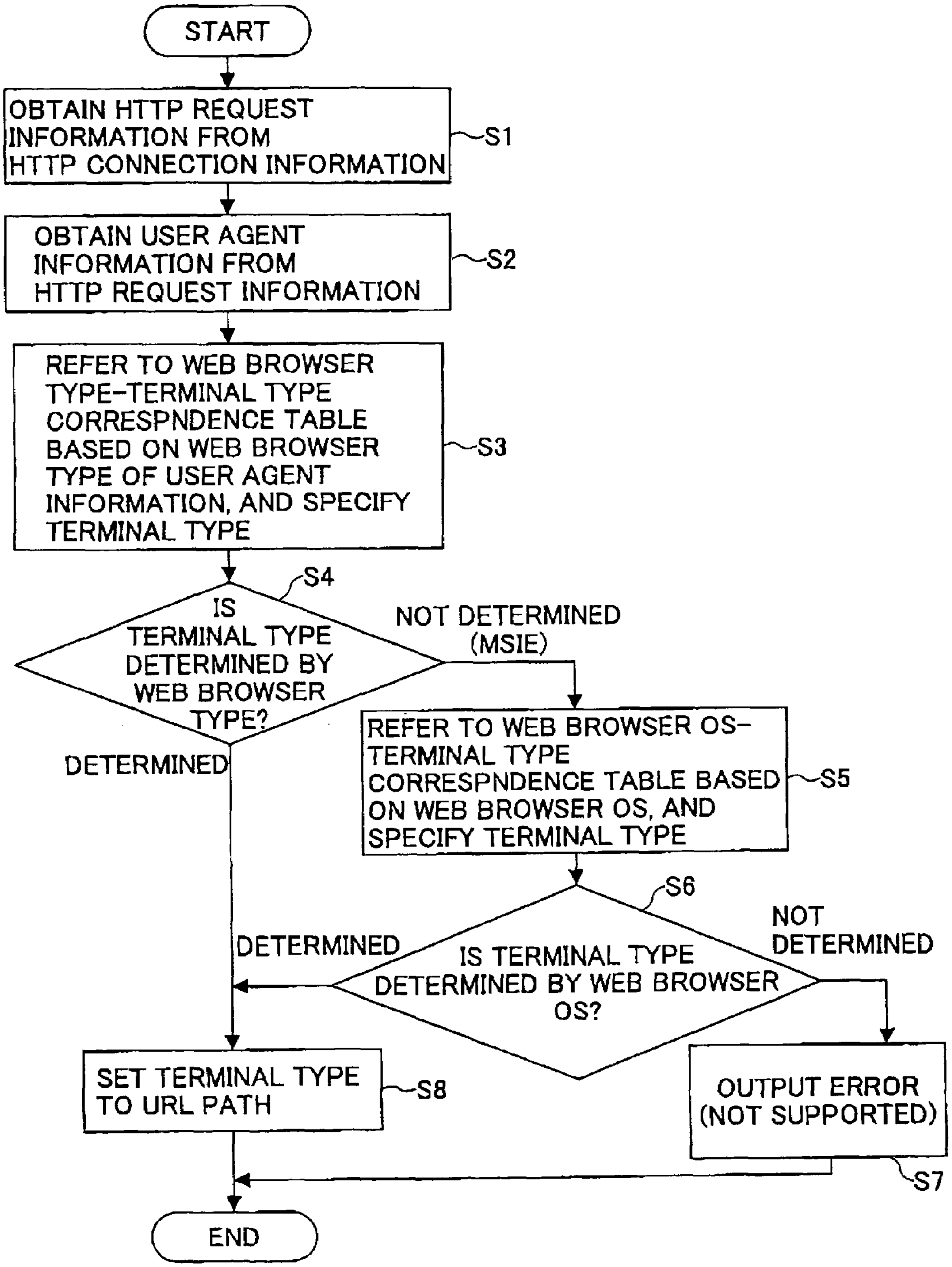
FIG. 8 is a flowchart diagram for explaining an analyzing process for terminal information according to the first embodiment of the present invention.
Figure 10:
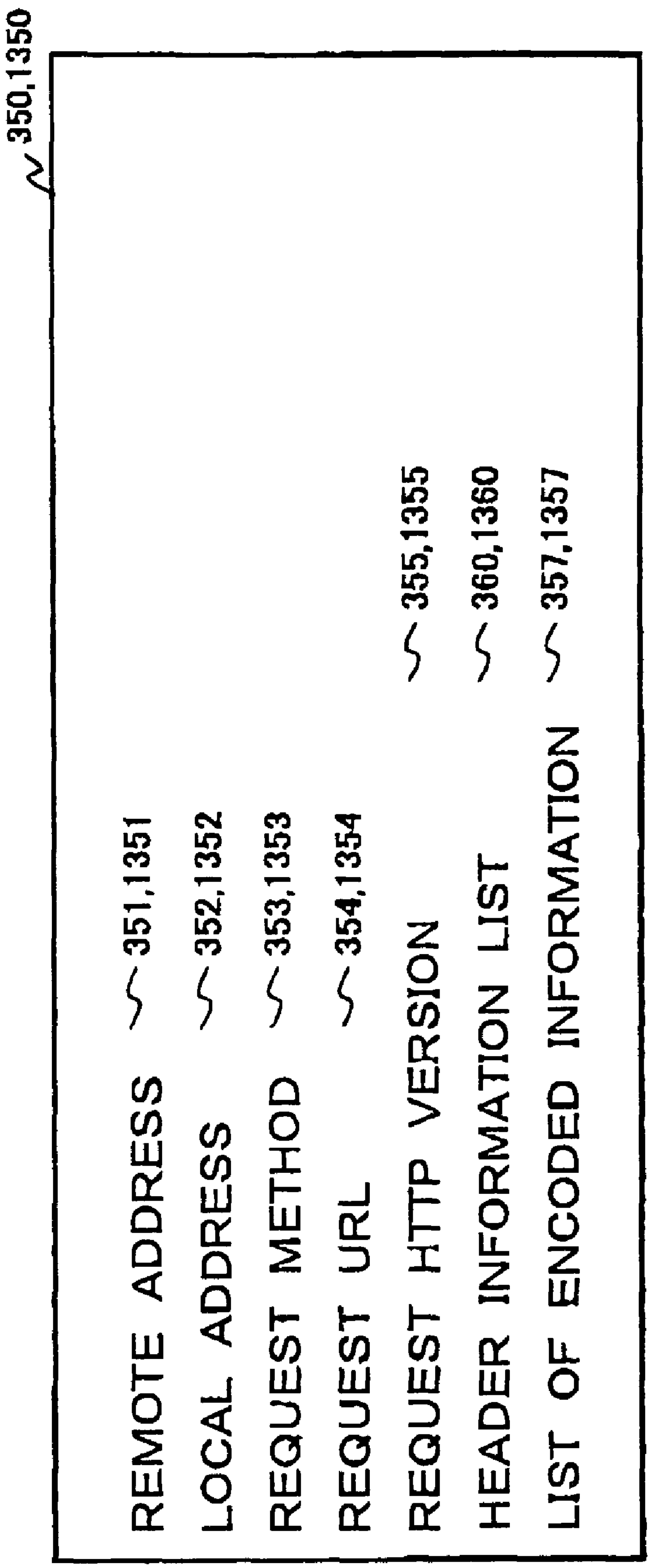
FIG. 10 is a diagram showing a data structure of HTTP request information according to the first embodiment of the present invention.

Next, an analyzing process for the terminal information executed by the function default( ) in step S16 shown in FIG. 6 will be described with reference to FIG. 8 through FIG. 11 in detail. FIG. 8 is a flowchart diagram for explaining the analyzing process for the terminal information according to the first embodiment of the present invention. FIG. 9 is a diagram showing a data structure of the HTTP connection information according to the first embodiment of the present invention. FIG. 10 is a diagram showing a data structure of the HTTP request information according to the first embodiment of the present invention. FIG. 11 is a diagram showing a header information list according to the first embodiment of the present invention. The data structures shown in FIG. 9 through FIG. 11 are referred by the analyzing process for the terminal information shown in FIG. 8.

Prior to explanation of the analyzing process in FIG. 8, each of the data structures shown in FIG. 9 through FIG. 11 will be described. In FIG. 9, the HTTP connection information 340 is information generated for each connection. In the HTTP connection information 340, a script 346 describing "HTTP_REQUEST_INFO*request" indicates a pointer to a content of the request from the terminal 40 and a script 347 describing "HTTP_RESPONSE_INFO*response" indicates a pointer to a content of the response for the terminal 40. The HTTP request information is stored in a area indicated by the pointer shown by the script 346, as shown in FIG. 10.

In FIG. 9, reference numerals 1340,1346, and 1347 will be referred in a second embodiment of the present invention.

In FIG. 10, the HTTP request information 350 includes a remote address 351 showing an address of the terminal 40 which sent the request, a local address 352 showing an host address at a side where the request is received, a request method 353 such as POST, GET, or a like, a request URL 354 showing an URL of the request, an HTTP version 355 of the request, a header information list 360, and a encoded information list 357.

In the request URL 354, the URL formed by the common path information 60*a* and the relative path information 60*b* as shown in FIG. 3 is set by the sequence control library 110. The HTTP request information 350 is provided to the Web page handler 200 and to the Web page function 300 at the same time of the HTTP connection information 340. Accordingly, the Web page handler 200 and the Web applications 301 share and refer to the common path information 60*a*.

In FIG. 10, reference numerals 1350, 1351, 1352, 1353, 1354, 1355, 1360, and 1357 will be referred in the second embodiment of the present invention.

And for example, the header information list 360 is structured as shown in FIG. 11. As shown in FIG. 11, the header information list 360 includes user agent information 365 showing "User-Agent: Mozilla/4.0(compatible; MSIE 6.0; Windows NT 5.0; Q312461; NET CLR 1.0.3705)". The user agent information 365 includes the terminal type of the terminal 40. Thus, this script of the user agent information 365 is analyzed, so as to provide information corresponding to the size of the display screen of the terminal 40.

In FIG. 8, in response to a call of the function( ), the Web default application 310 obtains the HTTP request information 350 from the HTTP connection information 340 (step S1). Moreover, the Web default application 310 obtains the user agent information 365 from the HTTP request information 350 (step S2). Then, based on a Web browser type of the user agent information 365, the Web default application 310 refers to a Web browser type—terminal type correspondence table (FIG. 12) and specifies the terminal type of the terminal 40 (step S3).

The Web default application 310 determines whether or not the terminal type is determined based on the Web browser type (step S4). When the terminal type is determined, the Web default application 310 goes to step S38. When the terminal type is not determined, the Web default application 310 refers to a Web browser OS—terminal type correspondence table based on the Web browser OS of the user agent information 365 and specifies the terminal type of the terminal 40 (step S5).

The Web default application 310 determines whether or not the terminal type is determined based on the Web browser OS (step S6). When the terminal type is not determined, the default application 310 outputs error information showing that the terminal type is not supported (step S7), and then the analyzing process for the terminal information is terminated. In step S7, the Web default application 310 sets a predetermined device type as the terminal type of the terminal 40, instead of outputting the error information showing that the terminal type is not supported, and then the Web default application 310 goes to step S8.

On the other hand, in steps 54 and S6, when the terminal type is determined, the Web default application 310 sets the terminal type to the terminal type information 63*a* of the URL (step S8), and then terminates the analyzing process for the terminal information.

FIG. 12 is a diagram showing the Web browser type—terminal type correspondence table according to the first embodiment of the present invention. In FIG. 12, the Web browser type—terminal type correspondence table 370 includes items of the Web browser type, the terminal type, and the like. The terminal type corresponding the Web browser type is managed in the Web browser type—terminal type correspondence table 370.

For example, as the Web browser type, "DOCOMO™", "xiino™", "MSPIE™", "HandHTTP™", "MSIE™", "Mozilla™", "mozilla/5™", and "Netscape6™" are managed in the Web browser type—terminal type correspondence table 370.

The terminal types are "IMODE™", "PDA", "0", "PC", and a like. The terminal type corresponding to the Web browser type "DOCOMO™" is "IMODE™". The terminal type corresponding to the Web browser type "xiino™", and "MSPIE™", "HandHTTP™" is "PDA". The terminal type corresponding to the Web browser type "Mozilla™", "mozilla/5™", and "Netscape6™" is "PC". The terminal types are not limited to the above-described terminal types but various terminal types can be managed.

The terminal type "0" denotes that the terminal type cannot be specified. In a determination process in step S4 of FIG. 8, the terminal type is not determined For example, in a case of a request from InternetExplorer™, generally, the Web browser type "MSPIE™" is set to the user agent information 365 when the terminal type is "PDA", and the Web browser type "MSIE™" is set to the user agent information 365 when the terminal type is "PC". However, even if the terminal type is "PDA", there is a case in that the Web browser "MSIE™" is set to the user agent information 365. Accordingly, since the terminal type corresponding to the Web browser type "MSIE™" cannot be specified beforehand, "0" is set to the terminal type for the Web browser type "MSIE™".

In a case in that the terminal type cannot be specified as described above, a correspondence table shown in FIG. 13 is referred to. FIG. 13 is a diagram showing the Web browser OS—terminal type correspondence table according to the first embodiment of the present invention In FIG. 13, the Web browser OS—terminal type correspondence table 380 includes items of the Web browser OS, the terminal type, and the like The Web browser OS corresponding to the terminal type is managed.

For example, as the Web browser OS, there are "Windows 3.1™", "Windows 95™", "Windows 98™", "Windows ME™", "Windows NT™", "Windows 2000™", "Windows XP™", "Mac 68K™", "Mac Power PC™", "Solaris™", "Linux™", "Free BSD™", "AIX™", "IRIX™", "HP™", "OS/2™", "Windows CE™", and a like.

There are "PDA", "PC", and a like as the terminal types. The mobile phone 42 is included in the terminal type "PDA". In the Web browser OS—terminal type correspondence table 380 shown in FIG. 13, the terminal type corresponding to the Web browser OS from "Windows 3.1™" to "OS/2™" is "PC". And the terminal type corresponding to the Web browser OS "Windows CE™", is "PDA".

The terminal type can be specified by referring to the Web browser type—terminal type correspondence table 370 and the Web browser OS—terminal type correspondence table 380.

The default HTML output by default.cgi will be described with reference to FIG. 14. FIG. 14 is a diagram showing an example of the default HTML output according to the first embodiment of the present invention. In FIG. 14, the default RTML 400 is not displayed at the terminal 40, but a script 401 that is Javascript™ calls the top page.

By a script 402 showing "self.document.cookie="cookieOnOffchecker=on; path=/ "", information concerning the Web browser of the terminal 40 is obtained. By a scrip 403 showing "self.location.pathname="/pc/admin/ja/webDefaultApl/main frame.cgi"", the terminal type "pc" is succeeded, and the Web default application 310 of the Web page function 300 is executed. That is, a mainframe HTML is requested by "mainframe.cgi". During a series of page transitions conducted by a user after that, an absolute path is indicated by a script 403 to be a reference for a relative path indicated by <a href> tag.

In a case in which information is provided to the client pc 41 through the Internet 16, the display screed is often divided into a plurality of display areas by frames. The default output is illustrated in such a case in FIG. 14. On the other hand, in a case in that the initial display screen is displayed without dividing into the plurality of display areas, for example, the script 403 describes "self location-.pathname="/pc/admin/ja/webDefaultApl/topPage.cgi"". The top page is directly called to provide and display information.

In the following, a process will be described in that information is provided corresponding to the terminal type of the terminal 40 in a case of dividing the display screen into the plurality of display areas by frames.

After that, when the page transition is conducted, only the relative path information 60*b* is indicated but the terminal type "PC" included in the common path information 60*a* is always succeeded. That is, the same common path information 60*a* is shared and referred by the plurality of the Web applications 301.

Figure 15:
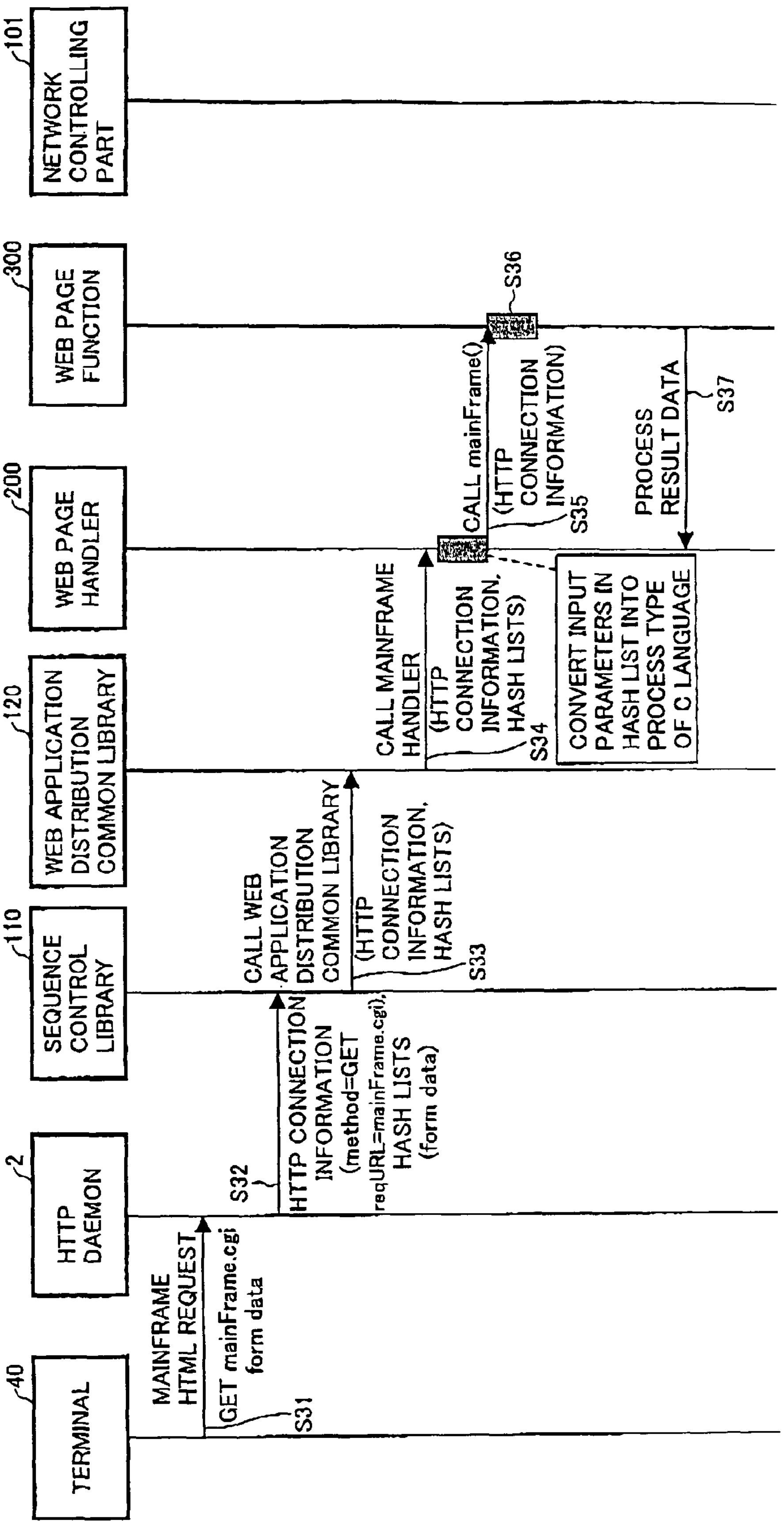
FIG. 15 is a diagram showing a process flow by mainFrame.cgi according to the first embodiment of the present invention.
Figure 16:
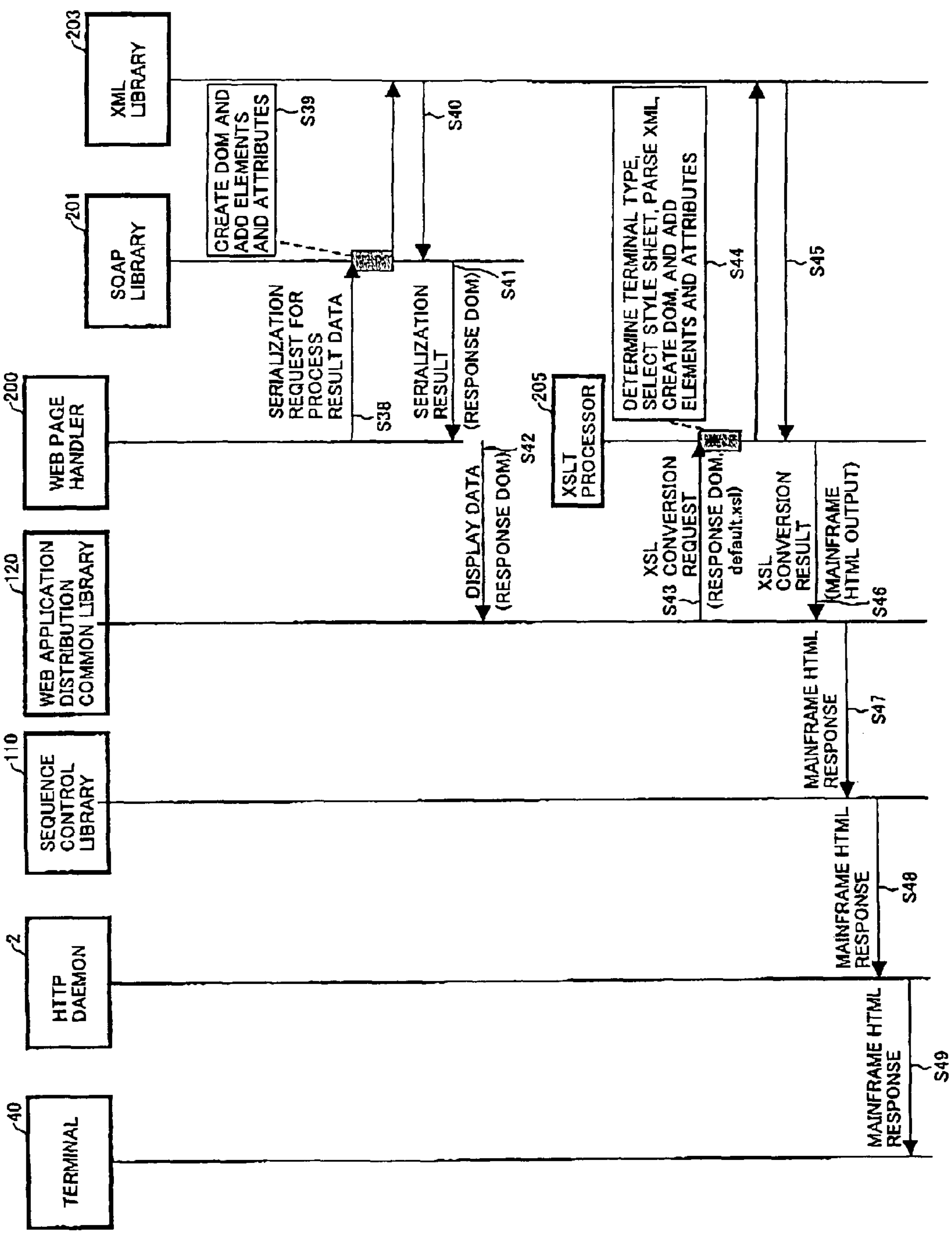
FIG. 16 is a diagram showing the process flow by mainFrame.cgi according to the first embodiment of the present invention.

FIG. 15 and FIG. 16 are diagrams showing a process flow by mainFrame.cgi according to the first embodiment of the present invention. In FIG. 15, the terminal 40 requests a mainframe HTML (mainfram HTML request) (step S31)

"/pc/admin/ja/webDefaultApl/mainFrame.cgi" is indicated, and the mainfram HTML request is conducted by a GET method attaching with form data. The HTTP daemon 2 of the information apparatus 100 sends the HTTP connection information 340 and the hash lists to the sequence control library 110 (step S32).

In this case, by the HTTP daemon 2, "GET" is set to the request method of the HTTP request information 350 related to the HTTP connection information 340, and "/pc/admin/ja/webDefaultApl/mainFrame.cgi" is set to the request URL 354. By this indication, when a next request is received from the terminal 40 by the relative path after that, the common path information 60*a* showing "/pc/admin/ja" can be referred Accordingly, it is easily determined that the terminal type of the terminal 40 is "PC." Also, the form data received from the terminal 40 is set to the hash lists by the HTTP daemon 2.

The sequence control library 110 calls the Web application distribution common library 120 (step S33) In this case, the sequence control library 110 sets the HTTP connection information showing information concerning the connection with the terminal 40 and the hash lists as arguments.

The Web application distribution common library 120 specifies and calls the default handler 210 ("default_handler") from the hash list 50*a* as the Web page handler 200 corresponding to the Web application ID 64 indicating "webDefaultApl" based on the URL (step S34).

In the Web page handler 200, the default handler 210 obtains the page information indicating "mainFrame.cgi" from the URL, and specifies and calls the function mainFrame( ) from the hash list 50*b* as the Web page function 300 corresponding to "mainFrame.cgi" (step S35). In this case, the HTTP connection information is set as an argument. For example, in a case in that the Web page function 300 is developed by C language, the Web page handler 200 converts into a process type of C language and calls the function mainFrame( ).

By executing the function mainFrame( ), frame information to form the initial display screen (topPage.cgi) is created (step S36). The frame information is sent to the default handler 210 in the Web page handler 200 as the process result data (step S37).

In the following, the serialization process for describing in XML in steps S38, S39, S40, S41, and S42 is the same as the serialization process in steps S18, S19, S20, S21, and 522 and explanation thereof will be omitted.

In order to convert the display data described in XML into a description in HTML corresponding the terminal type of the terminal 40, the Web application distribution common library 120 refers to the hash list 50*b*, obtains the style sheet "mainFrame.xsl" corresponding to the page information 56 indicating "mainFrame cgi", and conducts the XSL conversion request with respect to the XSLT processor 205 (step S43). In this case, the display date "Response DOM" and the style sheet "mainFrame.xsl" are set as the arguments.

When the XSLT processor 205 receives the XSL conversion request, the XSLT processor 205 executes the style sheet "mainFrame.xsl" indicated by the argument. Accordingly, the XSLT processor 205 selects one template corresponding to the terminal type from descriptions of the style sheet, analyzes a syntax of the display data "Response DOM" described in XML (parse XML), creates a DOM, additionally provides elements and attributes (step S44), and converts into the description of HTML by using the XML library 203 (step S45). When the terminal type information 63*a* shows "PC", HTML data for dividing the display screen into the plurality of display areas by frames is output. On the other hand, when the terminal type information 63*a* shows "PDA", HTML data described by JavaScript™ for directly calling the top page is output.

The XSLT processor 205 provides the description in HTML as the XSL conversion result to the Web application distribution common library 120 (step S46). The process result described in HTML by the Web page function 300 in a case in that the page information 65 shows "mainFrame.cgi" is output to the Web application distribution common library 120 as the mainframe HTML. The mainfram HTML is described in HTML so that "manuPage.cgi" is called from a frame forming the menu page, "topPage.cgi" is called from a frame forming the top page, and "headerPage cgi" is called from a frame forming the header page.

This mainframe HTML response is sequentially provided from the Web application distribution common library 120 to the sequence control library 110 (step S47) and from the sequence control library 110 to the HTTP daemon 2 (step S48) Accordingly, the mainframe HTML response is sent to the terminal 40 in response to the request of the terminal 40 in step S31 in accordance with HTTP by the HTTP daemon 2 (step S49). Then, the process flow executed by the mainFrame.cgi is terminated.

A mainframe HTML output by mainFrame.cgi in a case in that the terminal 40 is the client PC 41 will be described with reference to FIG. 17. FIG. 17 is a diagram showing an example of the mainframe HTML output for the PC according to the first embodiment of the present invention. In FIG. 17, the mainframe HTML 410 creatges three frames on the Web browser of the terminal 40 by a script 411, and a page from each <frame> tag is called through a CGI.

A script 412 showing <frame noresize src="/webDefaultApl/headerPage.cgi" name="header" marginheight="0" marginwidth="0" scrolling="no"> displays the header page in a frame. By a script 413 showing "/webDefaultApl/headerPage.cgi", the default handler 210 is executed based on "webDefaultApl", the function headerPage( ) of the Web default application 310 is executed based on "headerPage.cgi", and then the header page is displayed in the frame.

Also, a script 414 showing <frame src="/webDefaultApl/menuPage.cgi" name="menu"marginheight="0" marginwidth="0" scrolling="auto">displays the menu page in a frame. By a script 415 showing "/webDefaultApl/menuPage.cgi", the default handler 210 is executed based on "webDefaultApl", the function menuPage( ) of the Web default application 310 is executed based on "menuPage.cgi"; and the menu page is displayed in the frame.

Furthermore, a script 416 showing <frame src="/webDefaultApl/topPage.cgi" name="top" marginheight="0" marginwidth="0" scrolling="auto">displays the top page in a frame. By the script 417 showing "/webDefaultApl/topPage.cgi", the default handler 210 is executed based on "webDefaultApl", the function topPage( ) of the Web default application 310 is executed based on "topPage.cgi", and the top page is displayed in the frame. Since the scripts 412, 414, and 416 indicates only relative path information 60*b*, the common path information 60*a* is indicated by the URL.

In FIG. 17, when the terminal 40 is the mobile phone 42 or the PDA terminal 43, the mainframe HTML may be created so as to call only topPage.cgi without structuring frames For example, in the mainframe HTML, similar to the description of the default HTML output shown in FIG. 14, jumpToTopPage( ) may be described so as to directly call topPage.cgi by "self.location.pathname="/pda/admin/ja/webDefaultApl/top Page.cgi"", instead of describing jumpToMainFrame( ).

Figure 18:
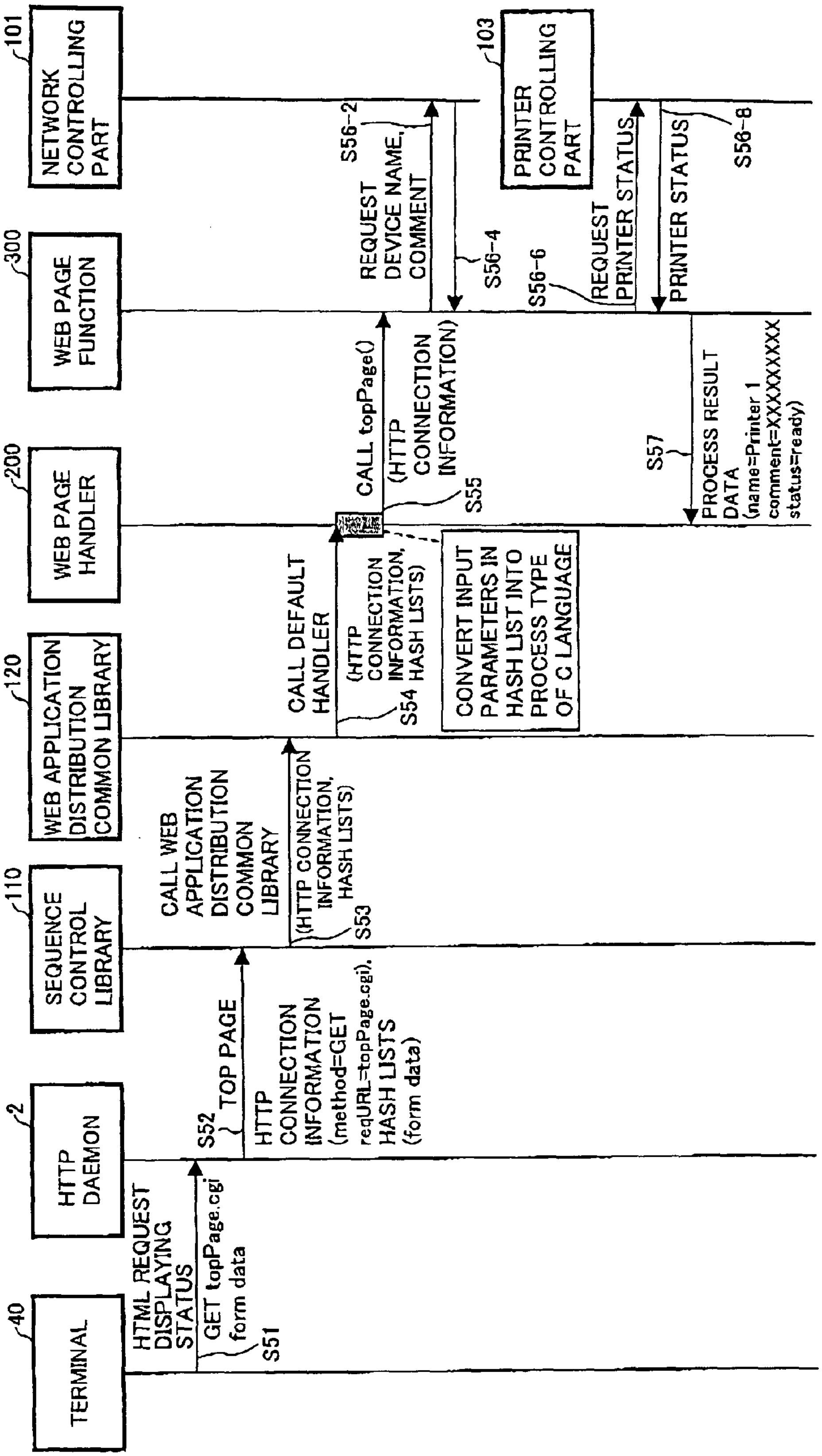
FIG. 18 is a diagram showing a process flow by topPage.cgi according to the first embodiment of the present invention.
Figure 19:
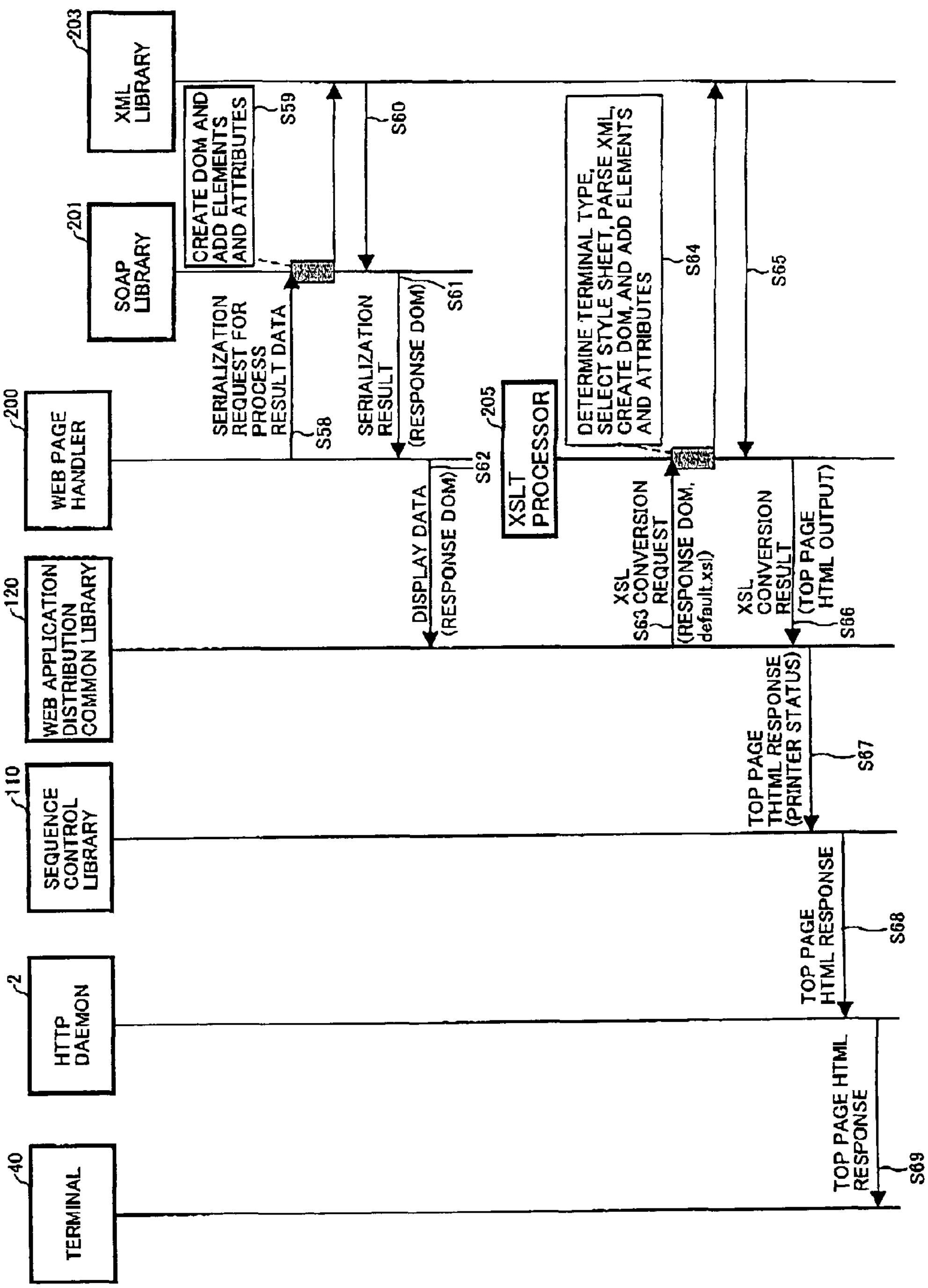
FIG. 19 is a diagram showing the process flow by topPage.cgi according to the first embodiment of the present invention.

FIG. 18 and FIG. 19 are diagrams showing a process flow by topPage.cgi according to the first embodiment of the present invention In FIG. 18, the terminal 40 requests an HTML for displaying a status of the plotter 35-1 or the scanner 350-2 mounted to the information processing apparatus 100 (top page HTML request) (step S51). The top page HTML request is conducted by the GET method in which "topPage.cgi" is indicated and the form data is attached.

The HTTP daemon 2 of the information processing apparatus 100 sends the HTTP connection information 340 and the hash lists to the sequence control library 110 (step S52) In this case, the HTTP daemon 2 sets "GET" to the request method of the HTTP request information 350 related to the HTTP connection information 340, and indicates "topPage.cgi" to the URL of the request. In addition, the HTTP daemon 2 sets the form data received from the terminal 40 to the hash lists.

The sequence control library 110 calls the Web application distribution common library 120 (step S53) In this case, the sequence control library 110 sets the HTTP connection information and the hash lists as arguments.

The Web application distribution common library 120 specifies and calls the default handler 210 ("default_handler") from the hash list 50*a* as the Web page handler 200 corresponding to the Web application ID 64 showing "webDefaultApl" based on the URL (step S54).

In the Web page handler 200, the default handler 210 obtains the page information 65 showing "topPage.cgi", and specifies and calls the function topPage( ) from the hash list 50*b* as the Web page function 300 corresponding to "topPage.cgi" (step S55). In this case, the HTTP connection information 340 is set as an argument.

For example, in a case in that the Web page function 300 is developed by C language, the Web page handler 200 converts into a process type of C language and calls the function topPage( ).

By executing the function topPage( ), the Web default application 310 requests information including a device name, a comment, and a like to the network controlling part 101 through the API 17, in order to display the status of a device (for example, plotter 35-1 as the printer) at the initial display screen (topPage.cgi) (step S56-2). The network controlling part 101 provides the information including the device name, the comment, and the like in response to the request (step S56-4).

For example, the Web default application 310 of the Web page function 300 requests the status of the printer to the printer controlling part 103 through the API 17 (printer status request) (step S56-6). The printer controlling part 103 provides the status of the plotter 35-1 as a printer status to the Web default application 310 (step S56-8).

Then, the Web default application 310 provides the printer status, and the terminal type information 63*a*, the profile information 63*b* and the language information 63*c* from the request URL 354 of the HTTP request information 350 as the process result data to the default handler 210 in the Web page handler 200 (step S57).

In the following, the serialization process for describing in XML in steps S58, S59, S60, S61, and S62 is the same as the serialization process in steps S18, S19, S20, S21, and S22, and explanation thereof will be omitted.

In order to convert the display data described in XML into a description of HTML corresponding to the terminal type of the terminal 40, the Web application distribution common library 120 refers to the hash list 50*b*, obtains the style sheet "topPage.xsl" corresponding to the page information 56 showing "topPage.cgi", and conducts the XSL conversion request with respect to the XSLT processor 205 (step S63). In this case, the display data "Response DOM" and the style sheet "topPage.sl" are set as arguments. When the XSLT processor 205 receives the XSL conversion request, the XSLT processor 205 executes the style sheet "topPage.xsl" indicated in the argument. Accordingly, the XSLT processor 205 selects one template corresponding to the terminal type from descriptions of the style sheet, analyzes a syntax of the display data "Response DOM" described in XML (parse XML), creates a DOM, additionally provides elements and attributes (step S64), and converts into the description of HTML by using the XML library 203 (step S65).

XSLT processor 205 provides the description of HTML as the XSL conversion result to the Web application distribution common library 120 (step S66).

The process result described in HTML by the Web page function 300 in a case in that the page information 65 is "topPage.cgi" is output to the Web application distribution common library 120 as a top page HTML. Information concerning the status of the plotter 35-1 is described in the top page HTML.

This top page HTML response is provided from the Web application distribution common library 120 to the sequence control library 110 (step S67), and then is provided from the sequence control library 110 to the HTTP daemon 2 (step S68). Subsequently, the HTTP daemon 2 sends the top page HTML response as a response in accordance with HTTP with respect to the request sent from the terminal 40 in step S51 (step S69) Then, the process flow executed by topPage.cgi is terminated.

When the terminal 40 is the client PC 41, processes by headerPage.cgi and manuPage.cgi called from frames are executed in the same manner described above. Accordingly, the display screen divided by frames is displayed at the Web browser of the client PC 41. On the other hand, when the terminal 40 is the mobile phone 42 or the PDA terminal 43, since the display screen is not divided by the frames, only the top page is displayed at the display screen.

The process result described in XML will be described. FIG. 20 is a diagram showing an example of the process result described in XML by topPage.cgi according to the first embodiment of the present invention.

In an XML 420 shown in FIG. 20, the process result by the function topPage( ) of the Web default application 310 is shown by a script 421 showing from <networkResponse>to </networkResponse>. A script 422 showing <terminal>pc</terminal> shows that the terminal 40 is the client PC 41, a script 423 showing <language>ja</language> shows that a language of the Web browser of the terminal 40 is Japanese, and a script 424 showing <profile>admin</profile> shows that the user of the terminal 40 is an administrator. The scripts 422 through 424 show information based on the terminal type information 63*a*, the profile information 63*b*, and the language information 63*c* of the common path information 60*a* of the URL.

A script 425 showing <deviceName>Printer 1</deviceName> shows that the device name is "Printer 1". A script 426 showing <comment>XXXXXXXXX</comment> shows that the comment concerning "Printer 1" are "XXXXXXXXX". A script 427 showing <status>Ready</status> shows that the status of "Printer 1" is "Ready".

In the first embodiment, the Web page handler 200 includes a function for serializing the process result data provided from the Web page function 300 by describing in XML. Accordingly, each of Web applications 301 of the Web page function 300 is not required to include a processing part for each terminal type.

The style sheet 430, which converts the process result data described in XML to be serialized, into HTML by the XSLT processor 205 based on the terminal type, will be described with reference to FIG. 21. FIG. 21 is a diagram showing a description example of the style sheet for converting the process result from XML to HTML according to the first embodiment of the present invention.

In the style sheet 430 shown in FIG. 21, it is determined by a script 431 whether or not an element sandwiched with <terminal> tags shown by a script 422 of the XML 420 of FIG. 20 includes a character string "pda", that is, it is determined whether or not the XML 420 is the process result for the PDA terminal. A style sheet template for the PDA terminal is applied by a script 432 when the character string "pda" is included. Another style sheet template for the general PC is applied when the character string "pda" is not included. The style sheet template for the PDA terminal is described in a script 434, and the style sheet template for the general PC is described in a script 435. Details of each style sheet template are not shown in FIG. 21.

For example, in a case in that a smaller size of the display screen of the mobile phone 42 or the PDA terminal 43 is concerned, the script 434 may describes the style sheet template for the PDA terminal so that images to display at the client PC 41 are not be displayed, a font size is indicated to be smaller than the PC, or the number of letters is indicated to be less than the PC.

According to the first embodiment, the Web application distribution common library 120 includes a function for converting XML into HTML by XSL Therefore, it is possible to centralize to create an HTML response corresponding to the terminal type. Therefore, each of Web applications 301 in the Web page function 300 is not required to include processing parts corresponding to various terminal types, respectively.

As described above, XSL for converting XML into HTML is prepared for each of Web applications 301 beforehand HTML showing the process result corresponding each of Web applications 301 is provided to the terminal 40, and then the process result is displayed at the Web browser of the terminal 40.

When the terminal 40 is the client PC 41, for example, the process result of the function topPage( ) of the Web default application 310 is described in HTML as shown in FIG. 22. FIG. 22 is a diagram showing a description example of HTML for the PC in that the process result of the topPage.cgi is shown, according to the first embodiment of the present invention. In FIG. 22, HTML 440 for the PC is provided to the terminal 40 when the terminal 40 is the client PC 41, and the process result of the function topPage( ) of the Web default application 310 is displayed at the Web browser of the client PC 41 by a script 441.

A script 442 showing <font size="4">System Status</font> shows to display "System Status" by a font size 4. A script 443 showing <img src="printer.gif"> shows to display an image. A script 445 showing <p>System Name:Printer 1</p> shows to display "SystemName:Printer 1", a script 446 showing <p>Comment:XXXXXXXXX</p> shows to display "Comment:XXXXXXXXX", and a script 447 showing <p>System Status:Ready</p> shows to display "System Status:Ready".

Figure 23:
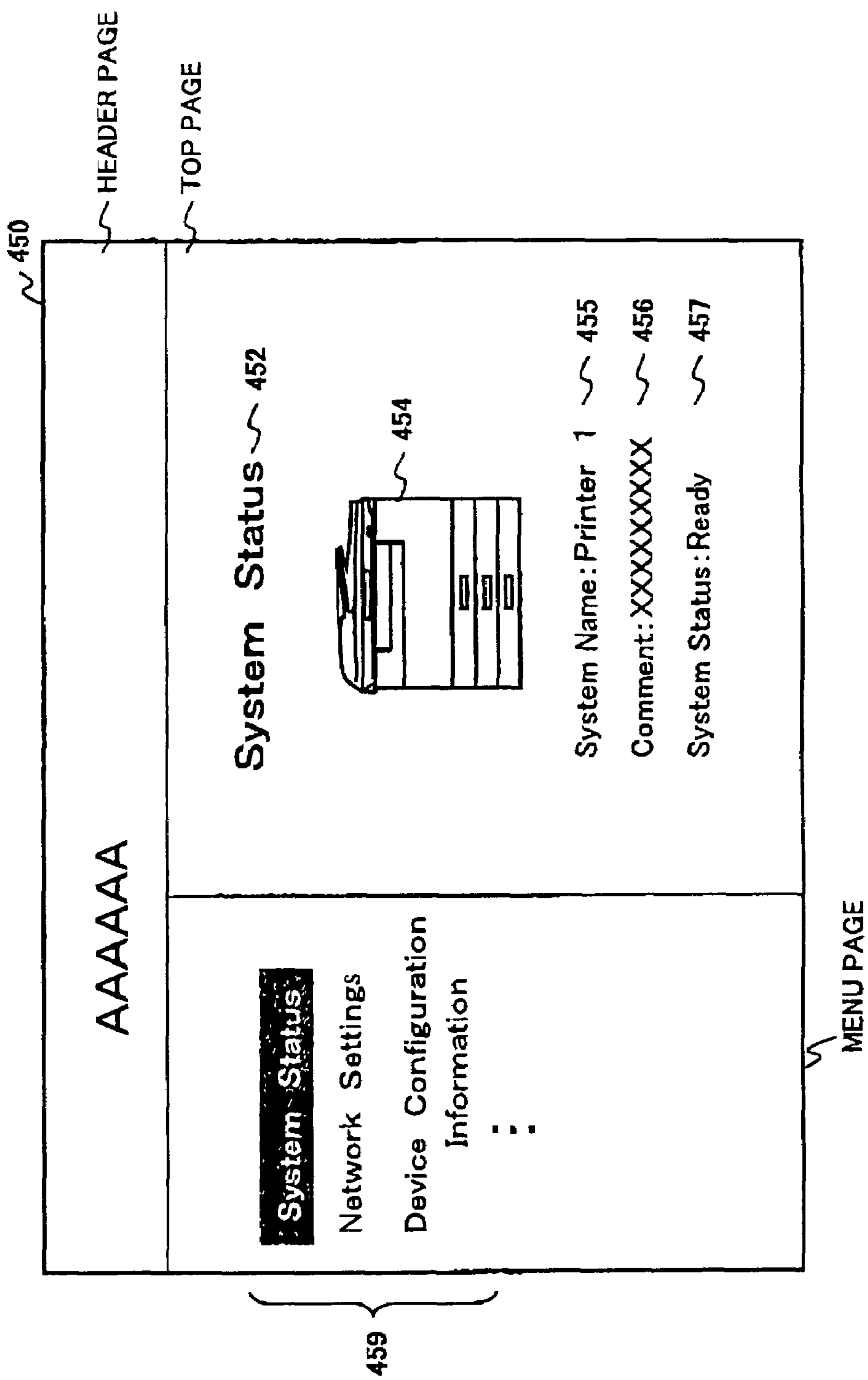
FIG. 23 is a diagram showing a display example of a system status at the client PC according to the first embodiment of the present invention.

In accordance with HTML 440 for the PC, the display screen as shown in FIG. 23 is displayed at the Web browser of the client PC 41. FIG. 23 is a diagram showing a display example of the system status at the client PC according to the first embodiment of the present invention. In FIG. 23, a display screen 450 is formed by three frames by mainFrame.cgi. The header page is displayed by headerPage.cgi, the menu page is displayed by menuPage.cgi, and the top page is displayed by topPage.cgi in three frames, respectively.

In the top page, a text 452 showing "System Status" is displayed by the script 442 of HTML 240 of FIG. 22, an image 454 is displayed by the script 444 of FIG. 22, a text 455 showing "System Name:Printer 1" is displayed by the script 445 of FIG. 22, a text 456 showing "Comment: XXXXXXXXX" is displayed by the script 446 of FIG. 22, and a text 457 showing "System Status:Ready" is displayed by the script 447 of FIG. 22.

In addition, for example, information as a header is displayed in the frame for displaying the header page. For example, texts 459 showing selectable menu items including "System Status", "Network Settings", "Device Configuration Information", and a like are displayed in the frame for displaying the menu page.

For example, "Network Settings" is described in HTML as<p><a href=". . . /webNetsettingApl/netsetting.cgi" target="top">Network Settings</a></p>. Since only the relative path information 60*b* is set in this URL, the common path information 60*a* is succeeded as it is and information concerning "Network Settings" is displayed in the top page for the PC. That is, a path description from "webNetsettingApl" showing Web application ID is set as the relative path, and a current terminal type information 53*a* is succeeded by a description ". . . /". Also, the information concerning "Network Settings" is displayed in the top page for the PC by a description "target="top"".

Similarly, "Device Configuration Information" is described in HTML as "<p><a href=". . . /webSysconfigApl/sysconfig.cgi" target="top">Device Configuration Information</a></p>". Accordingly, since only the relative path information 60*b* is set in this URL, the common path information 60*a* is succeeded as it is and information concerning "Device Configuration Information" is displayed for the PC.

Figure 25:
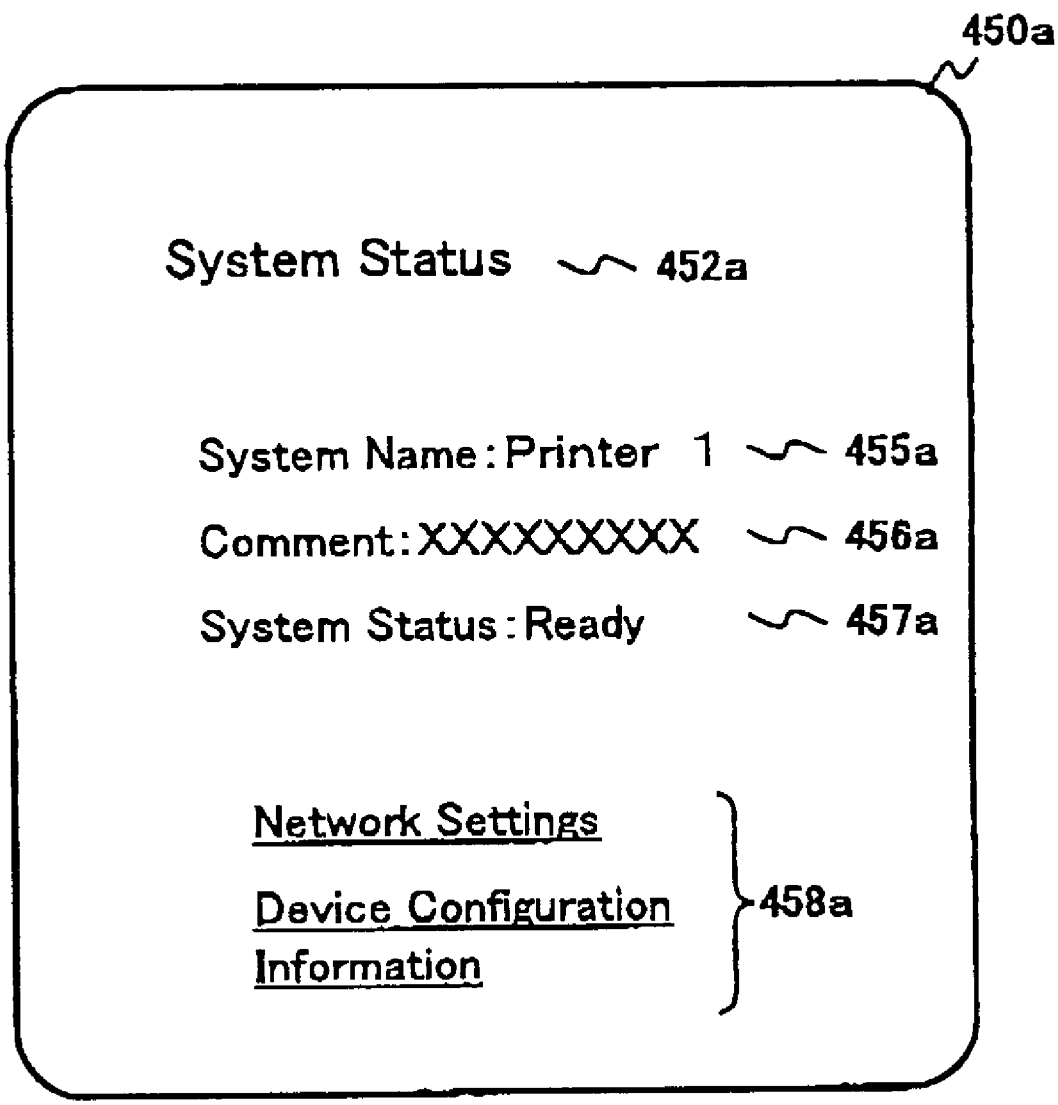
FIG. 25 is a diagram showing a display example of the system status at a PDA terminal according to the first embodiment of the present invention.

In a case in that the client PC 41 sends a request to the information processing apparatus 100 according to the present invention, display screen 450 is shown at the client PC 41 However, in a case in that the mobile phone 42 or the PDA terminal 43 sends the same request to the information processing apparatus 100, HTML for the PDA terminal as shown in FIG. 24 is created and the display screen as shown in FIG. 25 is displayed at the PDA terminal 43, FIG. 24 is a diagram showing a description example of HTML for the PDA terminal where the process result of topPage.cgi is shown, according to the first embodiment of the present invention. In FIG. 24, HTML 440*a* for the PDA terminal is provided to the terminal 40 when the terminal 40 is the PDA terminal 43, and then the process result of the function topPage( ) of the Web default application 310 is displayed at the Web browser of the PDA terminal 43 by a script 441*a*. A script 442*a* showing <font size="3">System status</font> shows to display "System Status" by a font size 3. The character font or a script 442*a* is set smaller for the PDA terminal.

The HTML 440*a* for the PDA terminal does not include a script corresponding to the script 443 of HTML 440 of the client PC 41.

Similar to the scripts 445 and 446 of HTML 440 for the PC, a script 445*a* showing <p>System Name:Printer 1</p> shows to display "System Name:Printer 1", and a script 446*a* showing <p>Comment:XXXXXXXXX</p> shows to display "Comment:XXXXXXXXX".

For the PDA terminal 43 which display area is relatively smaller than the client PC 41, for example, a script 447*a* corresponding to the script 447 of HTML 440 for the PC displays "Status:Ready", instead of "System Status:Ready", so that the number of letters to display is less than the PC.

It is not preferred to divide the display screen into the plurality of display areas for the PDA terminal 43 Therefore, information displayed at other frames at the client PC 41 should be displayed within a single display screen (one page) at the PDA terminal 43. A script 448*a* is a script described in HTML for displaying the menu page at the PC, and is described in HTML 440*a* for the PDA terminal as "<p><a href=". . . /webNetsettingApl/netsetting.cgi">Network Settings</a></p>" and "<p><a href=". . . /webSysconfigApl/sysconfig.cgi">Device Configuration Information</a></p>". Therefore, "Network Settings" and "Device Configuration Information" of selectable items displayed in the menu page of the client PC is displayed at the PDA terminal 43. "target="top" is described in HTML 440 for the PC to indicate the frame to display. However, "target="top" is omitted in the script 448*a*.

A display screen as shown in FIG. 25 is displayed at the Web browser of the PDA terminal 43 by HTML 440*a* for the PDA terminal. FIG. 25 is a diagram showing a display example of the system status at the PDA terminal according to the first embodiment of the present invention. In FIG. 25, a display screen 450*a* is formed by a single display screen which is not divided into the plurality of display areas by frames.

A text 452*a* showing "System Status" is displayed at the display screen 450*a* by the script 442*a* of HTML 240*a* shown in FIG. 24. The image displayed at the client PC 41 is not displayed at the PDA terminal 43 and a text 455 showing "System Name:Printer 1", is displayed by the script 445*a*. A text 456*a* showing "Comment:XXXXXXXXX" is displayed by the script 446*a*. A text 457*a* showing "Status: Ready", which number of letters is less than that displayed at the client PC 41, is displayed by the script 447*a*.

Figure 26:
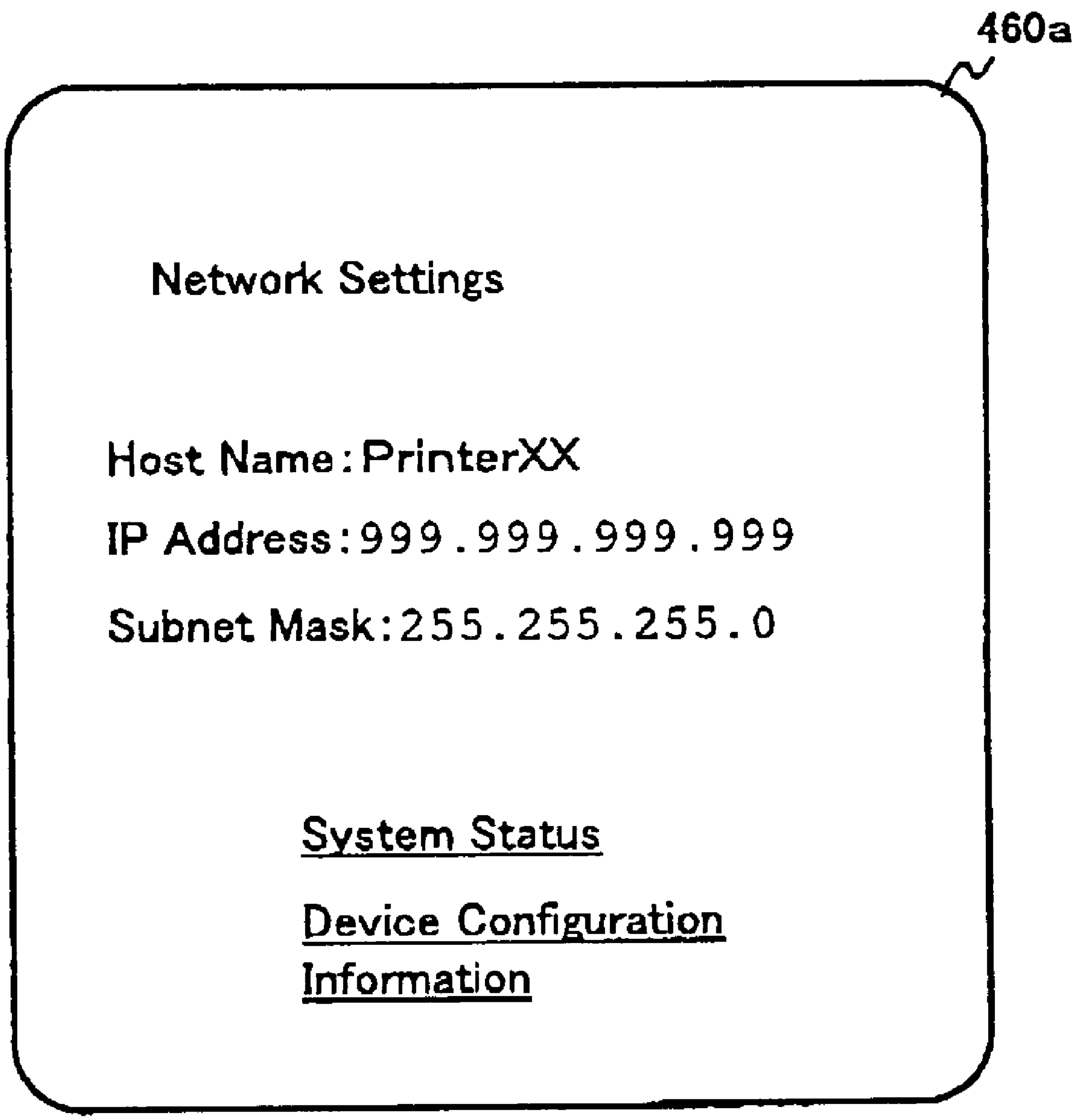
FIG. 26 is a diagram showing a display example of "Network Settings" at the PDA terminal according to the first embodiment of the present invention.

Moreover, "Network Settings" and "Device Configuration Information", which are selectable and displayed in the menu page at the client PC 41 are displayed as a text 458 showing selectable "Network Settings" and "Device Configuration Information" by the script 448*a* In a state in that the display screen 450*a* is displayed at the mobile phone 42 or the PDA terminal 43, when a user of the PDA terminal 43 selects "Network Settings", the display screen as shown in FIG. 26 is displayed at the mobile phone 42 or the PDA terminal 43 since the URL is changed so that the common path information 60*a* is succeeded and only the relative path information 60*b* is shown FIG. 26 is a diagram showing a display example of "Network Settings" at the PDA terminal according to the first embodiment of the present invention.

In FIG. 26, a display screen 460*a* is displayed by a page transition from the display screen 450*a*, and displays a page of "Network Settings" corresponding to the size of the display screen of the mobile phone 42 or the PDA terminal 43 since the common path information 60*a* at the page transition. The user of the mobile phone 42 or the PDA terminal 43 is not required to conduct a setting to properly display "Network Settings" for the size of the display screen.

Figure 27:
FIG. 27 is a diagram showing an unsuitable display example of "Network Settings" at the PDA terminal according to the first embodiment of the present invention.

If the user conduct the page transition (link from one page to another page) with respect to a conventional information processing apparatus that cannot specify the terminal type of the terminal 40, information for the display screen of the client PC 41 is displayed at the mobile phone 42 or the PDA terminal 43. As a result, the information is provided unsuitably as shown in FIG. 27. Since the terminal type information 53*a* is not succeeded, letters being too large to read the whole sentence is displayed at the mobile phone 42 or the PDA terminal 43. Therefore, the conventional information processing apparatus cannot provide information suitable for the display screen.

According to the first embodiment of the present invention, sine the HTTP daemon 2 forms the URL so as to call default.cgi when the HTTP daemon 2 receives the first request from the terminal 40, the information processing apparatus 100 can automatically set the URL including the common path information 60*a* by default.cgi. Therefore, the user of the terminal 40 is not required to input information concerning the display screen of the terminal 40.

The common path information 60*a* is provided prior to the relative path information 60*b* in the URL. Thus, a link from one page to another page can be indicated by only the relative path information 60*b*.

Moreover, the information processing apparatus 100 converts the description in XML into the description in HTML based on the terminal type information 53*a* of the common path information 60*a* by using a predetermined style sheet. Accordingly, in the information processing apparatus 100, a developer is not required to develop each of the Web applications 301 for each of the terminal types Therefore, it is possible to reduce workload of the developer. That is, it is possible for the Web applications 301 to output the process result in a unified manner. For example, a development of each of the Web applications 301 is not affected by a different size of the display screen, division of the display screen by the frames, and a like.

According to the first embodiment of the present invention, as the terminal type, the client PC 41 is categorized into "PC", and the mobile phone 42 and the PDA terminal 43 are categorized into "PDA". However, in order to categorize the display screen in detail, various terminal types in addition to "PC" and "PDA" can be applied. Also, various categories can be applied to not only the size of the display screen but also to various characteristics of the display screen.

Also, the present invention can be applied to a case in that the information processing apparatus 100 is connected to a large screen as another terminal 40. That is, as for the large screen, it is possible to change letters to be relatively bigger, to change the number of letters to be more, and a like in order to provide information by an effective display screen. Moreover, it is possible to provide a larger image or a plurality of images for the large screen, so as to effectively provide information In order to provide information corresponding to the terminal 40, in the information processing apparatus 100, the template corresponding to the terminal type in each style sheet 430 adjusts a display format of the process result provided from the Web page function 300 and additionally provides images to the process result.

As described above, according to the present invention, since the terminal type information 63*a* is set in the common path information 60*a* when the request from the terminal 40 is received, even if the page transition is conducted among the plurality of the Web applications 301, the information corresponding to the same terminal type can be always provided at the Web browser of the terminal 40.

Also, a processing part for describing the process result in XML and a processing part for converting XML into HTML are provided separately from the plurality of Web applications 301 in the Web page function 300.

Second Embodiment

An information processing apparatus 1100 will be described according to a second embodiment of the present invention. In the second embodiment according to the present invention, the information processing apparatus 1100 provides the information in a language suitable for a terminal and a user using a terminal connected to the information processing apparatus 1100 through the Internet.

The information processing apparatus 1100 according to the second embodiment includes at least one of a plurality of different image forming functions such as a printer, a FAX, and a copier, and also provides information concerning the image forming functions by a plurality of Web applications. In the second embodiment, for the sake of convenience, a case in that information concerning a copying process and a plotter for conducting a copy will be mainly described.

A hardware configuration of the information processing apparatus 1100 is the same as that of the information processing apparatus 100 shown in FIG. 1, and explanation of thereof will be omitted.

Figure 28:
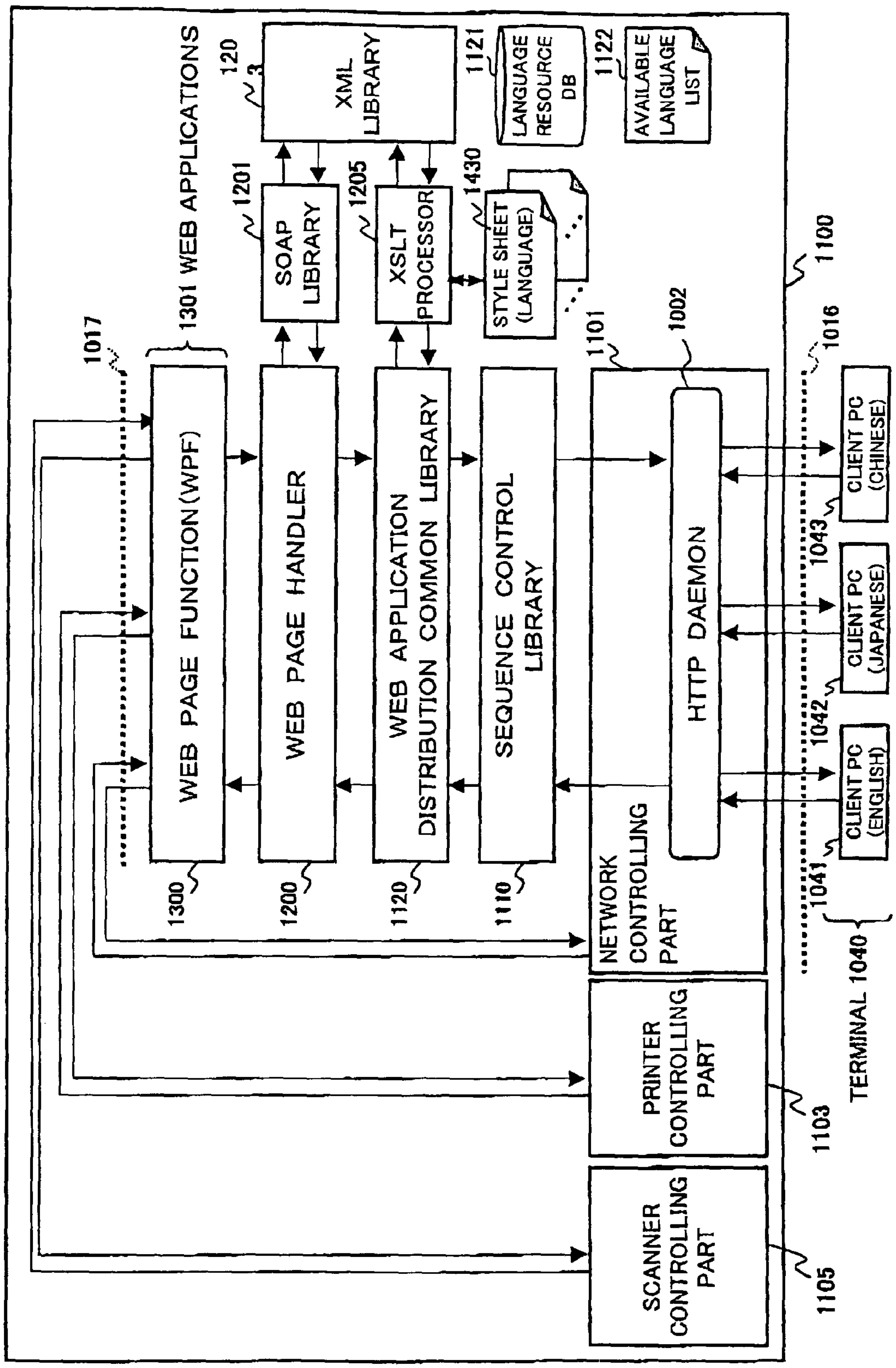
FIG. 28 is a block diagram showing a functional configuration of the information processing apparatus according to a second embodiment of the present invention.

FIG. 28 is a block diagram showing a functional configuration of the information processing apparatus according to a second embodiment of the present invention.

In FIG. 28, the information processing apparatus 1100 is capable of connecting to terminals 1040 including a client PC 1041 for English, a client PC 1042 for Japanese, and a client PC 1043 for Chinese, which have different utilization forms of a language. The information processing apparatus 1100 is a computer to provide information as a response with respect to a request sent from each of the terminals 1040.

The information processing apparatus 1100 mainly includes a network controlling part 1101, a sequence control library 1110, a Web application distribution common library 1120, a Web page handler 1200, a SOAP (Simple Object Access Protocol) library 1201, an XML (extensible Markup Language) library 1203, an XSLT (XSL Transformations) processor 1205, a Web page function (WPF) 1300, a printer controlling part 1103, and a scanner controlling part 1105.

The network controlling part 1101 includes at least an HTTP daemon 1002 for conducting a communication control in accordance with an HTTP (Hyper Text Transfer Protocol). The network controlling part 1101 receives the request from each terminal 1040 and provides information as a response with respect to the request.

In order to execute a predetermined process so as to succeed to attribute information showing attributes concerning a utilization form of a Web browser of the terminal 1040 while a user conducts page transitions (browse one Web page linked from another Web page) among a plurality of Web applications 1301, when the HTTP daemon 1002 receives the request from the terminal 1040, and additionally provides a temporary common path information, and a Web application ID and a CGI (Common Gateway Interface) which are referred to execute the predetermined process, to the URL indicated by the request. Similar to the first embodiment, the HTTP daemon 1002 adds necessary information and creates the URL formed by the common path information 60*a* and the relative path information 60*b* as shown in FIG. 3. The HTTP daemon 1002 additionally provides predetermined "/TERMINAL/PROFILE/LANG/webDefaultApl/default.cgi" to the URL.

The sequence control library 1110 is a processing part that is shared with the plurality of Web applications 1301 and handles by a predetermined sequence controlling process a difference between a process sequence of sending and receiving data through the Internet 1016 and another process sequence of sending and receiving data to/from each of the Web applications 1301.

The Web application distribution common library 1120 is a processing part that is shared with the plurality of Web applications 1301, and that analyzes a request from the terminal 1040 and generates a response for the terminal 1040. The Web application distribution common library 1120 converts the response described in XML by the Web page handler 1200 into the response described in a display format by HTML (HyperText Markup Language) corresponding to a Web browser language displayed at each terminal 1040 by using the XSLT processor 1205.

The Web page handler 1200 is a processing part that converts a process language understandable for the Web applications 1301 into another process language understandable in the communication control conducted with the terminal 1040 for the request and the response. The Web page handler 1200 calls one Web application 1301 corresponding to the request via a CGI indicated by the request. Also, the Web page handler 1200 sends a serialization request to the SOAP library 1201 to serialize process result data provided from the Web page function 1300.

The SOAP library 1201 converts the process result data given by variables of C language into a description in XML so as to serialize the process result. In the second embodiment, serialization means to describe the process result provided from the Web page function 1300 in XML.

The XML library 1203 is used by the SOAP library 1201 to serialize the process result by describing in XML. Also, the XML library 1203 is used by the XSLT processor 1205 to generate the process result described in HTML.

The XSLT processor 1205 converts the process result described in XML into HTML by using the XML library 1203 based on a style sheet 1430 described in XSL, (extensible Stylesheet Language) corresponding to the Web application 1301 indicated by the request from the terminal 1040. The style sheet 1430 is prepared beforehand by corresponding to each Web application 1301.

A language resource DB 1121 stores each language resource showing a correspondence between the process result from each Web application 1301 and a description in each of languages available by the information processing apparatus 1100. That is, by using the language resource DB 1121, one process result can be described in a plurality of languages And an available language list 1122 shows a list of languages in which the information processing apparatus 1100 can provide information.

When the Web page function 1300 is called from the Web page handler 1200, for example, inquires the printer controlling part 1103 or the scanner controlling part 1105 mounted to the information processing apparatus 1100 through an API (Application Program Interface) 1017, obtains information showing a status of a plotter 35-1 or a scanner 35-2 (shown in FIG. 1), and then provides the information to the Web page handler 1200 Moreover, the Web page function 1300 inquires the network controlling part 1101 through the API 1017, obtains information from the network controlling part 1101, and provides the information to the Web page handler 1200.

Figure 29:
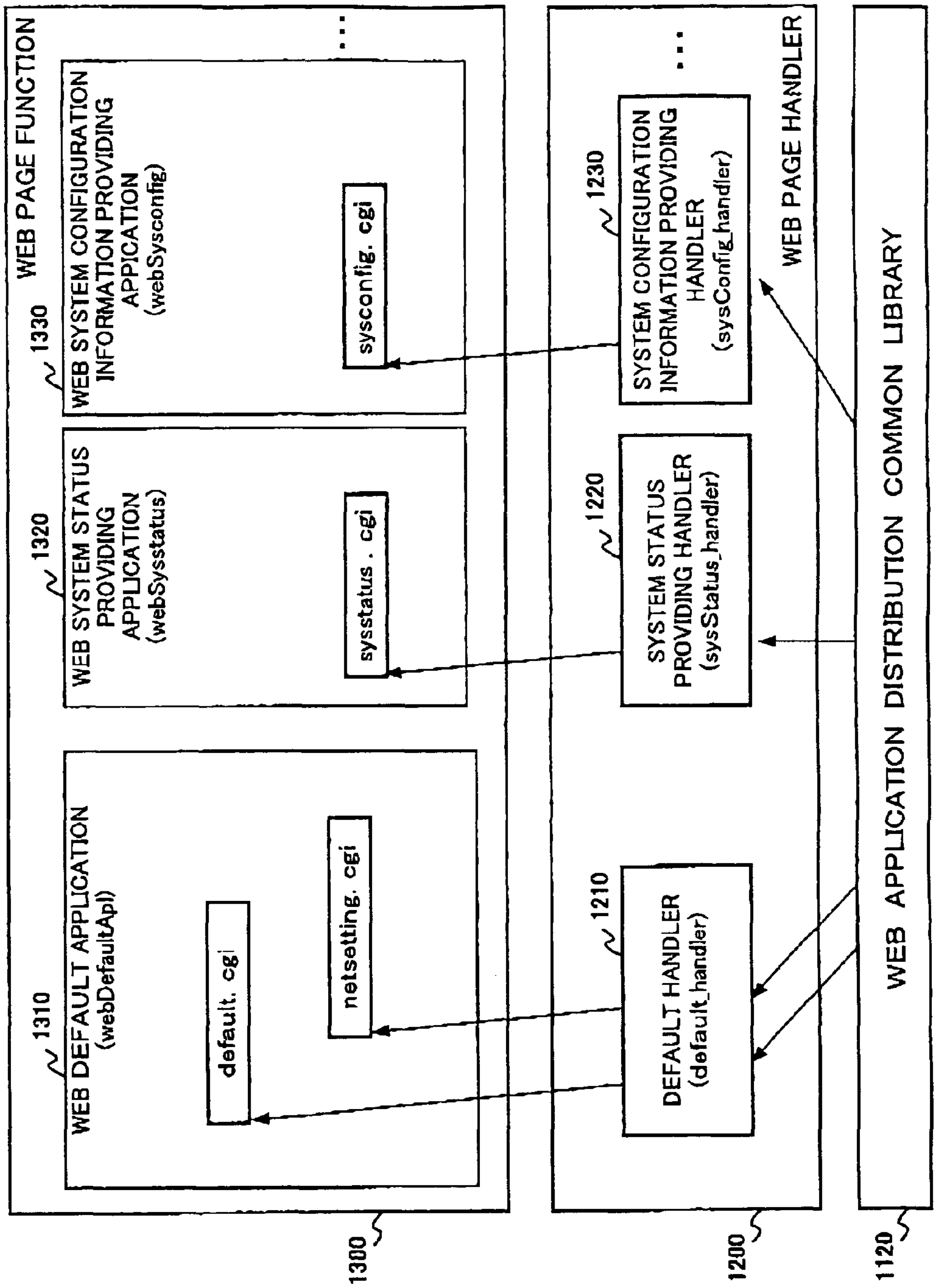
FIG. 29 is a block diagram for explaining an execution of the Web applications according to the second embodiment of the present invention.

Next, a detailed configuration for executing the Web applications will be described with reference to FIG. 29, FIG. 30A and FIG. 30B. FIG. 29 is a block diagram for explaining an execution of the Web applications according to the second embodiment of the present invention. FIG. 30A and FIG. 30B are diagrams showing hash lists according to the second embodiment of the present invention. In FIG. 29, for example, in order to provide information based on the configuration of the URL as shown in FIG. 3, the Web page handler 1200 includes a default handler 1210 executed at a first request from the terminal 1040, a system status providing handler 1220 executed by the page transition in accordance with the instruction from the terminal 1040, a system configuration information providing handler 1230 similarly executed by page transition, and a like.

Corresponding to the handlers in the Web page handler 1200, respectively, the Web page function 1300 includes the plurality of Web applications 1301: a Web default application 1310, a Web system status providing application 1320, a Web system configuration information providing application 1330, and a like.

Until an initial display screen is displayed at the terminal 1040, the default handler 1210 sequentially calls the Web default application 1310 through "default.cgi", and then "netsetting.cgi" indicated by the page information 65 in accordance with the format of the URL shown in FIG. 3. As a result, for example, network settings of the device such the plotter 35-1 or the scanner 35-2 (shown in FIG. 1) mounted in the information processing apparatus 1100 are displayed at the terminal 1040.

The system status providing handler 1220 calls a function for the Web system status providing application 1320 for providing information concerning the device mounted in the information processing apparatus 1100. In addition, the system configuration information providing handler 1230 calls the Web system configuration information providing application 1330 so as to obtain a system configuration information of the information processing apparatus 1100 in response to a request from the terminal 1040.

The Web application distribution common library 1120 obtains the Web application ID 64 from a URL, and refers to a hash list 1050*a* shown in FIG. 30A. When the Web application ID 64 shows "web Default Apl", the Web application distribution common library 1120 executes "default_handler". In the same manner, when the Web application ID 64 shows another Web application ID, the Web application distribution common library 1120 refers to the hash list 1050*a*, and executes a handler corresponding to the Web application ID to be executed.

In addition, each of the handlers 1210, 1220, and 1230 in the Web page handler 1200 obtains the page information 65 from the URL, refers to the hash list 1050*b* shown in FIG. 30B, and calls a function corresponding to the page information 65. For example, when the page information 65 shows "default.cgi", "default( )" is obtained to call as a function. Similarly, when the page information 65 shows another CGI, each of the handlers 1210, 1220, and 1230 refers to hash list 1050*b* and obtains a function to call.

Moreover, in order to conduct the XSL conversion request which converts the process result described by XML to the XSLT processor 1205 into HTML, the Web application distribution common library 1120 obtains the page information 65 from the URL specified as a Web page function ID, and obtains a corresponding style sheet 1430 by referring to the hash list 1050*b* shown in FIG. 30B. For example, when the page information 65 shows "netsetting.cgi", the Web application distribution common library 1120 obtains "netsetting.xsl" as a style sheet necessary for the XSL conversion from the hash list 1050*b*. Similarly, when the page information 65 is another CGI, the Web application distribution common library 1120 obtains a style sheet necessary for the XSL conversion by referring to the hash list 1050*b*.

In FIG. 29, FIG. 30A, and FIG. 30B, when the page information 65, as the Web page function ID, of the URL is "default.cgi", the function default( ) is executed, and the Web browser language displayed at the terminal 1040 is determined. Accordingly, the language information of the URL which is temporarily created by the HTTP daemon 1002 is replaced with the determined language and the initial display screen where the URL showing the determined language is set is created.

When the page information 65 is "netsetting.cgi", a function netsetting( ) is executed. For example, the information is generated so as to create a network setting page displaying network settings for a printer as the plotter 35-1.

Moreover, when the page information 65 is "sysstatus-.cgi", a function sysstatus( ) is executed so as to generate the information for creating a page displaying a status of the printer as a status of the plotter 35-1 When the page information 65 is "sysconfig.cgi", a function sysconfig( ) is executed, information showing a system configuration is generated.

For the sake of convenience, names of the Web application ID and the Web page handler are unified. But it is not limited to do so since the hash list 1050*a* corresponds the Web application ID to the Web page handler. Also, names of the Web page function ID, the function, the style sheet are unified in the same manner. But it is not limited to do so since the hash list 1050*b* corresponds the Web page function ID, the function, and the style sheet each other.

Figure 31:
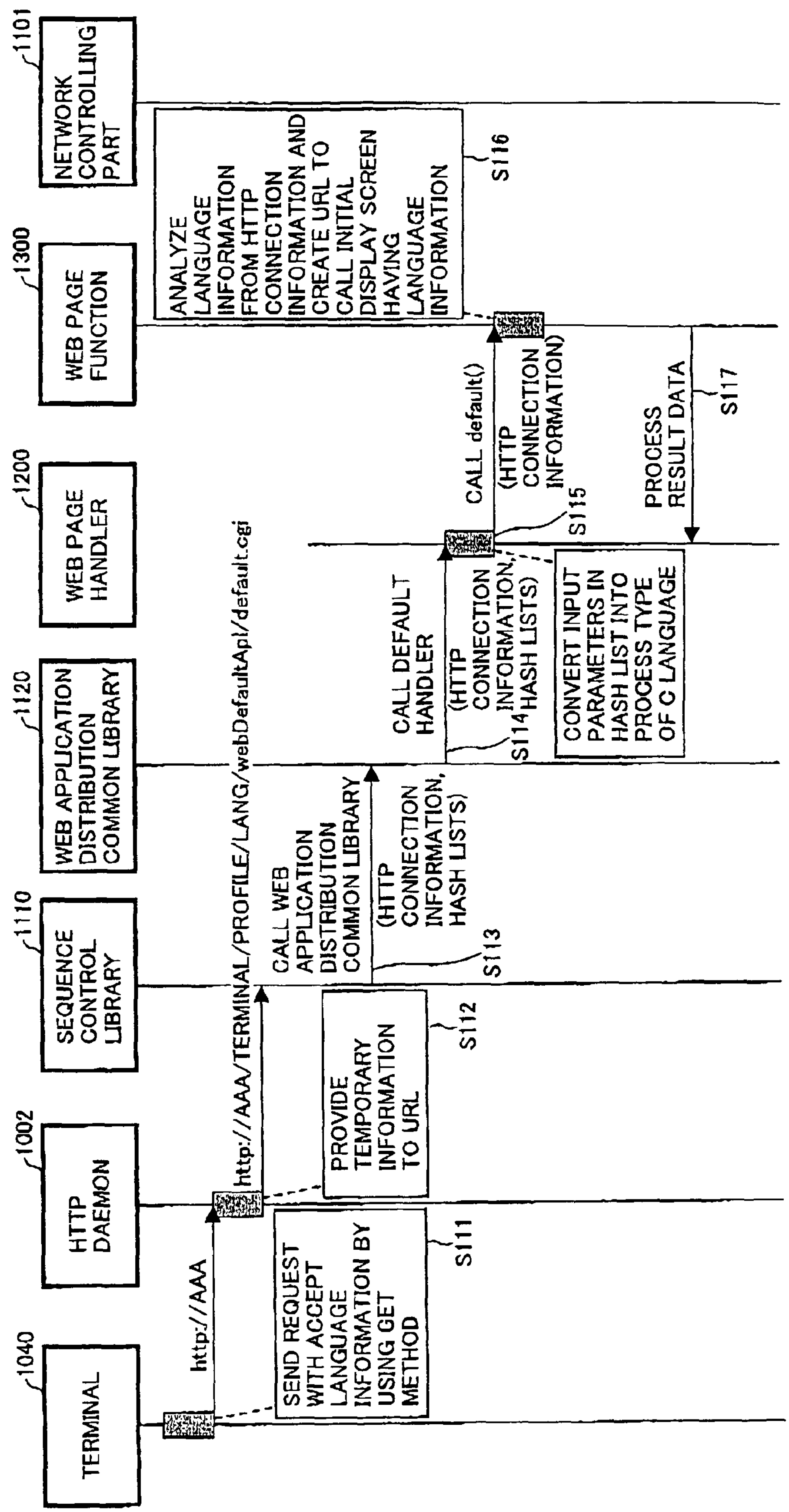
FIG. 31 is a diagram showing the process flow for default.cgi according to the second embodiment of the present invention.
Figure 32:
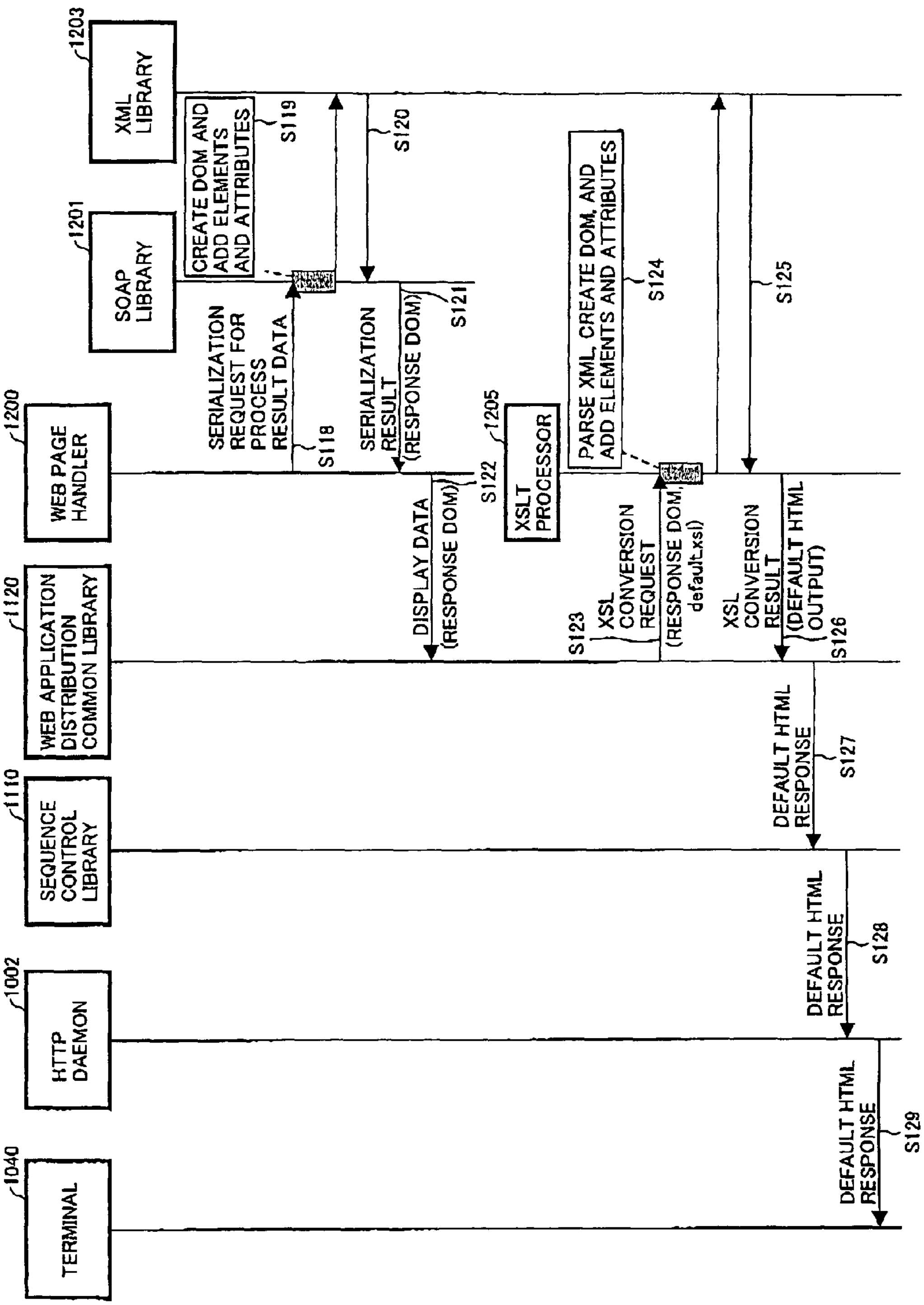
FIG. 32 is a diagram showing the process flow for default.cgi according to the second embodiment of the present invention.

Next, a process flow until information is provided with respect to the first request from the terminal 1040 will be described. FIG. 31 and FIG. 32 are diagrams showing the process flow for default.cgi according to the second embodiment of the present invention.

In FIG. 31, the terminal 1040 sends a request additionally providing accept language information by using a GET method of the HTTP (step S111). For example, the terminal 1040 sends the request by indicating a URL "http://AAA".

When the information processing apparatus 1100 receives this request, the HTTP daemon 1002 of the information processing apparatus 1100 additionally provides the terminal type information 63*a*, the profile information 63*b*, the language information 63*c*, the Web application ID 64, the page information 65 to the URL "http://AAA", and then sends this request to the sequence control library 1110 (step S112). For example, the HTTP daemon 1002 additionally provides "TERMINAL" as the terminal type information 63*a*, "PROFILE" as the profile information 63*b*, "LANG" as the language information 63*c*, "webDefaultApl" as the Web application ID 64, and "default.cgi" as the page information 65, to the URL "http://AAA", so as to form "http://AAA/TERMINAL/PROFILE/LANG/webDefaultApl/default-.cgi".

The sequence control library 1110 calls the Web application distribution common library 1120 (step S113). When calling the Web application distribution common library 1120, the sequence control library 1110 sets the HTTP connection information showing information concerning a connection with the terminal 1040, and the hash lists 1050*a* and 1050*b* as arguments. In the following, the hash lists 1050*a* and 1050*b* are generically called hash lists. That is, the hash lists include the hash lists 150*a* and 150*b* and other hash lists. The HTTP connection information uniquely specifies the connection with the terminal 1040 until the connection is disconnected.

The Web application distribution common library 1120 specifies and calls the default handler 1210 ("default_handler") from the hash list 1050*a*, as the Web page handler 1200 corresponding to the Web application ID 64 showing "webDefaultApl" based on the URL generated by the HTTP daemon 1002 (step S114).

In the Web page handler 1200, the default handler 1210 obtains the page information 65 showing "default.cgi" from the URL, and specifies and calls the function default( ) from the hash list 1050*b* as the Web page function 1300 corresponding to "default.cgi" (step S115). In this case, the HTTP connection information is set as the argument. For example, in a case in that the Web page function 1300 is developed by C language, the Web page handler 1200 converts into a process type of C language and then calls the function default( ).

By executing the function default( ), based on the HTTP connection information, language information is analyzed and a URL calling the initial display screen is created by including the common path information 60*a* determined by the function default( ) (step S116) A process result data including the URL is returned to the default handler 1210 in the Web page handler 1200 (step S117). In a process by default.cgi, the common path information 60*a* is determined, and a URL is determined by the common path information 60*a* and the relative path information 60*b* for determining a frame configuration of the initial display screen. For example, "/pc/user/en" is determined as the common path information 60*a* and "/webDefaultApl/netsetting.cgi" for the network setting page as the initial display screen is determined as the relative path information 60*b*.

The default handler 1210 sends a serialization request to the SOAP library 1201 in order to describe the process result data in XML (Step S118) For example, the SOAP library 1201 creates a DOM (Document Object Model) based on the process result data shown by a C language structure, additionally provides necessary elements and attributes (step S119), and describes the process result data in XML by the XML library 1203 (step S120). The process result data described in XML is provided to the default handler 1210 as the serialization result by the SOAP library 1201 (step S121) In the Web page handler 1200, the default handler 1210 provides the serialization result as display data "Response DOM" to display at the terminal 1040, to the Web application distribution common library 1120 (step S122).

In order to convert the display data described in XML into a description of HTML corresponding to the Web browser language displayed at the terminal 1040, the Web application distribution common library 1120 refers to the hash list 1050*b*, obtains the style sheet "default.xsl" corresponding to the page information 65 showing "default.cgi", and sends the XSL conversion request to the XSLT processor 1205 (step S123). The display data "Response DOM" and the style sheet "default.xsl" are set as arguments for the XSL conversion request.

When the XSLT processor 1205 receives the XSL conversion request, the XSLT processor 1205 executes the style sheet "default.xsl" indicated by the argument. Accordingly, the XSLT processor 1205 analyzes syntax of the display data "Response DOM" described in XML (parse XML, creates a DOM, additionally provides elements and attributes (step S124), and converts into the description of HTML by using the XML library 1203 (step S125). The XSLT processor 1205 provides the description of HTML to the Web application distribution common library 1120 as a XSL conversion result (step S126).

The process result described in HTML by the Web page function 1300 when the page information 65 shows "default-.cgi" is output as a default HTML to the Web application distribution common library 1120. In the default HTML, "netsetting-cgi" is described in HTML to be called. The default HTML is output as a default HTML response.

The default HTML response is sequentially provided from the Web application distribution common library 1120 to the sequence control library 1110 (step S127) and is provided from the sequence control library 1110 to the HTTP daemon 1002 (step S128). After that, the default HTML response is sent as a response with respect to the request of the terminal 1040 in step S111 by the HTTP daemon 1002 (step S129). Then, the process flow for executing the Web default application 1310 by the default.cgi is terminated.

In, step S117, the common path information 60*a* is determined and simply the common path information 60*a* is added to the relative path information 60*b* Accordingly, the Web default application 1310 may describe the process result in HTML and output the process result described in HTML. Thus, steps S118 through S126 may be omitted.

Figure 33:
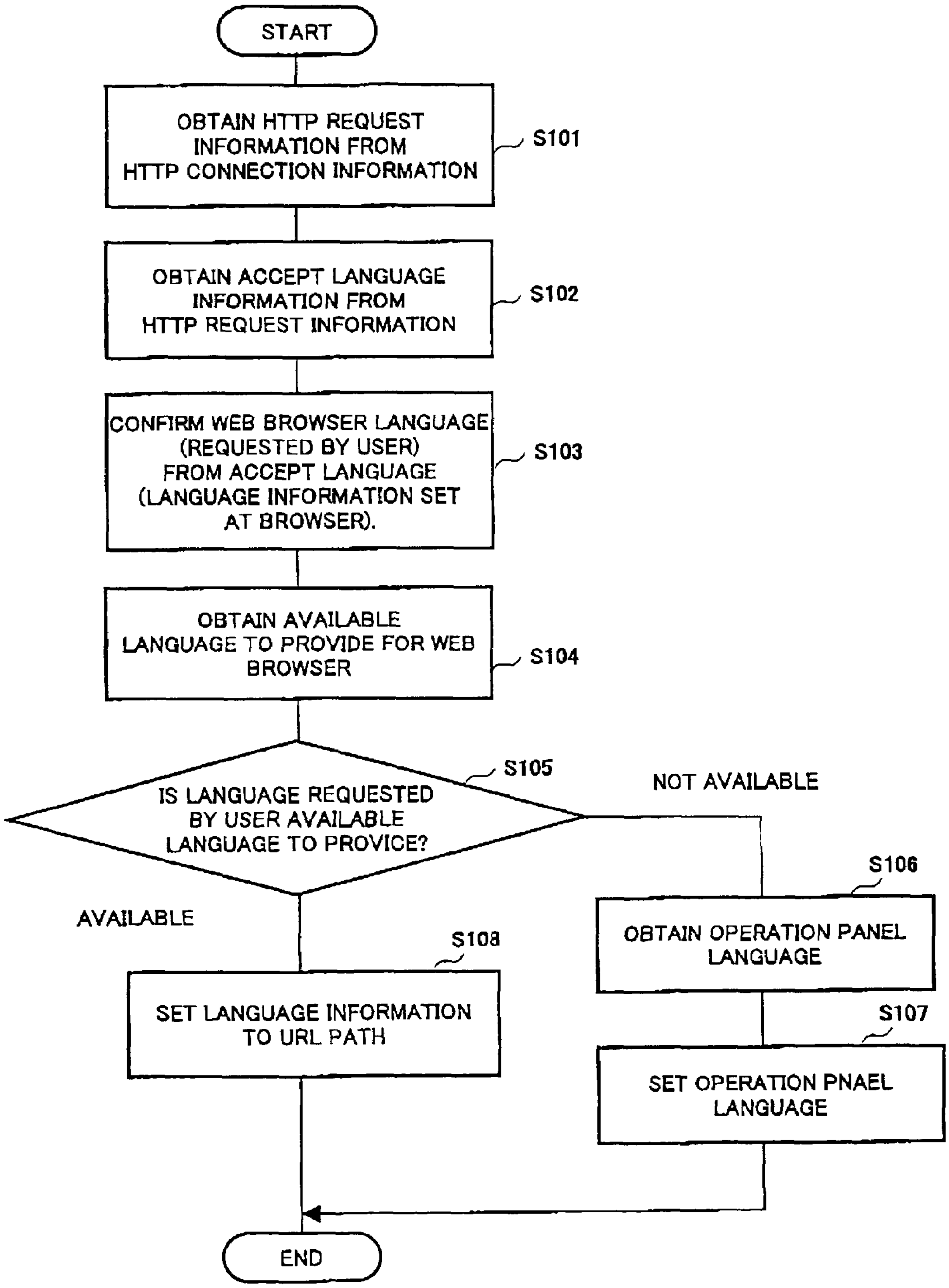
FIG. 33 is a flowchart diagram for explaining the analyzing process for the language information according to the second embodiment of the present invention.

Next, an analyzing process for the language information executed by the function default( ) in step S116 shown in FIG. 31 will be described with reference to FIG. 33 and FIG. 34 in detail FIG. 33 is a flowchart diagram for explaining the analyzing process for the language information according to the second embodiment of the present invention FIG. 34 is a diagram showing a header information list according to the second embodiment of the present invention.

Similar to the first embodiment, the data structures shown in FIG. 9 through FIG. 10 and FIG. 34 are referred by the analyzing process for the language information shown in FIG. 33. Hereinafter, the HTTP connection information 340, the script 346 describing "HTTP_REQUEST_INFO*request", and the script 347 describing "HTTP_RESPONSE_INFO*response" in FIG. 9 will be referred as the HTTP connection information 1340, the script 1346, and the script 1347 in the second embodiment Also, the HTTP request information 350, the remote address 351, the local address 352, the request method 353, the request URL 354, the HTTP version 355, and the encoded information list 357 in FIG. 10 will be referred as the HTTP request information 1350, the remote address 1351, the local address 1352, the request method 1353, the request URL 1354, the HTTP version 1355, and the encoded information list 1357.

In the request URL 1354, the URL formed by the common path information 60*a* and the relative path information 60*b* as shown in FIG. 3 is set by the sequence control library 1110. The HTTP request information 1350 is provided to the Web page handler 1200 and to the Web page function 1300 at the same time of the HTTP connection information 1340. Accordingly, the Web page handler 1200 and the Web applications 1301 share and refer to the common path information 60*a*.

And for example, the header information list 1360 is structured as shown in FIG. 34 As shown in FIG. 34, the header information list 1360 includes accept language information 1365 showing "accept-Language: en-us; ja; q=0.9; ge; q=0.7; it; q=0.6; sp; q=0.4; pt; q=0.3". The accept language information 1365 indicates the Web browser language displayed at the terminal 1040 with priority. Thus, this script of the accept language information 1365 is analyzed, so as to provide information corresponding to the Web browser language displayed at the terminal 1040. In the accept language information 1365, "en-us" indicates US English, "ja" indicates Japanese, "ge" indicates German, "it" indicates Italian, "sp" indicates Spanish, and "pt" indicates Portuguese.

In FIG. 33, in response to a call of the function( ), the Web default application 1310 obtains the HTTP request information 1350 from the HTTP connection information 1340 (step S101) Moreover, the Web default application 1310 obtains the accept language information 1365 from the HTTP request information 1350 (step S102).

Then, the Web default application 1310 obtains the Web browser language from the accept language information 1365 (step S103). Based on the accept language information 1365, languages listed in the accept language information 1365 can be ordered as shown in FIG. 35A. That is, as the Web browser language, English is a first language requested from the terminal 1004, Japanese is a second language, German is a third language, Italian is a fourth language, Spanish is a fifth language, Portuguese is a sixth language.

Subsequently, the Web default application 1310 obtains available languages to provide for a Web browser of the terminal 1004 (step S104). For example, the available languages are listed with priority in the available language list 1122 in FIG. 35B. That is, the information processing apparatus 1100 can provide information in Japanese with a first priority, English with a second priority, German with a third priority, . . . .

The Web default application 1310 determines whether or not the language request by the user of the terminal 1004 is the available language to provide (step S105). When the language request by the user of the terminal 1004 is not the available language, the Web default application 1310 obtains an operation panel language that is stored in a predetermined storage area 1123 as shown in FIG. 35C and used to display information at the operation panel 36 in FIG. 1. The Web default application 1310 sets the operation panel language as the language information 63C in the common path information 60*a* (step S107), and then terminates the analyzing process for the language information.

On the other hand, in step S105, when the language request by the user of the terminal 1004 is the available language, the Web default application 1310 sets the language with higher priority included in both the accept language information 1365 and the available language list 1122 (step S108), and then terminates the analyzing process for the language information.

The default HTML output by default.cgi will be described with reference to FIG. 36. FIG. 36 is a diagram showing an example of the default HTML output according to the second embodiment of the present invention. In FIG. 36, the default HTML 1400 is not displayed at the terminal 1040, but a script 1401 that is Javascript™ calls the network setting page.

By a script 1402 showing "self.document.cookie="cookieOnOffchecker=on; path=/"", information concerning the Web browser of the terminal 1040 is obtained. By a scrip 1403 showing "self.location.pathname="/pc/user/en/webDefaultApl/netsetting.cgi"", the language information "en" is succeeded, and the Web default application 1310 of the Web page function 1300 is executed. That is, a network setting HTML is requested. During a series of page transitions conducted by a user after that, an absolute path is indicated by a script 1403 as a reference for a relative path indicated by <a href> tag.

Figure 37:
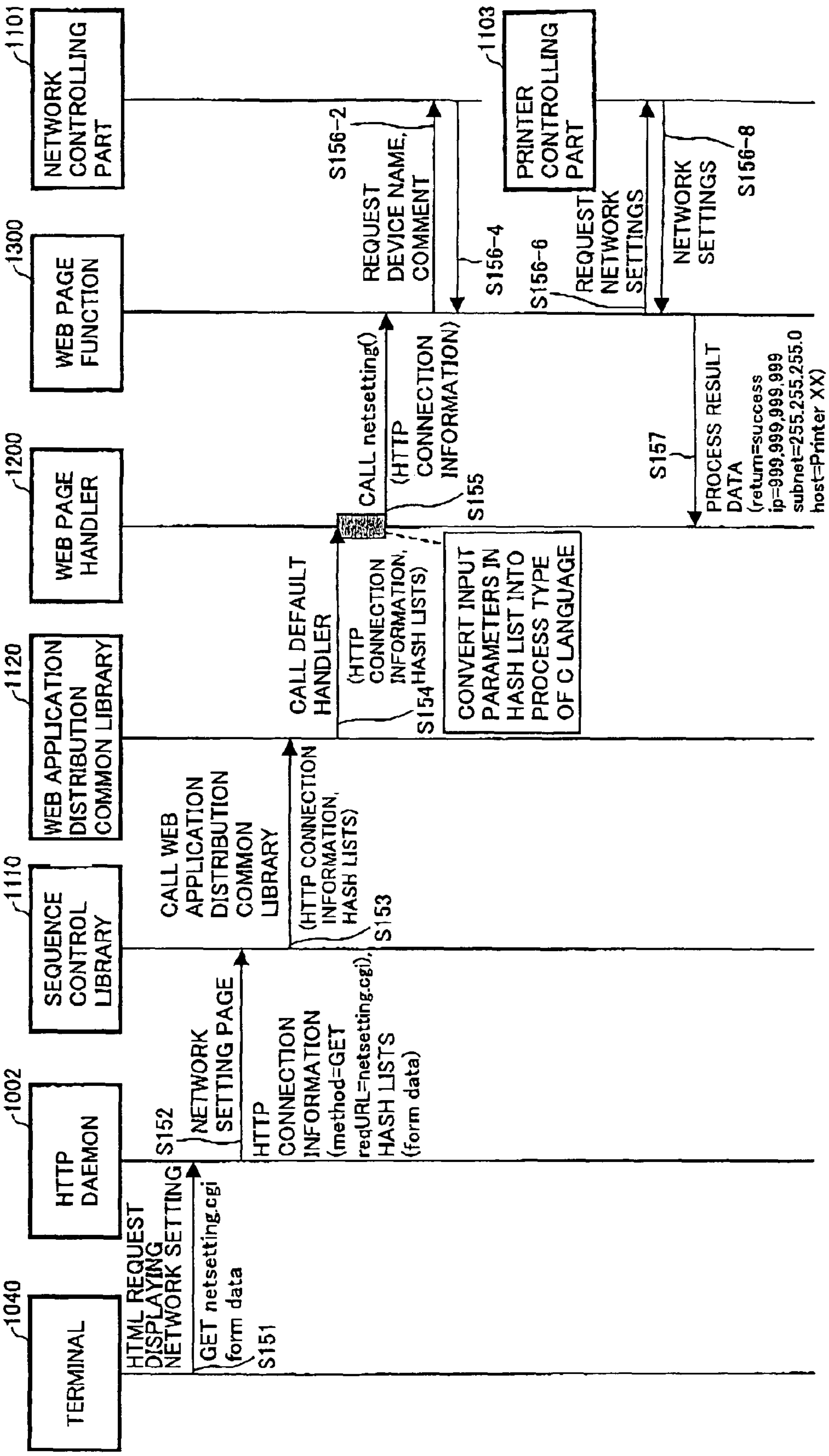
FIG. 37 is a diagram showing a process flow by netsetting.cgi according to the second embodiment of the present invention.
Figure 38:
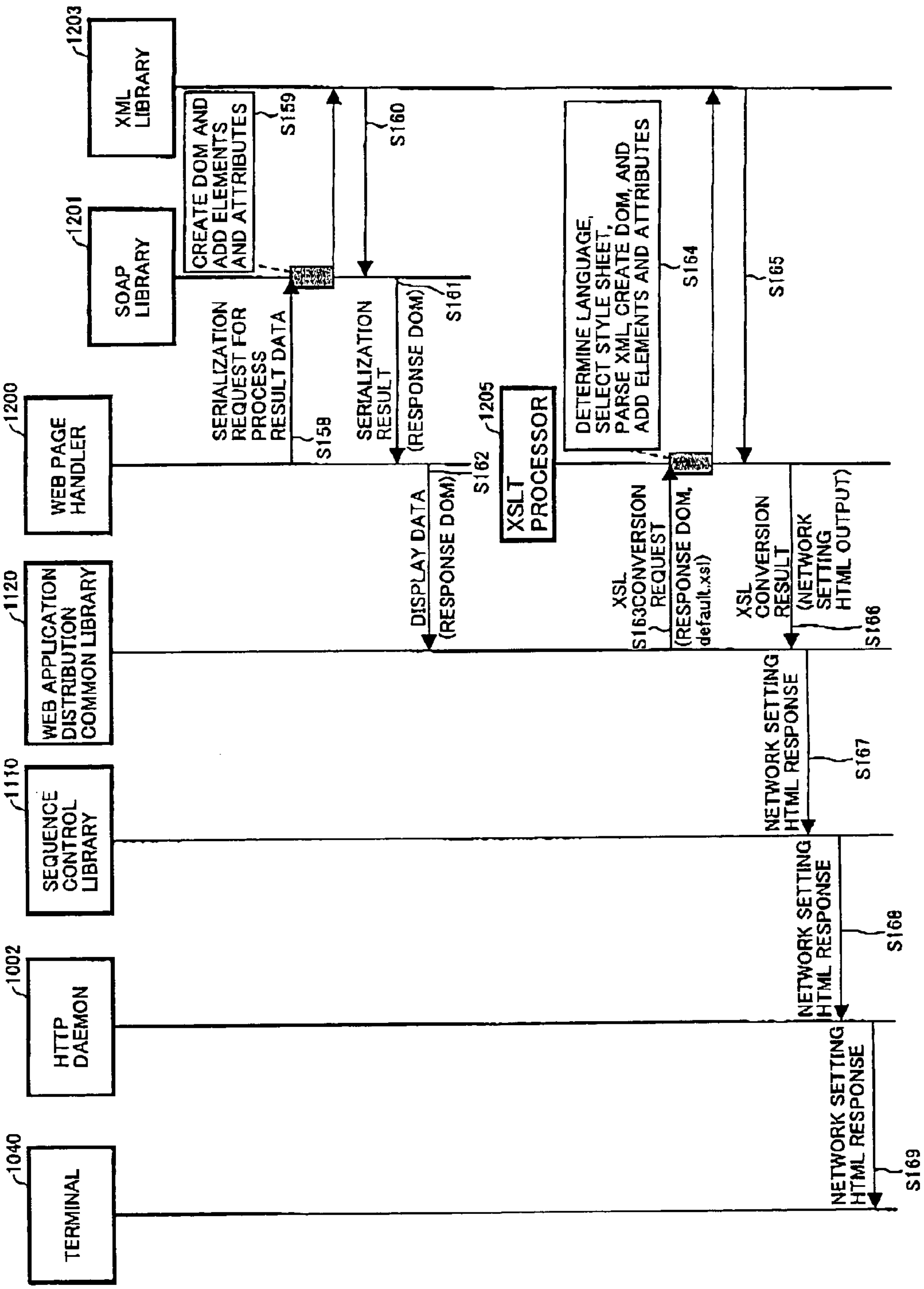
FIG. 38 is a diagram showing a process flow by netsetting.cgi according to the second embodiment of the present invention.

FIG. 37 and FIG. 38 are diagrams showing a process flow by netsetting.cgi according to the second embodiment of the present invention. In FIG. 37, the terminal 1040 requests an HTML for displaying the network settings of the plotter 35-1 or the scanner 35-2 mounted to the information processing apparatus 1100 (network setting HTML request) (step S151) The network setting HTML request is conducted by the GET method in which "network setting.cgi" is indicated and the form data is attached.

The HTTP daemon 1002 of the information processing apparatus 1100 sends the HTTP connection information 1340 and the hash lists to the sequence control library 1110 (step S152) In this case, the HTTP daemon 1002 sets "GET" to the request method of the HTTP request information 1350 related to the HTTP connection information 1340, and indicates "netsetting.cgi" to the URL of the request. In addition, the HTTP daemon 1002 sets the form data received from the terminal 1040 to the hash lists.

The sequence control library 1110 calls the Web application distribution common library 1120 (step S153). In this case, the sequence control library 1110 sets the HTTP connection information and the hash lists as arguments.

The Web application distribution common library 1120 specifies and calls the default handler 1210 ("default_handler") from the hash list 1050*a* as the Web page handler 1200 corresponding to the Web application ID 64 showing "webDefaultApl" based on the URL (step S154).

In the Web page handler 1200, the default handler 1210 obtains the page information 65 showing "netsetting.cgi", and specifies and calls the function netsetting( ) from the hash list 50*b* as the Web page function 300 corresponding to "netsetting.cgi" (step S155). In this case, the HTTP connection information 1340 is set as an argument.

For example, in a case in that the Web page function 1300 is developed by C language, the Web page handler 1200 converts into a process type of C language and calls the function netsetting( ).

By executing the function netsetting( ), the Web default application 1310 requests information including a device name, a comment, and a like to the network controlling part 1101 through the API 1017, in order to display the status of a device (for example, plotter 35-1 as the printer) at the initial display screen (netsetting.cgi) (step S156-2). The network controlling part 1101 provides the information including the device name, the comment, and the like in response to the request (step S156-4).

For example, the Web default application 1310 of the Web page function 1300 requests the status of the printer to the printer controlling part 1103 through the API 1017 (printer status request) (step S156-6). The printer controlling part 1103 provides the status of the plotter 35-1 as a printer status to the Web default application 1310 (step S156-8).

Then, the Web default application 1310 provides the printer status, and the terminal type information 63*a*, the profile information 63*b* and the language information 63*c* from the request URL 1354 of the HTTP request information 1350 as the process result data to the default handler 1210 in the Web page handler 1200 (step S157).

In the following, the serialization process for describing in XML in steps S158, S159, S160, S161, and S162 is the same as the serialization process in steps S118, S119, S120, Sl21, and S122, and explanation thereof will be omitted.

In order to convert the display data described in XML into a description of HTML corresponding to the language displayed at the Web browser of the terminal 1040, the Web application distribution common library 1120 refers to the hash list 1050*b*, obtains the style sheet "netsetting.xsl" corresponding to the page information 56 showing "netsetting.cgi", and conducts the XSL conversion request with respect to the XSLT processor 1205 (step S163). In this case, the display data "Response DOM" and the style sheet "netsetting.xsl" are set as arguments. When the XSLT processor 1205 receives the XSL conversion request, the XSLT processor 1205 executes the style sheet "netsetting.xsl" indicated in the argument. Accordingly, the XSLT processor 1205 selects one template corresponding to the language from descriptions of the style sheet, analyzes a syntax of the display data "Response DOM" described in XML (parse XML), creates a DOM, additionally provides elements and attributes (step S164), and converts into the description of HTML by using the XML library 1203 (step S165) The language resource DB 1121 is referred by the XSLT processor 1205 to describe the process result in the language displayed at the browser of the terminal 1004.

XSLT processor 1205 provides the description of HTML as the XSL conversion result to the Web application distribution common library 1120 (step S166).

The process result described in HTML by the Web page function 1300 in a case in that the page information 65 is "netsetting.cgi" is output to the Web application distribution common library 1120 as a network setting HTML. Information concerning the network settings of the plotter 35-1 is described in the network setting HTML.

This network setting HTML response is provided from the Web application distribution common library 1120 to the sequence control library 1110 (step S167), and then is provided from the sequence control library 1110 to the HTTP daemon 1002 (step S168) Subsequently, the HTTP daemon 1002 sends the network setting HTML response as a response in accordance with HTTP with respect to the request sent from the terminal 1040 in step S151 (step S169). Then, the process flow executed by netsetting.cgi is terminated.

As describe above, when the terminal 1040 is the client PC 1041 for English, the network setting HTML is displayed in English at the browser of the client PC 1041. When the terminal 1040 is the client PC 1042 for Japanese, the network setting HTML is displayed in Japanese at the browser of the client PC 1042. In this case in that the terminal 1040 is the client PC 1043 for Chinese, Chinese is not shown in the available language list 1122. Thus, by steps S106 and S107 of FIG. 33, the operation panel language (English) is set as the language information 53*c* in the common path 60*a* for the client PC 1043. Accordingly, the network setting HTML is displayed in English at the browser of the client PC 1043.

The process result described in XML will be described. FIG. 39 is a diagram showing an example of the process result described in XML by netsetting.cgi according to the second embodiment of the present invention.

In an XML 1500 shown in FIG. 39, the process result by the function netsetting( ) of the Web default application 1310 is shown by a script 1501 showing from <networkResponse> to </networkResponse>. A script 1502 showing <terminal>pc</terminal> shows that the terminal 1040 is a personal computer, a script 1503 showing <lanquage>en</language> shows that a language displayed at the Web browser of the terminal 1040 is English, and a script 1504 showing <profile>user</profile> shows that the user of the terminal 1040 is a regular user. The scripts 1502 through 1504 show information based on the terminal type information 63*a*, the profile information 63*b*, and the language information 63*c* of the common path information 60*a* of the URL.

A script 1505 showing <returnVaule>SUCCESS</deviceName> shows that the network settings are successfully conducted. A script 1506 showing <ipAddress>999.999.999.999</ipAddress> shows that the IP address of the device (for example, the plotter 35-1) is "999.999.999.999". A script 1507 showing <subnetMask>255.255.255.0</subnetMask> shows that the subnet mask is "255.255.255.0". A script 1508 showing <hostName>Printer 1</hostname> shows that the name of the device is "Printer 1".

In the second embodiment, the Web page handler 1200 includes a function for serializing the process result data provided from the Web page function 1300 by describing in XML. Accordingly, each of Web applications 1301 of the Web page function 1300 is not required to include a processing part for describing the process result in each language A language resource, which is managed in the language resource DB 1121 and used to convert the process result described in XML into a description in HTML capable of showing the process result in English, will be described with reference to FIG. 40. FIG. 40 is a diagram showing an example of the language resource according to the second invention of the present invention.

A script 1591 showing <110n xml: lang='en'> shows English by a parameter "lang" indicating "en". That is, the language resource 1590 is used for English. Scripts 1592 through 1595 are referred to correspond the process result to descriptions in English. In script 1592, "NETSETTING" indicated by a parameter "key" corresponds to "Network Settings" indicated by a parameter "text". In script 1593, "IP_HOSTNAME" indicated by the parameter "key" corresponds to "Host Name" indicated by the parameter "text". In script 1594, "IP_ADDRESS" indicated by the parameter "key" corresponds to "IP Address" indicated by the parameter "text". In script 1595, "IP_SUBNET" indicated by the parameter "key" corresponds to "Subnet Mask" indicated by the parameter "text".

The style sheet 1430 for converting the process result form netsetting.cgi described in XML into HTML based on the language resource 1590 will be described with reference to FIG. 41 through FIG. 43. FIG. 41 through FIG. 43 are diagrams showing a description example of the style sheet for converting the process result from XML to HTML according to the second embodiment of the present invention.

In the style sheet 1430 shown in FIG. 41, for example, a script 1433 selects the language resource 1590 and the language resource 1590 is referred to convert XML into HTML. In this case, the language resource 1590 is indicated as an argument SlangTable of a function document( ).

A script 1435 showing <xsl:output method="html" encoding="UTF-8"/> indicates to describe the process result in HTML Moreover, a structure of the HTML is defined by scripts 1417 and 1418. In this case, the script 1437 indicates a language as an attribute, and the script 1438 applies the template to describe a body of the HTML Furthermore, the style sheet 1430 is partially shown in FIG. 42 and FIG. 43 to generate the body of the HTML A script 1441 showing <xsl:template match="networkResponse"> indicates "networkResponse" by a parameter "match", that is, the script 1441 indicates a template for netsetting.cgi. And the language resource 1590 in FIG. 40 is referred and then "NETSETTING" corresponds to the "Network Settings" as a title of the Web page by a script 1443. Similar to the script 1443, "IP_HOSTNAME" corresponds to "Host Name", "IP_ADDRESS" corresponds to "IP Address", and a like.

A template named as "staticvalue" is described from a script 1451 to a script 1460, and is used in the script 1445 of FIG. 42. Another template named as "sf:StringHndler" is described from a script 1471 to a script 1480, and is used in the script 1443 of FIG. 42.

As described above, the XSLT processor 1205 converts the process result described in XML into HTML based on the style sheet 1430 and the language resource 1590. Therefore, a creation of the network setting HTML for each language can be centralized in the XSLT processor 1205. Therefore, each of the Web applications 1301 in the Web page function 1300 is not required to have a function for creating a description in HTML for each language.

By preparing the style sheet 1430 for each of the Web applications 1301 beforehand, the process result can be properly described in a suitable language for the Web browser of the terminal 1040.

The network setting HTML showing the process result by netsetting.cgi is described as shown in FIG. 44. FIG. 44 is a diagram showing an example of the network setting HTML in English showing the process result of netsetting.cgi, according to the second embodiment of the present invention. In a network setting HTML 1570 shown in FIG. 44, a script 1571 showing <meta http-equiv="Content-Language" content="en"> shows that the process result is provided in English. Scripts 1573 and 1575 are created based on the style sheet 1430 to display in English at the browser of the terminal 1040. The script 1575 is to link to one of other Web pages.

By the script 1575, the network setting HTML can be linked to either one of two Web pages: "Browse System Status" page and "Browse System Configurations". By a script 1576 showing >a href=". . . /webSysstatusApl/sysstatus.cgi">, "webSysstatusApl" as the Web application information 64 and "sysstatus.cgi" as the page information 65 are set as the relative path When the "Browse System Status" page is selected by the user of the terminal 1040, the "Browse System Status" page is displayed at the terminal 1040 while a current language information 63*c* is succeeded to by ". . . /". In the same manner, By a script 1577 showing <a href=". . . /webSysconfigApl/sysconfig.cgi">, "webSysconfigApl" as the Web application information 64 and "sysconfig.cgi" as the page information 65 are set as the relative path When the "Browse System Configurations" page is selected by the user of the terminal 1040, the "Browse System Configurations" page is displayed at the terminal 1040 while a current language information 63*c* is succeeded to by ". . . /".

Figure 45:
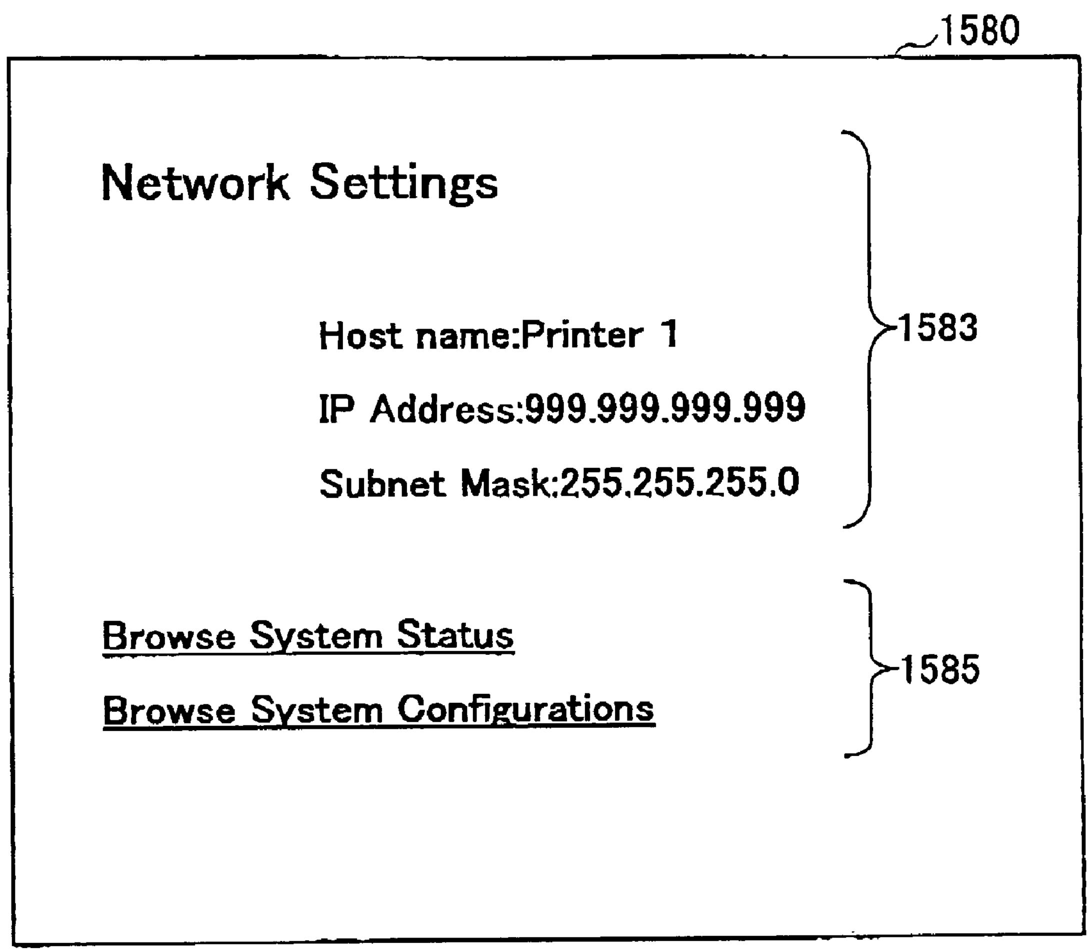
FIG. 45 is a diagram showing the network setting page displayed in English according to the second embodiment of the present invention.

The network setting page is displayed in English as shown in FIG. 45 by the network setting HTML in FIG. 44. FIG. 45 is a diagram showing the network setting page displayed in English according to the second embodiment of the present invention In a network setting page 1580 shown in FIG. 45, an English display 1583 and an English selectable display 1585 are displayed at the terminal 1040 when the terminal 1040 is the client PC 1041 for English The English display 1583 is displayed based on the script 1573 in FIG. 44. The English selectable display 1585 is displayed based on the script 1575 in FIG. 44.

Figure 46:
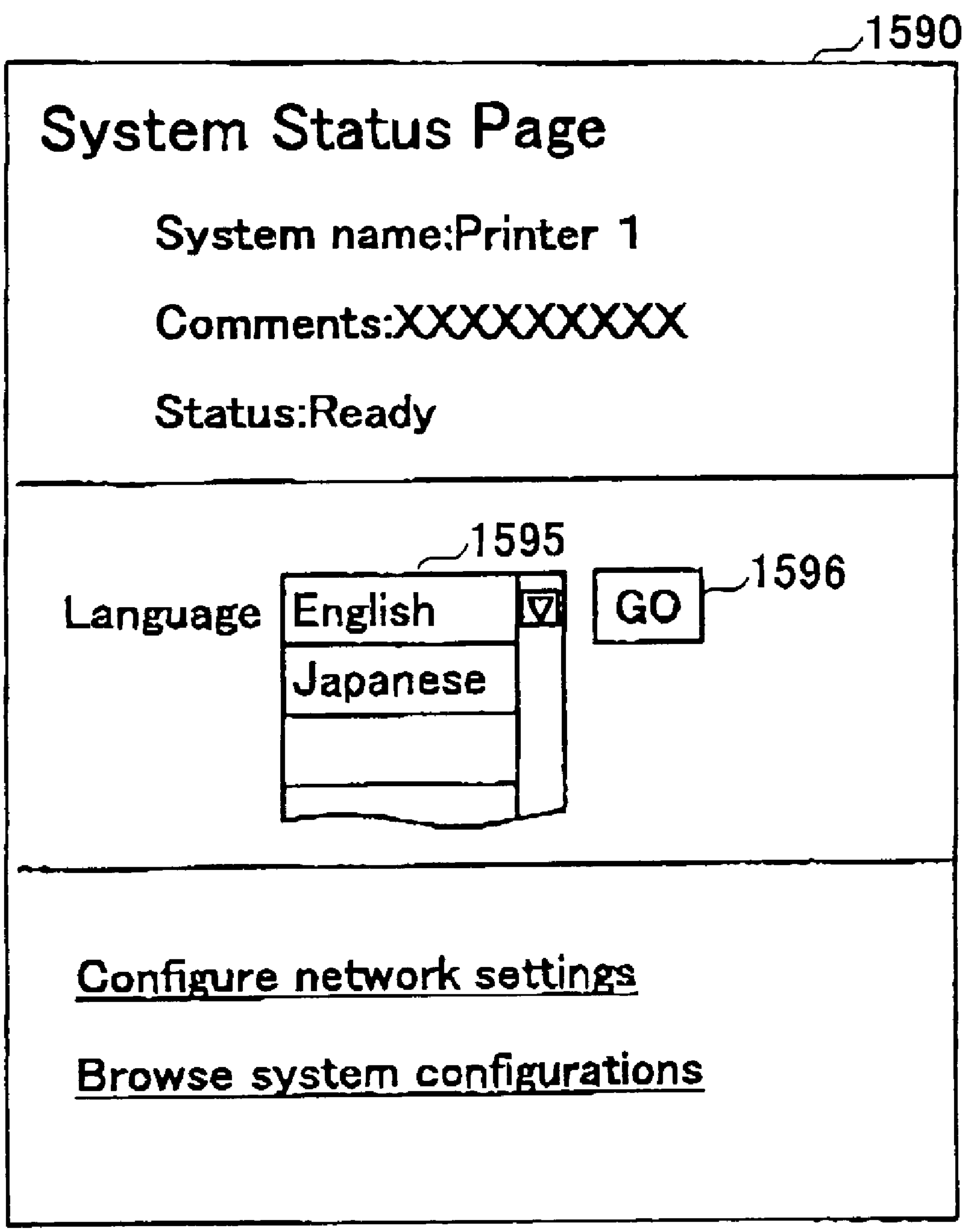
FIG. 46 is a diagram showing another Web page linked from the network setting page in FIG. 45 according to the second embodiment of the present invention.

When the user of the client PC 1041 clicks "Browse system status" from the English selectable display 1585, another Web page is displayed in English at the browser of the client PC 1041 for English as shown in FIG. 46.

FIG. 46 is a diagram showing another Web page linked from the network setting page in FIG. 45 according to the second embodiment of the present invention. In FIG. 46, a system status page 1790 corresponding to "Browse system status" in the English selectable display 1585 of FIG. 45 is displayed in English at the client PC 1041 When the user of the client PC 1041 selects "Japanese" from a language list 1795 and clicks a GO button 1796, a system status HTML showing the process result from sysstatus.cgi is created in the information processing apparatus 1100 as shown in FIG. 47.

FIG. 47 is a diagram showing an example of the system status HTML in Japanese showing the process result of sysstatus.cgi, according to the second embodiment of the present invention In a system status HTML 1670 shown in FIG. 47, a script 1671 showing <meta http-equiv="Content-Language" content="ja"> shows that the process result is provided in Japanese. A script 1673 is created based on a style sheet other than the style sheet 1430 to display information concerning the process result in Japanese at the browser of the terminal 1041 for English. A script 1674 is created based on the same style sheet for the script 1673 to display a selectable list for selecting one language in Japanese. A script 1675 is to link to one of other Web pages.

Figure 48:
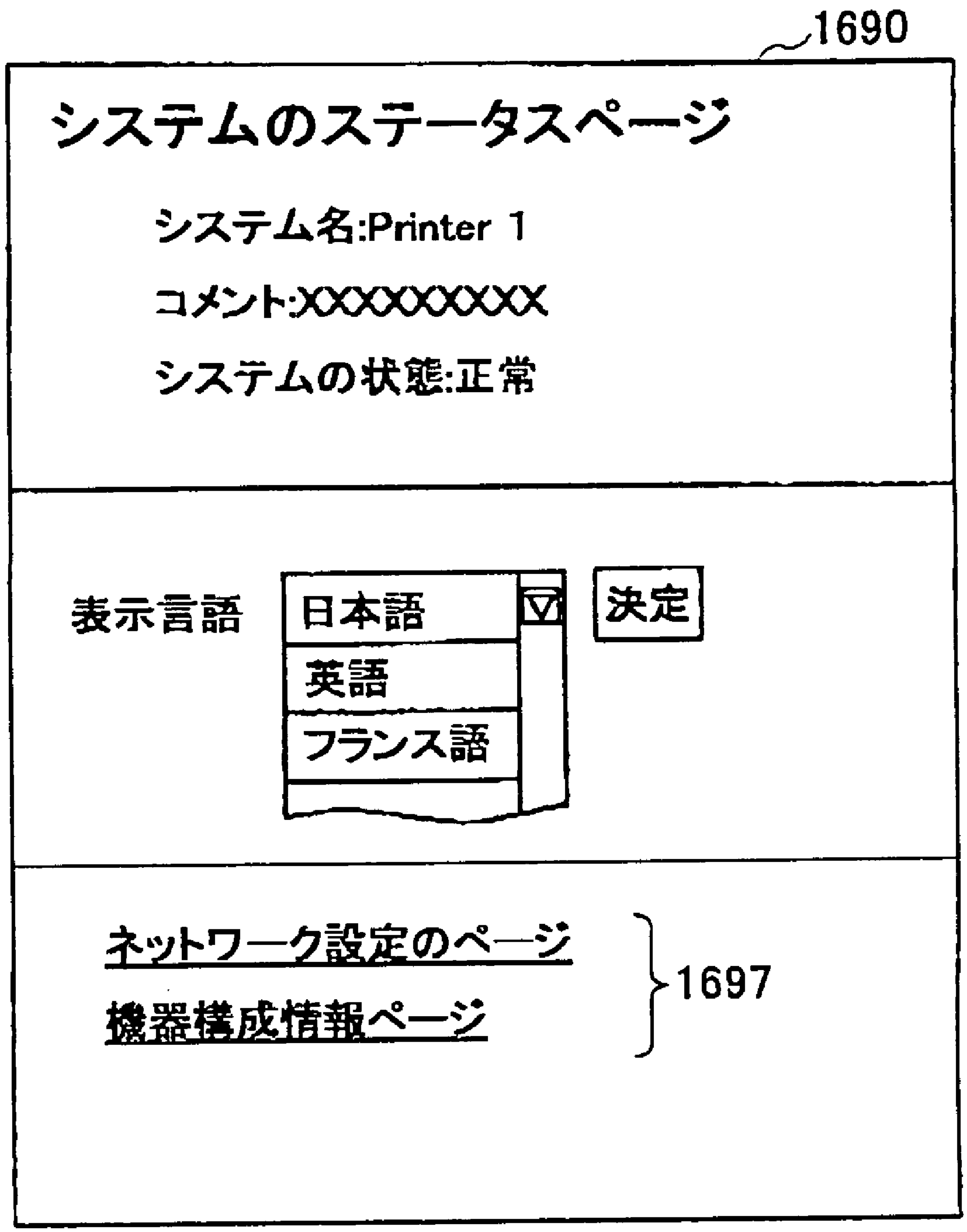
FIG. 48 is a diagram showing an example of a system status page in Japanese according to the second embodiment of the present invention.

Based on the system status HTML 1670, the system status page 1790 in English is changed to display in Japanese as shown in FIG. 48. FIG. 48 is a diagram showing an example of a system status page in Japanese according to the second embodiment of the present invention. In FIG. 48, a system status page 1690 is displayed in Japanese after the user selects "Japanese" at the system status page 1790 in FIG. 46, and then the process result of sysstatus.cgi is displayed in Japanese In a case in which the user selects one Web page from a selectable display 1697, "Japanese" is succeeded as the language information 53*c* in the common path information 60.

Accordingly to the second embodiment of the present invention, sine the HTTP daemon 1002 forms the URL so as to call default.cgi when the HTTP daemon 1002 receives the first request from the terminal 1040, the information processing apparatus 1100 can automatically set the URL including the common path information 60*a* by default.cgi. Therefore, the user of the terminal 1040 is not required to input information concerning the language displayed at the browser of the terminal 1040.

The common path information 60*a* is provided prior to the relative path information 60*b* in the URL Thus, a link from one page to another page can be indicated by only the relative path information 60*b*.

Moreover, the information processing apparatus 1100 converts the description in XML into the description in HTML based on the language information 53*c* of the common path information 60*a* by using a predetermined style sheet. Accordingly, in the information processing apparatus 1100, a developer is not required to develop each of the Web applications 1301 for each of the languages. Therefore, it is possible to reduce workload of the developer. That is, it is possible for the Web applications 1301 to output the process result in a unified manner. For example, a development of each of the Web applications 1301 is not affected by the plurality of languages.

As described above, according to the present invention, since the language information 63*c* is set in the common path information 60*a* when the request from the terminal 1040 is received, even if the page transition is conducted among the plurality of the Web applications 1301, the information corresponding to the same language can be always provided at the Web browser of the terminal 1040.

Also, a processing part for describing the process result in XML and a processing part for converting XML into HTML are provided separately from the plurality of Web applications 1301 in the Web page function 1300.

Third Embodiment

An information processing apparatus 2100 will be described according to a third embodiment of the present invention In the third embodiment according to the present invention, the information processing apparatus 2100 provides the process result suitable for a profile of the user connected to the information processing apparatus 2100 through the Internet.

The information processing apparatus 2100 according to the third embodiment includes at least one of a plurality of different image forming functions such as a printer, a FAX, and a copier, and also provides information concerning the image forming functions by a plurality of Web applications. In the third embodiment, for the sake of convenience, a case in that information concerning a copying process and a plotter for conducting a copy will be mainly described.

A hardware configuration of the information processing apparatus 2100 is the same as that of the information processing apparatus 100 shown in FIG. 1, and explanation of thereof will be omitted.

Figure 49:
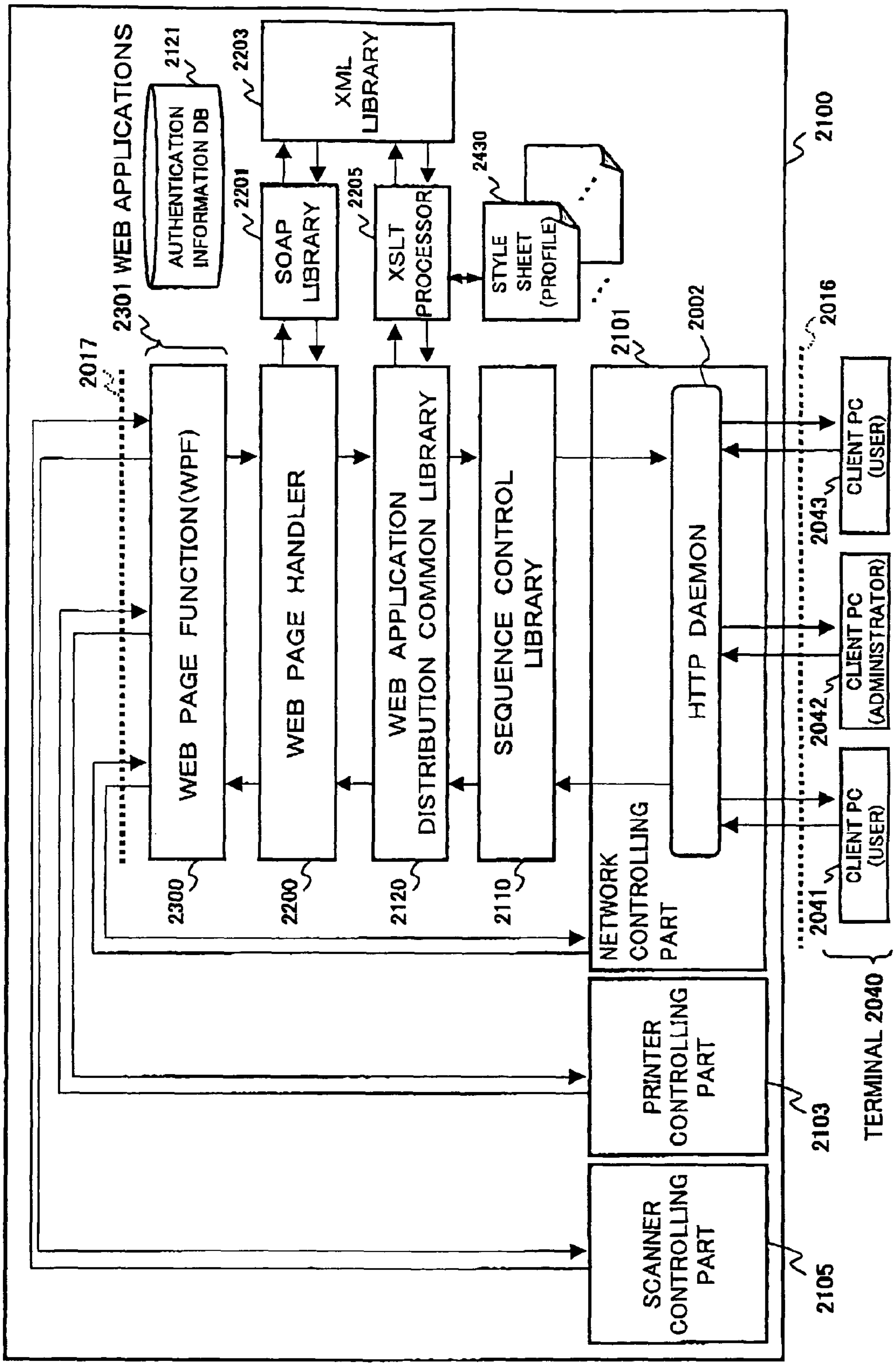
FIG. 49 is a block diagram showing a functional configuration of the information processing apparatus according to the third embodiment of the present invention.

FIG. 49 is a block diagram showing a functional configuration of the information processing apparatus according to the third embodiment of the present invention. In FIG. 49, the information processing apparatus 2100 is capable of connecting to terminals 2040 including a client PC 2041 used by a regular user, a client PC 2042 used by a system administrator, and a client PC 2043 used by another regular user, which require to display information corresponding to a profile. The information processing apparatus 2100 is a computer to provide information as a response with respect to a request sent from each of the terminals 2040.

The information processing apparatus 2100 mainly includes a network controlling part 2101, a sequence control library 2110, a Web application distribution common library 2120, a Web page handler 2200, a SOAP (Simple Object Access Protocol) library 2201, an XML (extensible Markup Language) library 2203, an XSLT (XSL Transformations) processor 2205, a Web page function (WPF) 2300, a printer controlling part 2103, and a scanner controlling part 2105.

The network controlling part 2101 includes at least an HTTP daemon 2002 for conducting a communication control in accordance with an HTTP (Hyper Text Transfer Protocol) The network controlling part 2101 receives the request from each terminal 2040 and provides information as a response with respect to the request.

In order to execute a predetermined process so as to succeed to attribute information showing attributes concerning a utilization form of a Web browser of the terminal 2040 while a user conducts page transitions (browse one Web page linked from another web page) among a plurality of Web applications 2301, when the HTTP daemon 2002 receives the request from the terminal 2040, and additionally provides a temporary common path information, and a Web application ID and a CGI (Common Gateway Interface) which are referred to execute the predetermined process, to the URL indicated by the request. Similar to the first embodiment, the HTTP daemon 2002 adds necessary information and creates the URL formed by the common path information 60*a* and the relative path information 60*b* as shown in FIG. 3. The HTTP daemon 2002 additionally provides predetermined "/TERMINAL/PROFILE/LANG/webDefaultApl/default.cgi" to the URL.

The sequence control library 2110 is a processing part that is shared with the plurality of Web applications 2301 and handles by a predetermined sequence controlling process a difference between a process sequence of sending and receiving data through the Internet 2016 and another process sequence of sending and receiving data to/from each of the Web applications 2301.

The Web application distribution common library 2120 is a processing part that is shared with the plurality of Web applications 2301, and that analyzes a request from the terminal 2040 and generates a response for the terminal 2040. The Web application distribution common library 2120 converts the response described in XML by the Web page handler 2200 into the response described in a display format by HTML (HyperText Markup Language) corresponding to the profile of the user using each terminal 2040 by using the XSLT processor 2205.

The Web page handler 2200 is a processing part that converts a process language understandable for the Web applications 2301 into another process language understandable in the communication control conducted with the terminal 2040 for the request and the response. The Web page handler 2200 calls one Web application 2301 corresponding to the request via a CGI indicated by the request. Also, the Web page handler 2200 sends a serialization request to the SOAP library 2201 to serialize process result data provided from the Web page function 2300.

Moreover, in the third embodiment, the Web page handler 2200 conducts an authenticating process for the user of the terminal 2040 by referring to an authentication information DB 2121. When the user is authenticated, the process result provided from the Web page function 2300 is provided based on the profile of the user The profile is a category of the user and shows an authorization level such as a regular user, a system administrator, a service person, and a like. For example, the user categorized as "administrator" is allowed to change network settings related to devices such as the plotter 35-1 or the scanner 35-2 (shown in FIG. 1). The user categorized as "regular user" is only allowed to display the network settings or cannot access information related to the network settings. The profile is used to determine a method for providing information.

The authentication information DB 2121 manages a user name, a user password, a registered profile, and a like for each user. The registered profile shows the profile of the user when the user is registered.

The SOAP library 2201 converts the process result data given by variables of C language into a description in XML so as to serialize the process result. In the third embodiment, serialization means to describe the process result provided from the Web page function 2300 in XML.

The XML library 2203 is used by the SOAP library 2201 to serialize the process result by describing in XML. Also, the XML library 2203 is used by the XSLT processor 2205 to generate the process result described in HTML.

The XSLT processor 2205 converts the process result described in XML into HTML by using the XML library 2203 based on a style sheet 2430 described in XSL (extensible Stylesheet Language) corresponding to the Web application 2301 indicated by the request from the terminal 2040. The style sheet 2430 is prepared beforehand by corresponding to each Web application 2301.

When the Web page function 2300 is called from the Web page handler 2200, for example, inquires the printer controlling part 2103 or the scanner controlling part 2105 mounted to the information processing apparatus 2100 through an API (Application Program Interface) 2017, obtains information showing a status of a plotter 35-1 or a scanner 35-2 (shown in FIG. 1), and then provides the information to the Web page handler 2200. Moreover, the Web page function 2300 inquires the network controlling part 2101 through the API 2017, obtains information from the network controlling part 2101, and provides the information to the Web page handler 2200.

Figure 50:
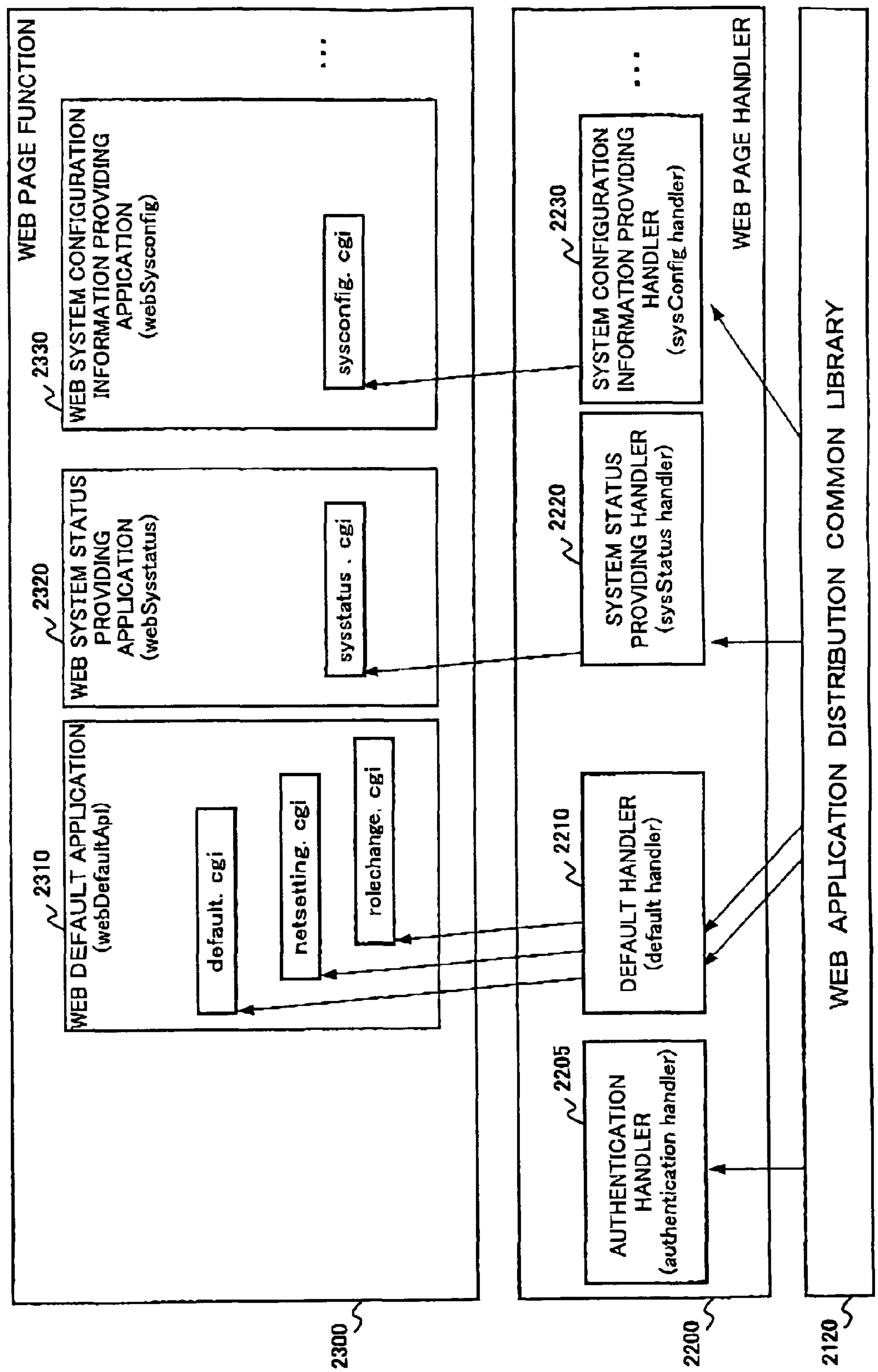
FIG. 50 is a block diagram for explaining an execution of the Web applications according to the third embodiment of the present invention.

Next, a detailed configuration for executing the Web applications 2301 will be described with reference to FIG. 50. FIG. 50 is a block diagram for explaining an execution of the Web applications according to the third embodiment of the present invention. In FIG. 50, for example, in order to provide information based on the configuration of the URL as shown in FIG. 3, the Web page handler 2200 includes an authentication handler 2205 executed to authenticate the user of the terminal 2040, a default handler 2210 executed at a first request from the terminal 2040 and at a role change request for requesting the Web page suitable for a higher profile like the administrator, a system status providing handler 2220 executed by the page transition in accordance with the instruction from the terminal 2040, a system configuration information providing handler 2230 similarly executed by page transition, and a like.

Until an initial display screen is displayed at the terminal 2040, the default handler 2210 sequentially calls the Web default application 2310 through "default.cgi", and then "netsetting.cgi" indicated by the page information 65 in accordance with the format of the URL shown in FIG. 3. As a result, for example, network settings of the device such the plotter 35-1 or the scanner 35-2 (shown in FIG. 1) mounted in the information processing apparatus 2100 are displayed at the terminal 2040.

The system status providing handler 2220 calls a function for the Web system status providing application 2320 for providing information concerning the device mounted in the information processing apparatus 2100. In addition, the system configuration information providing handler 2230 calls the Web system configuration information providing application 2330 so as to obtain a system configuration information of the information processing apparatus 2100 in response to a request from the terminal 2040.

In the same manner of the second embodiment, the Web application distribution common library 2120 executes each of the handlers 2210 through 2230 based on the Web information ID 64 of the URL shown in FIG. 3 by referring the hash lists 1050*a* shown in FIG. 30A, and each of the handlers 2210 through 2230 executes the Web applications 2301 based on the page information 65 of the URL shown in FIG. 3 by referring the hash list 1050*b* shown in FIG. 30B. Also, in order to conduct the XSL conversion request which converts the process result described by XML to the XSLT processor 2205 into HTML, the Web application distribution common library 2120 selects the style sheet 2430 based on the page information 65 of the URL by referring to the hash list 1050*b* shown in FIG. 30B. Therefore, detailed explanation thereof will be omitted.

In the third embodiment, when the Web default application 2310 is executed through "rolechange.cgi", the Web default application 2310 replaces the profile information 63*b* in the common path information 60*a* of the URL with a different profile. In this case, the default handler 2210 calls a function rolechange( ) based on "rolechange.cgi". The Web application distribution common library 2120 selects the style sheet 2430 based on the page information 65 showing "rolechange.cgi". For example, the style sheet 2430 is properly selected by "rolechange.xsl" corresponding "rolechange.cgi". The Web application distribution common library 2120 executes the authentication handler 2205 by "authentication_handler" to authenticate the user of the terminal 2040 when the user requests the Web page for the higher profile.

For example, when the user who is actually the system administrator of the terminal 2042 accesses the information processing apparatus 2100 as the regular user to display the initial display screen, in accordance with the process flows shown in FIGS. 31, 32, 37, and 38 similar to the second embodiment, the default handler 2210 sequentially calls the Web default application 2310 through "default.cgi", and then "netsetting.cgi" to display the initial display screen at the terminal 2042, as described above. As a result, for example, the network setting page is displayed at the terminal 2042 as shown in FIG. 45 in the second embodiment.

The network setting page in FIG. 45 in the second embodiment is the Web page for the regular user. Thus, the network setting page in FIG. 45 shows information concerning the network settings but the user of the terminal 2042 is not allowed to set or change the network settings. Since the user of the terminal 2042 is the administrator, the user requests the network setting page for the system administrator to the information processing apparatus 2100. That is, the user requests the network setting page for the higher profile.

A process flow to change the Web browser corresponding to a desired profile of the user will be described with reference to FIG. 51 through FIG. 53.

Figure 51:
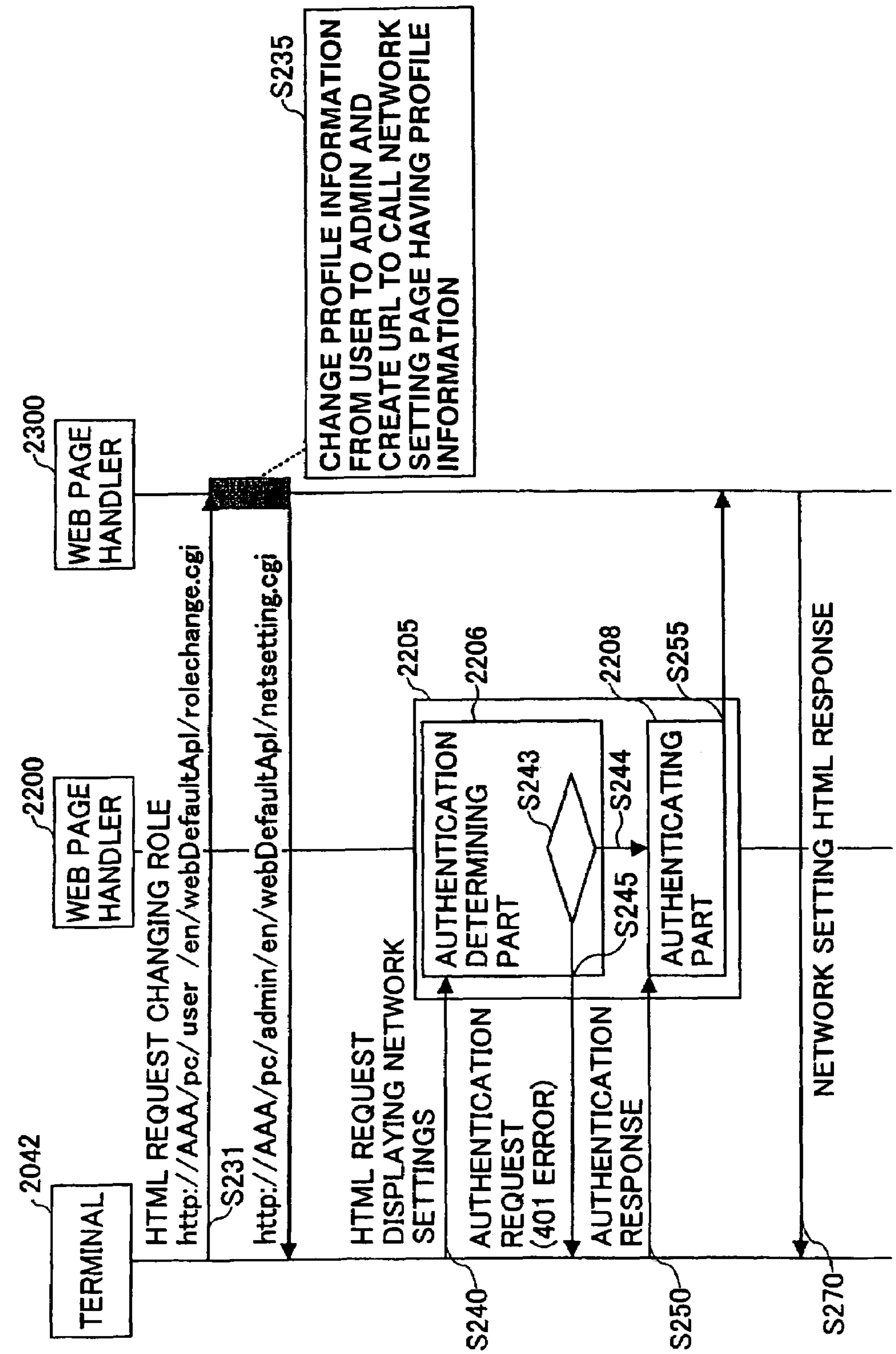
FIG. 51 is a diagram showing a process flow by rolechange.cgi according to the third embodiment of the present invention.

FIG. 51 is a diagram showing a process flow by rolechange.cgi according to the third embodiment of the present invention. In FIG. 51, the user of the terminal 2042 selects the network setting page for the different profile from a menu. In this case, a menu HTML for displaying the menu includes a script for changing a profile. For example, <a href="/pc/user/en/webDefaultApl/rolechange.cgi"> is described for the system administrator in the menu HTML. This script indicates that "rolechange.cgi" changes the profile information 63*b* in a current common path information 60*a* to a predetermined profile "admin" showing the system administrator.

When the user selects the network setting page for the system administrator, an HTML request changing a role is sent from the terminal 2042 to the information processing apparatus 2100 by indicating a URL of "/pc/user/en/webDefaultApl/rolechange.cgi" (step S231).

Based on "webDefaultApl/rolechange.cgi", the default handler 2210 calls the function rolechange( ) so that the Web default application 2310 is executed. Then, the Web default application 2310 in the web page handler 2300 obtains profile information 63*b* from the common path information 60*a* of the URL and creates a URL to call the network setting page having the profile information 63*b* showing "admin" (step S235). For example, "/pc/admin/en" is determined as the common path information 60*a* and "/webMainframDefaultApl/netsetting.cgi" is determined as the relative path information 60*b*. And the XSLT processor 2205 generates an HTML response having the URL calling the network setting page for the system administrator based on "rolechange.xsl". The HTML response is sent to the terminal 2042.

The HTML is not display at the browser of the terminal 2042 but automatically calls a HTML request displaying network settings with the profile information 63*b* showing "admin" (step S240).

The authentication handler 2205 includes an authentication determining part 2206 for determining whether or not the user is required to be authenticated based on the URL of the HTML request and an authenticating part 2208 for authenticating the user by referring to the authentication information DB 2121. When the authentication handler 2205 is executed, the authentication handler 2208 obtains the profile information 63*b* set in the URL and the determining part 2206 determines whether or not the profile information 63*b* shows "admin" (step S243).

In this case, since the profile information 63*b* shows "admin", the determining part 2206 determines that the user is required to be authenticated. Thus, the authentication handler 2205 sends an authentication request, that is, sends a predetermined "401 error" to require authentication information to the terminal 2042 (step S245). On the other hand, when the determining part 2206 determines that the user is not required to be authenticated, the authenticating part 2208 of the authentication handler 2205 executes the Web default application 2310 by calling the function "netsetting.cgi" (step S244).

The terminal 2042 displays a password input screen to prompt the user to input the password of the user and sends an authentication response showing authentication information including the password input by the user to the information processing apparatus 2100 (step S250). Generally, a regular Web browser implements this authentication process sequence. It is not limited to this authentication process sequence but a special authentication screen can be formed and an original authentication process can be conduct.

The authenticating part 2208 of the authentication handler 2205 conducts the authentication process to authenticate the user based on the password input by the user by referring the authentication information DB 2121. When the user is successfully authenticated, the authentication handler 2205 executes the default application 2310 through "netsetting.cgi" (step S255).

After the process result is provided from the default application 2310, the network setting HTML for the system administrator is created based on the profile information 63*b* showing "admin" and sent to the terminal 2042 (step S270).

Once the terminal 2042 accesses the information processing apparatus 2100 by the URL of "/pc/admin/en/webDefaultApl/netsetting.cgi", "/pc/admin/en" is always succeeded while the user conducts the page transition. After that, the Web page provided from the information processing apparatus 2100 by the page transition can be the Web page for the system administrator.

Figure 52:
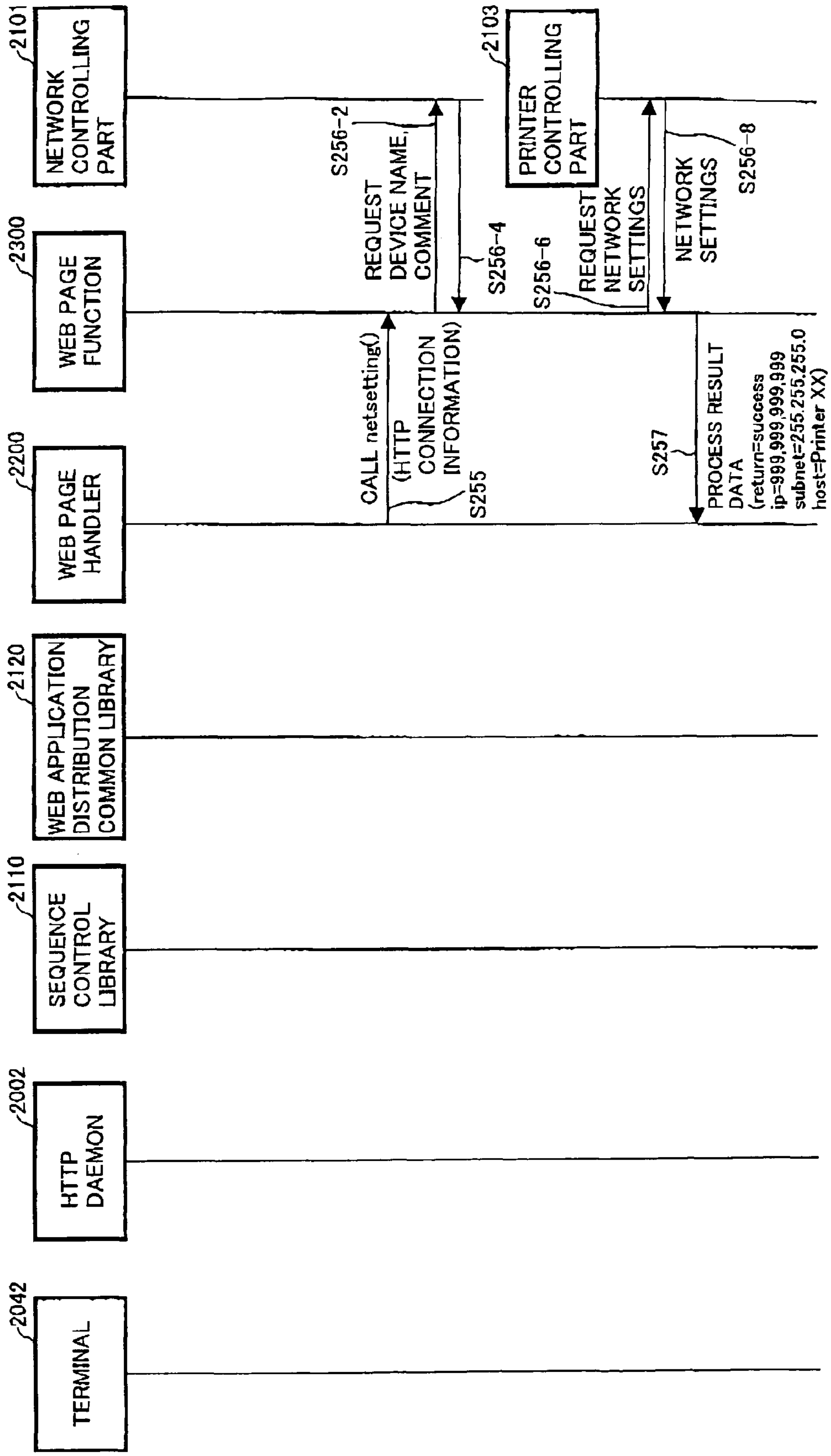
FIG. 52 is a diagram showing the process flow by netsetting.cgi according to the third embodiment of the present invention.
Figure 53:
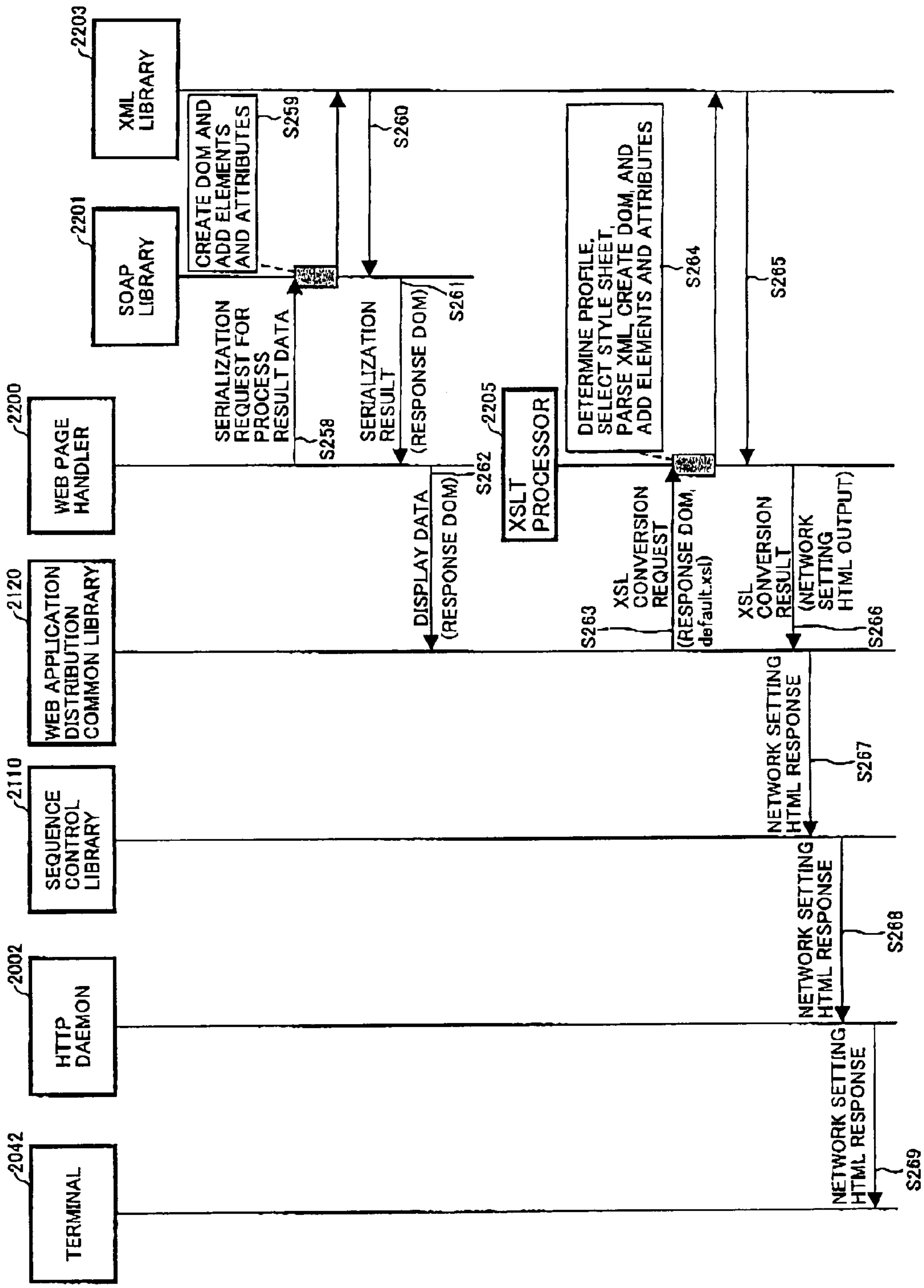
FIG. 53 is a diagram showing the process flow by netsetting.cgi according to the third embodiment of the present invention.

Next, a process flow conducted by netsetting.cgi from step S255 and step S270 will be described with reference to FIG. 52 and FIG. 53 in detail FIG. 52 and FIG. 53 are diagrams showing the process flow by netsetting.cgi according to the third embodiment of the present invention. In FIG. 52, the default handler 2210 of the Web page handler 2200 obtains the page information 65 showing "netsetting.cgi", and specifies and calls the function netsetting( ) corresponding to "netsetting.cgi" (step S255). In this case, the HTTP connection information 340 is set as an argument.

For example, in a case in that the Web page function 2300 is developed by C language, the Web page handler 2200 converts into a process type of C language and calls the function netsetting( ).

By executing the function netsetting( ), the Web default application 2310 requests information including a device name, a comment, and a like to the network controlling part 2101 through the API 2017, in order to display the status of a device (for example, plotter 35-1 as the printer) at the initial display screen (netsetting.cgi) (step S256-2). The network controlling part 2101 provides the information including the device name, the comment, and the like in response to the request (step S256-4).

For example, the Web default application 2310 of the Web page function 2300 requests the status of the printer to the printer controlling part 2103 through the API 2017 (printer status request) (step S256-6) The printer controlling part 2103 provides the status of the plotter 35-1 as a printer status to the Web default application 2310 (step S256-8).

Then, the Web default application 2310 provides the printer status, and the terminal type information 63*a*, the profile information 63*b* and the language information 63*c* from the request URL 2354 of the HTTP request information 2350 as the process result data to the default handler 2210 in the Web page handler 2200 (step S257).

In the following, the serialization process for describing in XML in steps S258, S259, S260, S261, and S262 is the same as the serialization process in steps S118, S119, S120, S121, and S122 in the second embodiment, and explanation thereof will be omitted.

In order to convert the display data described in XML into a description of HTML corresponding to the profile of the user using the terminal 2042, the Web application distribution common library 2120 obtains the style sheet "netsetting.xsl" corresponding to the page information 56 showing "netsetting.cgi", and conducts the XSL conversion request with respect to the XSLT processor 2205 (step S263). In this case, the display data "Response DOM" and the style sheet "netsetting.xsl" are set as arguments. When the XSLT processor 2205 receives the XSL conversion request, the XSLT processor 2205 executes the style sheet "netsetting.xsl" indicated in the argument. Accordingly, the XSLT processor 2205 selects one template corresponding to the profile from descriptions of the style sheet, analyzes a syntax of the display data "Response DOM" described in XML (parse XML), creates a DOM, additionally provides elements and attributes (step S264), and converts into the description of HTML by using the XML library 2203 (step S265).

XSLT processor 2205 provides the description of HTML as the XSL conversion result to the Web application distribution common library 2120 (step S266).

The process result described in HTML by the Web page function 2300 in a case in that the page information 65 is "netsetting.cgi" is output to the Web application distribution common library 2120 as a network setting HTML Information concerning the network settings of the plotter 35-1 is described in the network setting HTML.

This network setting HTML response is provided from the Web application distribution common library 2120 to the sequence control library 2110 (step S267), and then is provided from the sequence control library 2110 to the HTTP daemon 2002 (step S268). Subsequently, the HTTP daemon 2002 sends the network setting HTML response as a response in accordance with HTTP with respect to the request sent from the terminal 2042 (step S269). Then, the process flow executed by "netsetting.cgi" is terminated.

Values that can be set in the URL as the profile information 63*b* will be described with reference to FIG. 54. FIG. 54 is a diagram showing a correspondence between the profile information to set in the URL and the profile of the user according to the third embodiment of the present invention.

In FIG. 54, “user” set in the URL shows that the user requests the Web page as the regular user, “admin” set in the URL shows that the user requests the Web page as the system administrator, “service” shows that the user requests the Web page as the service person, and a like.

The authentication handler 2205 may send “401 error” if the profile information 63*b* set in the URL is a higher level than the profile of the user managed in the authentication information DB 2121. The authentication handler 2205 may determine whether or not the user is required to be authenticated.

FIG. 55 is a diagram showing an example of the HTML response calling the network setting page for the system administrator according to the third embodiment of the present invention. In FIG. 55, an HTML response 2400 is not displayed at the terminal 2042, but a script 2401 that is Javascript™ calls the network setting page.

By a script 2402 showing “self.document.cookie=“cookieOnOffchecker=on; path=/ ””, information concerning the Web browser of the terminal 2042 is obtained. By a scrip 2403 showing “self.location-.pathname=“/pc/admin/en/webDefaultApl/nets etting.cgi””, the profile information “admin” is succeeded, and the Web default application 2310 of the Web page function 2300 is executed. That is, a network setting HTML for the system administrator is requested. During a series of page transitions conducted by the user after that, an absolute path is indicated by a script 2403 as a reference for a relative path indicated by <a href> tag.

The process result described in XML will be described. FIG. 56 is a diagram showing an example of the process result described in XML by netsetting.cgi according to the third embodiment of the present invention.

In FIG. 56, an XML 2500 shows the process result when the user is successfully authenticated to change the profile information 63*b* from “user” to “admin”. In an XML 2500 shown in FIG. 56, the process result by the function netsetting( ) of the Web default application 2310 is shown by a script 2501 showing from <networkResponse> to </networkResponse>. A script 2502 showing <terminal>pc</terminal> shows that the terminal 2042 is a personal computer, a script 2503 showing <language>en</language> shows that a language displayed at the Web browser of the terminal 2042 is English, and a script 2504 showing <profile>admin</profile> shows that the user of the terminal 2042 is the system administrator. The scripts 2502 through 2504 show information based on the terminal type information 63*a*, the profile information 63*b*, and the language information 63*c* of the common path information 60*a* of the URL.

A script 2505 showing <returnValue>SUCCESS</returnValue> shows that the network settings are successfully conducted. A script 2506 showing <ipAddress>999.999.999.999</ipAddress> shows that the IP address of the device (for example, the plotter 35-1) is “999.999.999.999”. A script 2507 showing <subnetMask>255.255.255.0</subnetMask> shows that the subnet mask is “255 255.255.0”. A script 2508 showing <hostName>Printer 1</hostname> shows that the name of the device is “Printer 1”.

In the third embodiment, the Web page handler 2200 includes a function for serializing the process result data provided from the Web page function 2300 by describing in XML. Accordingly, each of Web applications 2301 of the Web page function 2300 is not required to include a processing part for describing the process result for each profile.

The style sheet 2430, which converts the process result data described in XML to be serialized, into HTML by the XSLT processor 2205 based on profile information 63*b*, will be described with reference to FIG. 57. FIG. 57 is a diagram showing a description example of the style sheet for converting the process result from XML to HTML according to the third embodiment of the present invention.

In the style sheet 2430 shown in FIG. 57, it is determined by a script 2431 whether or not an element sandwiched with <terminal> tags shown by a script 2504 of the XML 2500 of FIG. 56 includes a character string “admin”, that is, it is determined whether or not the XML 2500 is the process result for the system administrator. A style sheet template for the system administrator is applied by a script 2432 when the character string “admin” is included. Another style sheet template for the regular user is applied when the character string “admin” is not included. The style sheet template for the system manager is described in a script 2434, and the style sheet template for the regular user is described in a script 2435. Details of each style sheet template are not shown in FIG. 57.

When the terminal 2042 requests the network setting page for the system administrator, for example, the process result of the function netsetting( ) of the Web default application 2310 is described in HTML as shown in FIG. 58. FIG. 58 is a diagram showing a description example of HTML for the system administrator in that the process result of the netsetting.cgi is shown, according to the third embodiment of the present invention. In FIG. 58, HTML 2570 for the system administrator is provided to the terminal 2042 when the terminal 2042 requests the network setting page for the system administrator and the user is authenticated as the system administrator, and the process result of the function netsetting( ) of the Web default application 2310 is displayed at the Web browser of the terminal 2042 by scripts 2573 and 2575.

The 2573 and 2575 are created based on the style sheet 2430 to display for the system administrator at the browser of the terminal 2042. The script 2573 is a script described in HTML for allowing the user input information concerning the network settings and send the information input by the user to the information processing apparatus 2100. The script 2575 is to link to one of other Web pages.

By the script 2575, the network setting HTML can be linked to either one of two Web pages: “Browse System Status” page and “Browse System Configurations”. By a script 2576 showing≦a href=“. . . /webSysstatusApl/sysstatus.cgi”>, “webSysstatusApl” as the Web application information 64 and “sysstatus.cgi” as the page information 65 are set as the relative path. When the “Browse System Status” page is selected by the user of the terminal 2042, the “Browse System Status” page is displayed at the terminal 2042 while a current profile information 63*b* is succeeded to by “. . . /”. In the same manner, by a script 2577 showing <a href=“. . . /webSysconfigApl/sysconfig.cgi”>, “webSysconfigApl” as the Web application information 64 and “sysconfig.cgi” as the page information 65 are set as the relative path. When the “Browse System Configurations” page is selected by the user of the terminal 2042, the “Browse System Configurations” page is displayed at the terminal 2042 while the current profile information 63*b* is succeeded to by “. . . /”.

Figure 59:
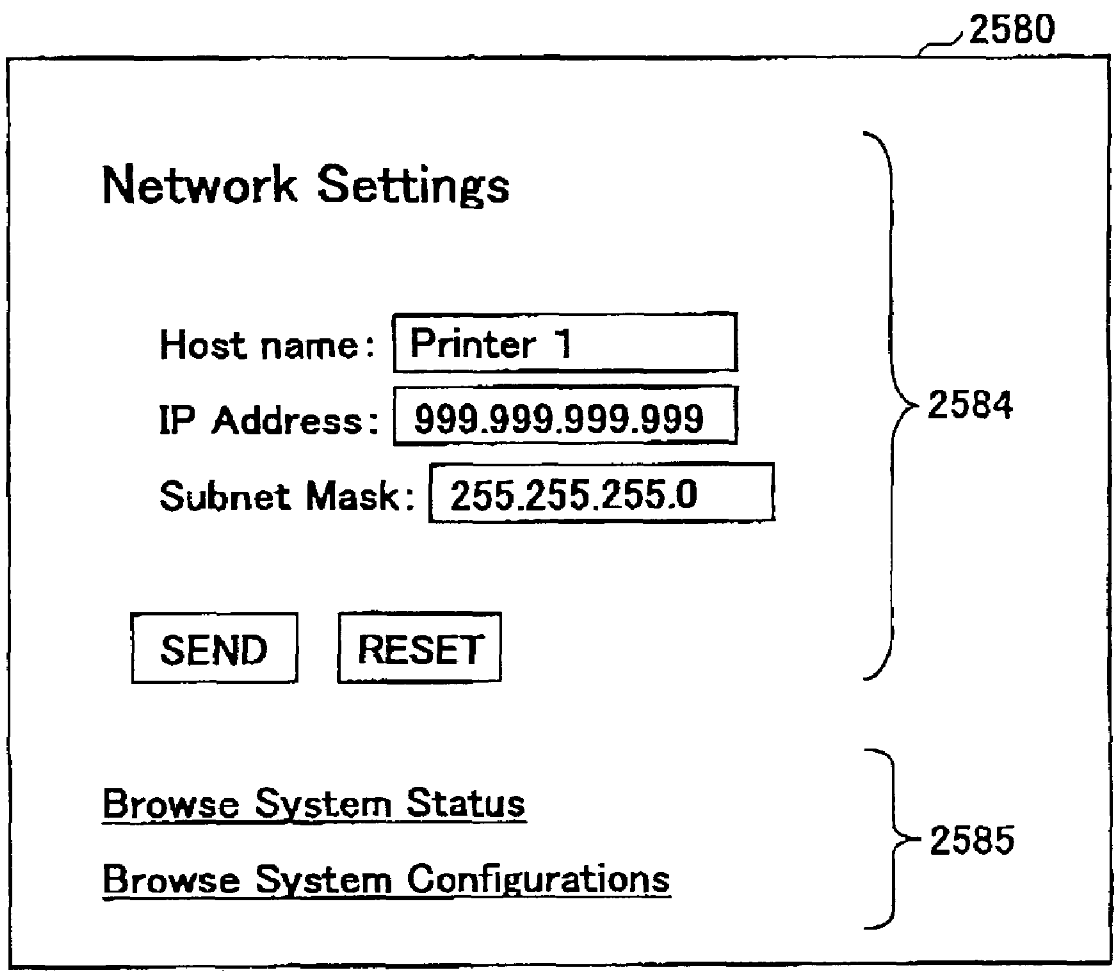
FIG. 59 is a diagram showing the network setting page for the system administrator according to the third embodiment of the present invention.

The network setting page is displayed in English as shown in FIG. 59 by the network setting HTML in FIG. 58. FIG. 59 is a diagram showing the network setting page for the system administrator according to the third embodiment of the present invention. In a network setting page 2580 shown in FIG. 59, an input area 2584 and a selectable display 2585 are displayed at the terminal 2042 when the user of the terminal 2042 is successfully authenticated as the system administrator The input area 2584 is displayed based on the script 2573 in FIG. 58. The selectable display 2585 is displayed based on the script 2575 in FIG. 58.

As described above, when the user conducts the page transition among the Web applications 2301, the profile information 63*b* is automatically succeeded. Therefore, the user of the terminal 2040 is not required to indicate the profile of the user to request the Web page suitable for the profile.

Moreover, in the information processing apparatus 2100, a consistency of creating the web page suitable for the profile of the user can be maintained among the Web applications 2301 in the Web page function 2300. In addition, each of the Web applications 2301 is not required to include a process for creating the Web page for each profile.

Furthermore, the profile information 63*b* is succeeded with respect to the request from each of the terminals 2040. Therefore, it is possible to display the Web page suitable for the profile of the user at the terminal 2040. In addition, the user is authenticated when the user changes the profile to display the Web page suitable for the profile. Accordingly, it is possible to protect information maintained in the information processing apparatus 2100 depending on the profile of the user.

The present invention is not limited to the specifically disclosed embodiments, and variations and modifications may be made without departing from the scope of the present invention.

The present application is based on the Japanese priority applications No. 2002-212300 filed on Jul. 22, 2002, No. 2002-242548 filed on Aug. 22, 2002, No. 2002-242550 filed on Aug. 22, 2002, and No. 2003-197850 filed on Jul. 16, 2003 the entire contents of which are hereby incorporated by reference.

What is claimed is:

1. An information processing apparatus, including a communication part communicating based on connection information from a terminal connected through a network, wherein the connection information includes an URL and the URL included in the connection information is formed by common path information and relative path information following the common path information, and wherein said information processing apparatus comprises:

a handler part specifying a function corresponding the relative path information of the URL by referring to a list in which the relative path information corresponds to a function name;

an execution part calling the function specified by the handler part by using succeeded information of at least one of terminal type information, language information, or profile information included in the common path information of the URL and outputting execution result information including the succeeded information;

an XML description part describing the execution result information in XML;

a Web page generation part generating a Web page by an HTML conversion part converting the XML described by the XML description part into HTML by using a style sheet corresponding to the succeeded information from a plurality of style sheets for converting into the HTML for each of different succeeded information; and a setting part specifying the succeeded information from the connection information and setting the specified succeeded information at a location of the succeeded information of the common path information of the URL, wherein:

when receiving a request in which the common path information of the URL included in the connection information does not include the succeeded information, the communication part specifies the succeeded information from the connection information and sets the specified succeeded information at the location of the succeeded information of the common path information of the URL by the setting part, so as to have the terminal access the URL in which the specified succeeded information is set; and when receiving a request in which the common path information of the URL included in the connection information includes the succeeded information, the communication part outputs the execution result information including the succeeded information by calling the function corresponding to the common path information of the URL specified by the handler part by using the succeeded information included in the common path information of the URL by the execution part, describes the execution result information including the succeeded information output from the execution part in the XML by the XML description part, and sends the terminal the Web page that the Web page generation part generates by converting the XML described by the XML conversion part into the HTML by using the style sheet corresponding to the succeeded information.

2. The information processing apparatus as claimed in claim 1, further comprising a plurality of the execution parts, wherein the relative path information is formed by application ID information specifying an application and page information specifying a respective execution part in the specified application;

a plurality of applications that are executable in which at least one of the execution parts is corresponded for each application; and when generating link information linking to another application in the Web page to be generated, the Web page generation part generates the Web page by the HTML conversion part that describes the link information by using the style sheet to link to another application with the relative path information, whereby the terminal accesses the URL formed by the common path information including the succeeded information and the relative path information following the common path information.

3. An information processing method conducted by an information processing apparatus that provides a Web page to a terminal in response to a request received from the terminal connected through a network, said information processing method comprising:

a communication operation communicating based on connection information that is received from the terminal and that includes the URL formed by common path information and relative path information following the common path information;

a handler operation specifying a function corresponding the relative path information of the URL by referring to a list in which the relative path information corresponds to a function name;

an execution operation calling the function specified by the handler operation by using succeeded information of at least one of terminal type information, language information, or profile information included in the common path information of the URL and outputting execution result information including the succeeded information;

an XML description operation describing the execution result information in XML;

an HTML conversion operation converting the XML described by the XML description operation into HTML by using a style sheet corresponding to the succeeded information from a plurality of style sheets for converting into the HTML for each of different succeeded information;

a Web page generation operation generating a Web page by the XML description operation and the HTML conversion operation; and a terminal type setting operation specifying the succeeded information from the connection information and setting the specified succeeded information at a location of the succeeded information of the common path information of the URL, wherein:

when receiving a request in which the common path information of the URL included in the connection information does not include the succeeded information, the communication operation specifies the succeeded information from the connection information and sets the specified succeeded information at the location of the succeeded information of the common path information of the URL by the terminal type setting operation, so as to have the terminal access the URL in which the specified succeeded information is set; and when receiving a request in which the common path information of the URL included in the connection information includes the succeeded information, the communication operation outputs the execution result information including the succeeded information by calling the function corresponding to the common path information of the URL specified by the handler operation by using the succeeded information included in the common path information of the URL by the execution operation, describes the execution result information including the succeeded information output from the execution operation in the XML by the XML description operation, and sends the terminal the Web page that the Web page generation operation generates by converting the XML described by the XML conversion operation into the HTML by using the style sheet corresponding to the succeeded information.

4. The information processing method as claimed in claim 3, further comprises a plurality of execution operations:

wherein the relative path information is formed by application ID information specifying an application and page information specifying a respective execution operation to the specified application;

a plurality of applications are executable in which at least one of the execution operations is corresponded for each application; and when generating link information linking to another application in the Web page to be generated, the Web page generation operation generates the Web page by the HTML conversion operation that describes the link information by using the style sheet to link to another application with the relative path information, whereby the terminal accesses the URL formed by the common path information including the succeeded information and the relative path information following the common path information.

5. An image forming apparatus including an image formation part conducting an image formation, an image formation control part controlling the image formation part, and a communication part communicating based on connection information from a terminal connected through a network, wherein the connection information includes an URL and the URL included in the connection information is formed by common path information and relative path information following the common path information, and wherein said image forming apparatus comprises:

a handler part specifying a function corresponding the relative path information of the URL by referring to a list in which the relative path information corresponds to a function name;

an execution part calling the function specified by the handler part by using succeeded information of at least one of terminal type information, language information, or profile information included in the common path information of the URL and outputting execution result information including the succeeded information;

an XML description part describing the execution result information in XML;

a Web page generation part generating a Web page by an HTML conversion part converting the XML described by the XML description part into HTML by using a style sheet corresponding to the succeeded information from a plurality of style sheets for converting into the HTML for each of different succeeded information; and a setting part specifying the succeeded information from the connection information and setting the specified succeeded information at a location of the succeeded information of the common path information of the URL, wherein:

when receiving a request in which the common path information of the URL included in the connection information does not include the succeeded information, the communication part specifies the succeeded information from the connection information and sets the specified succeeded information at the location of the succeeded information of the common path information of the URL by the setting part, so as to have the terminal access the URL in which the specified succeeded information is set; and when receiving a request in which the common path information of the URL included in the connection information includes the succeeded information, the communication part outputs the execution result information including the succeeded information by calling the function corresponding to the common path information of the URL specified by the handler part by using the succeeded information in the common path information of the URL by the execution part, describes the execution result information including the succeeded information output from the execution part in the XML by the XML description part, and sends the terminal the Web page that the Web page generation part generates by converting the XML described by the XML conversion part into the HTML by using the style sheet corresponding to the succeeded information.

6. An information processing apparatus including a communication part communicating based on connection information from a terminal connected through a network, wherein the connection information includes an URL, and the URL included in the connection information is formed by common path information and relative path information following the common path information, and wherein said information processing apparatus comprises:

an execution result generation part calling a function corresponding to only the relative path information of the URL by using first succeeded information included in the common path information of the URL and generating execution result information corresponding to the first succeeded information;

a Web page generation part generating a Web page described in HTML; and a URL creation part specifying a second succeeded information of at least one of terminal type information, language information, or profile information from the connection information and creating the URL so that the second succeeded information is set as the first succeeded information in the common path information of the URL, wherein:

when receiving a request in which the common path information of the URL included in the connection information does not include the first succeeded information, the communication part specifies the second succeeded information from the connection information and sets the second succeeded information in the common path information of the URL by the URL creation part, so as to have the terminal access the URL in which the second succeeded information is set; and when receiving a request in which the common path information of the URL included in the connection information includes the first succeeded information, the communication part generates the execution result information corresponding to the first succeeded information by calling the function corresponding to the relative path information of the URL by using the first succeeded information included in the common path information of the URL, and sends the Web page that the Web page generation part generates based on the execution result information.

7. The information processing apparatus as claimed in claim 6, further comprising a plurality of applications, wherein the relative path information is formed by application ID information specifying an application and page information specifying a respective function to the specified application; and when generating link information linking to another application in the Web page to be generated, the Web page generation part forms the link information by the relative path information being static information, whereby the terminal accesses the URL formed by the common path information including the first succeeded information and the relative path information.

8. The information processing apparatus as claimed in claim 7, further comprising a plurality of handlers each calling the function with a function name corresponding to the page information of the URL by using the first succeeded information, by referring to a first correspondence list in which the page information corresponds to the function name for calling the function, wherein the plurality of handlers are implemented corresponding to the plurality of applications; and the execution result generation part calls one of the plurality of handlers with a handler name corresponding to the application ID information of the URL, by referring to a second correspondence list in which the application ID information corresponds to the handler name specifying the one of the plurality of the handlers.

9. An information processing method conducted by an information processing apparatus that provides a Web page to a terminal in response to a request received from the terminal connected through a network, said information processing method comprising:

a communication operation communicating based on connection information that is received from the terminal and includes the URL formed by common path information and relative path information following the common path information;

an execution result generation operation calling a function corresponding to only the relative path information of the URL by using first succeeded information included in the common path information of the URL and generating execution result information corresponding to the first succeeded information;

a Web page generation operation generating a Web page described in HTML; and a URL creation operation specifying a second succeeded information of at least one of terminal type information, succeeded information, or profile information from the connection information and creating the URL so that the second succeeded information is set as the first succeeded information in the common path information of the URL, wherein:

when receiving a request in which the common path information of the URL included in the connection information includes the first succeeded information, the communication operation generates the execution result information corresponding to the first succeeded information by calling the function corresponding to the relative path information of the URL by using the first succeeded information included in the common path information of the URL, and sends the Web page that the Web page generation step generates based on the execution result information; and when receiving a request in which the common path information of the URL included in the connection information includes the second succeeded information, the communication operation specifies the second succeeded information from the connection information and sets the second succeeded information in the common path information of the URL by the URL creation operation, so as to have the terminal access the URL in which the second succeeded information is set.

* * * * *